(12) United States Patent
Reepmeyer et al.

(10) Patent No.: US 12,264,951 B2
(45) Date of Patent: Apr. 1, 2025

(54) ULTRASONIC FUEL FLOW MEASURING SYSTEMS AND METHODS OF SETTING CHARACTERISTICS OF EXCITATION SIGNALS

(71) Applicant: General Electric Company, Schenectady, NY (US)

(72) Inventors: James Ryan Reepmeyer, Cincinnati, OH (US); Cameron Roy Nott, Fairfield, OH (US); Emad Andarawis Andarawis, Ballston Lake, NY (US); Kirk Dennis Wallace, Glenville, NY (US)

(73) Assignee: General Electric Company, Evendale, OH (US)

( * ) Notice: Subject to any disclaimer, the term of this patent is extended or adjusted under 35 U.S.C. 154(b) by 399 days.

(21) Appl. No.: 17/732,945

(22) Filed: Apr. 29, 2022

(65) Prior Publication Data
US 2022/0364894 A1 Nov. 17, 2022

Related U.S. Application Data

(60) Provisional application No. 63/182,382, filed on Apr. 30, 2021.

(51) Int. Cl.
*G01F 1/667* (2022.01)
*F01D 21/00* (2006.01)
(Continued)

(52) U.S. Cl.
CPC .......... *G01F 1/667* (2013.01); *F01D 21/003* (2013.01); *G01F 1/66* (2013.01); *G01F 1/662* (2013.01);
(Continued)

(58) Field of Classification Search
CPC . G01F 1/667; G01F 1/66; G01F 1/662; G01F 25/10; F01D 21/003; G01N 29/036;
(Continued)

(56) References Cited

U.S. PATENT DOCUMENTS 6,546,811 B2 4/2003 Fincke
7,600,417 B2 10/2009 Paradise
(Continued)

*Primary Examiner* — Eric S. McCall
*Assistant Examiner* — Timothy P Graves
(74) *Attorney, Agent, or Firm* — Dority & Manning, P.A.

(57) ABSTRACT

A fuel flow measuring system includes an ultrasonic fuel flow sensor. The fuel flow sensor includes a first transducer and a second transducer. The first transducer is excited at multiple different excitation frequencies and a voltage, an electric current, and a phase difference between the voltage and the electric current is sensed at the first transducer during excitation. Data points are generated based on the sensed readings and a model is fit to the data points to determine a complex impedance spectrum. The complex impedance spectrum indicates a range of excitation frequencies within a range of a peak resonance frequency of the first transducer. One or more characteristics of excitation signals directed to the second transducer are set based on the determined complex impedance spectrum. In this manner, the signal to noise ratio of ultrasonic signals emitted by the second transducer and received by the first transducer can be maximized.

20 Claims, 23 Drawing Sheets

(51) Int. Cl.
*G01F 1/66* (2022.01)
*G01F 25/10* (2022.01)
*G01N 29/036* (2006.01)
*G01N 29/34* (2006.01)
*G01N 29/42* (2006.01)
*G01N 29/44* (2006.01)

(52) U.S. Cl.
CPC ........... *G01F 25/10* (2022.01); *G01N 29/036* (2013.01); *G01N 29/348* (2013.01); *G01N 29/42* (2013.01); *G01N 29/4418* (2013.01); *F05D 2270/306* (2013.01); *F05D 2270/71* (2013.01); *F05D 2270/80* (2013.01)

(58) Field of Classification Search
CPC .. G01N 29/348; G01N 29/42; G01N 29/4418; G01N 2291/0258; G01N 29/032; F05D 2270/306; F05D 2270/71; F05D 2270/80
See application file for complete search history.

(56) References Cited

U.S. PATENT DOCUMENTS

| | | |
|---|---|---|
| 7,607,359 B2 | 10/2009 | Hecht et al. |
| 8,875,587 B2 | 11/2014 | Wiest et al. |
| 9,658,178 B2 | 5/2017 | Surman et al. |
| 9,891,085 B2 | 2/2018 | Muhammad et al. |
| 10,866,127 B2 | 12/2020 | Healy et al. |
| 10,900,421 B2 | 1/2021 | Hahn |
| 2014/0236533 A1* | 8/2014 | Drachmann ............ G01F 1/667 73/861.27 |
| 2021/0033552 A1 | 2/2021 | Potyrailo et al. |

* cited by examiner

ULTRASONIC FUEL FLOW MEASURING SYSTEMS AND METHODS OF SETTING CHARACTERISTICS OF EXCITATION SIGNALS

CROSS-REFERENCE TO RELATED APPLICATION

This application claims the benefit of U.S. Provisional Application No. 63/182,382, filed Apr. 30, 2021, which is hereby incorporated by reference in its entirety.

FIELD

The present disclosure relates generally to fuel flow measuring systems and methods therefore, and more particularly, to fuel flow measuring systems having an ultrasonic fuel flow sensor and methods of tuning the same.

BACKGROUND

Fuel flow measuring systems are critical to many industries, including the automotive, oil and gas, power, and aviation industries. Such systems are important in that they can determine how much fuel is being directed to or consumed by a vehicle or piece of machinery, or alternatively, to determine how much fuel is passing through a pipeline or conduit. In many high mass flow applications, even a small inaccuracy in the fuel flow measurement can result in revenue losses.

Ultrasonic fuel flow sensors are useful for making fuel flow measurements and have wide applicability due to their accuracy and non-intrusive arrangement. Ultrasonic fuel flow sensors can include one or more transducers arranged to emit ultrasonic signals. Conventionally, the excitation frequencies of such transducers have been tuned infrequently and based on phase optimization techniques. Improved techniques for tuning the excitation frequencies of such transducers so as to improve the overall accuracy and consistency of fuel flow sensors would be a welcome addition to the art.

BRIEF DESCRIPTION

Aspects and advantages of the present disclosure will be set forth in part in the following description, or may be obvious from the description, or may be learned through practice of the present disclosure.

In one exemplary embodiment of the present disclosure, a system is provided. The system includes an ultrasonic flow sensor having a first transducer and a second transducer. The first transducer is excited at different frequencies and a voltage, an electric current, and a phase difference therebetween is measured at the first transducer. Data points are generated based on these readings and a model is fit to the data points. By fitting the model to the data points, a peak resonance frequency associated with the first transducer can be determined. Frequencies within a predetermine range of the peak resonance frequency are deemed a complex impedance spectrum associated with the first transducer. One or more characteristics of the excitation signals directed to the second transducer are set based at least in part on the complex impedance spectrum associated with the first transducer. In this manner, the signal to noise ratio of an ultrasonic signal emitted by the second transducer and received by the first transducer is maximized or close to being maximized.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
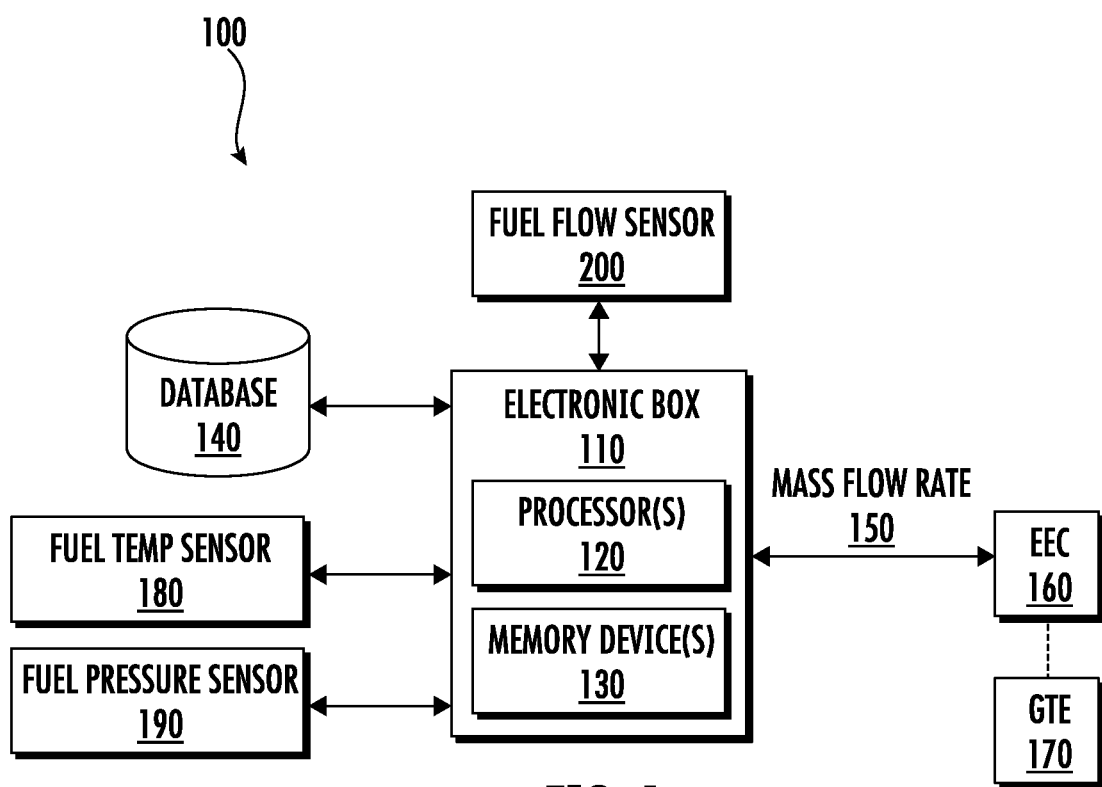
FIG. 1 is a block diagram of an example fuel flow measuring system configured for use on an aircraft engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Furthermore, as used herein, the term "real time" refers to executing within a controller time step to provide a new input (e.g., a measurement or calculation) for each controller update.

The present disclosure is generally related to a fuel flow measuring system having an ultrasonic fuel flow sensor. In one example aspect, the ultrasonic fuel flow sensor has at least two transducers, including a first transducer and a second transducer spaced from the first transducer. The first transducer is arranged to direct ultrasonic signals through fuel flowing through a conduit to the second transducer. The second transducer is arranged to direct ultrasonic signals through the fuel flowing through the conduit to the first transducer.

Notably, the inventors of the present disclosure have invented novel and nonobvious techniques for setting or updating one or more characteristics of excitation signals used to excite one transducer of a fuel flow sensor using information associated with another transducer. Particularly, the inventors have invented techniques for setting or updating one or more characteristics of one or more excitation signals directed to the second transducer based at least in part on a determined complex impedance spectrum associated with the first transducer. In this regard, a Signal to Noise Ratio (SNR) of ultrasonic signals emitted by the second transducer and received by the first transducer can be maximized or nearly maximized.

Specifically, to determine the complex impedance spectrum associated with the first transducer, the first transducer is excited at multiple different frequencies. When excited at the multiple different frequencies, the voltage and electric current at the first transducer is sensed and recorded. A phase difference between the voltage and the electric current is also recorded. Data points are generated based at least in part on the sensed data and a model is fit to the data points. Fitting the model to the data points allows for a minimum impedance to be determined, which corresponds to a peak resonance frequency associated with the first transducer. The complex impedance spectrum can be determined based at least in part on the peak resonance frequency associated with the first transducer. The determined complex impedance spectrum indicates a range of excitation frequencies at which it would be advantageous to excite the second transducer so as to maximize the SNR of ultrasonic signals emitted by the second transducer and received by the first transducer.

Such techniques can also be used to set or update one or more characteristics of one or more excitation signals directed to the first transducer so as to maximize the SNR of ultrasonic signals emitted by the first transducer and received by the second transducer. Characteristics of the excitation signals directed to the first and/or second transducers can be set and/or updated in real time or near real time. This may allow the fuel flow sensor to capture readings consistently and accurately despite changing conditions of the fuel flowing through the conduit. Such accuracy and consistency can lead to accurate fuel velocity readings, which can lead to accurate volumetric flow rate calculations. Accurate volumetric flow rate calculations can in turn lead to accurate fuel mass flow rate predictions.

Referring now to the drawings, wherein identical numerals indicate the same elements throughout the figures, FIG. 1 is a block diagram of an example fuel flow measuring system 100 according to at least some aspects of the present disclosure. The fuel flow measuring system 100 can be configured to measure the fuel flowing to an aircraft engine, for example. The fuel flow measuring system 100 includes one or more fuel flow sensors, including ultrasonic fuel flow sensor 200. The fuel flow measuring system 100 also includes an electronic box 110 that includes one or more processors 120 and one or more memory devices 130, such as one or more non-transitory computer readable medium.

The one or more processors 120 are communicatively coupled with the fuel flow sensor 200 and a database 140. The one or more processors 120 can receive and/or output data to the fuel flow sensor 200 and can receive and/or output data to the database 140. The database 140 can store various types of data, including, without limitation, information relating to frequency versus amplitude ratio graphs, K-factors, fuel density curves for various fuels, including, without limitation, Jet-A, JP-4, JP-5, JP-8, hydrogen (gas or liquid), Liquefied Natural Gas (LNG), sustainable aviation fuels (e.g., synthetic kerosene fuels), etc. The database 140 can also store information relating to a geometry of a conduit along which the fuel flow sensor 200 is positioned (e.g., the cross-sectional area of the conduit), the path length between transducers of the fuel flow sensor 200, etc. It will be appreciated that such information may also be stored on the one or more memory devices 130 of the electronic box 110. In some embodiments, optionally, the fuel flow measuring system 100 can include a fuel temperature sensor 180 for sensing a temperature of fuel flowing through a conduit and/or a fuel pressure sensor 190 for sensing a pressure of the fuel flowing through the conduit. Data from these sensors 180, 190 can be provided to the components of the electronic box 110.

Generally, the one or more processors 120 of the fuel flow measuring system 100 are configured to compute and output a mass flow rate 150 of fuel flowing through a conduit, such as a fuel line. For instance, the mass flow rate 150 can be output via a data bus to an electronic engine controller 160 associated with a gas turbine engine 170 as depicted in FIG. 1. The electronic engine controller 160 can utilize the mass flow rate 150 to control the gas turbine engine 170.

Figure 2:
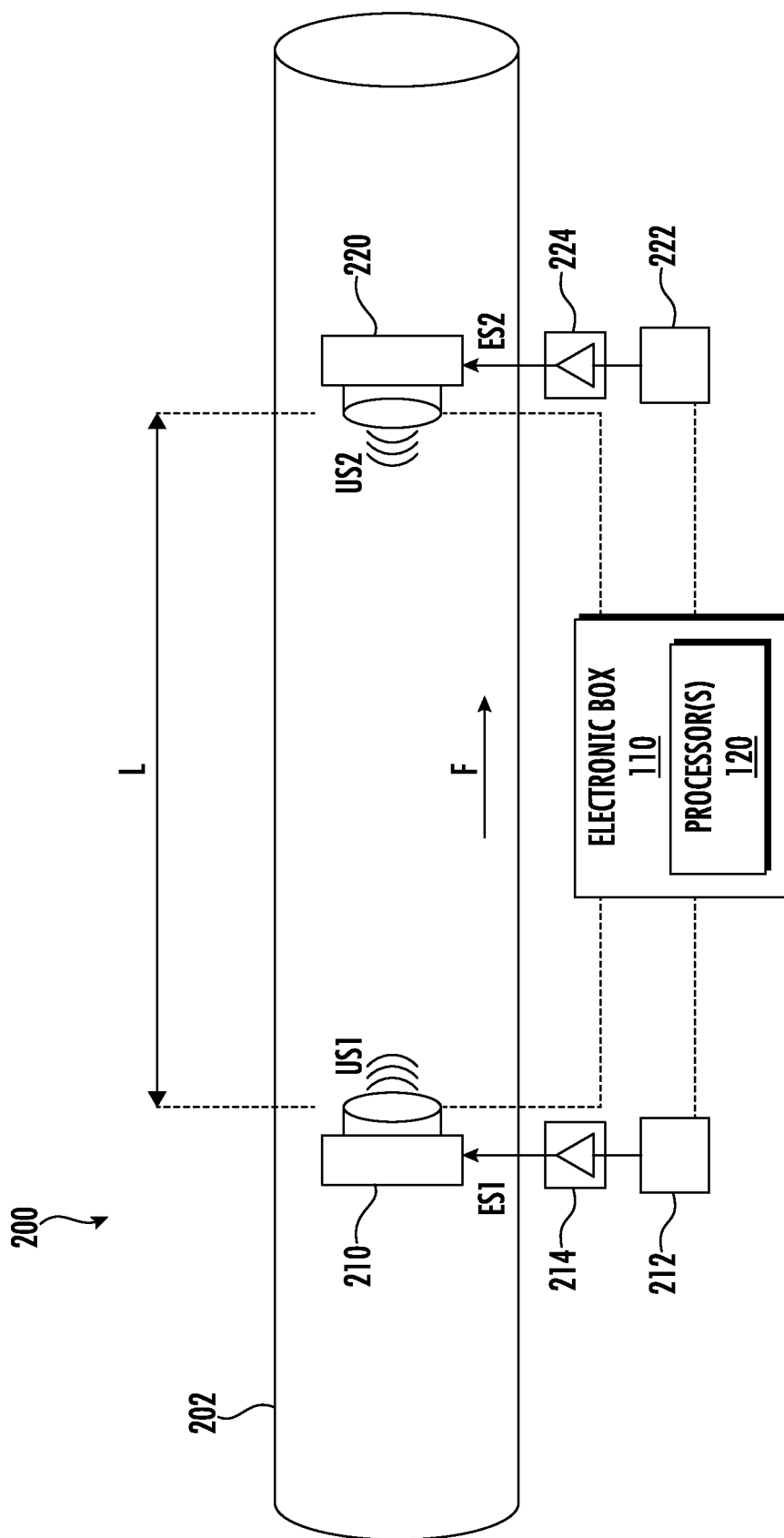
FIG. 2 is a schematic view of an ultrasonic fuel flow sensor of the fuel flow measuring system of FIG. 1.

FIG. 2 is a schematic view of the ultrasonic fuel flow sensor 200 of the fuel flow measuring system 100 of FIG. 1. As depicted, the ultrasonic fuel flow sensor 200 includes a first transducer 210 and a second transducer 220. The first transducer 210 and the second transducer 220 are positioned within a conduit 202 arranged to flow fuel therethrough. For this embodiment, the first transducer 210 is positioned upstream of the second transducer 220. In this regard, fuel flowing through the conduit 202 flows in a left-to-right direction in FIG. 2, denoted by arrow F. The first transducer 210 is spaced apart from the second transducer 220. Particularly, the first transducer 210 is spaced apart from the second transducer 220 by a length L, which is a distance spanning between the faces of the first transducer 210 and the second transducer 220. Moreover, for this embodiment, the first transducer 210 and the second transducer 220 are spaced apart from one another in a direction parallel to the flow axis of the fluid flowing through the conduit 202. The first transducer 210 and the second transducer 220 are generally aligned with the flow axis. In alternative embodiments, however, the first transducer 210 and the second transducer 220 need not be aligned with the axis of flow. For instance, in some embodiments, first transducer 210 and the second transducer 220 can be offset from the flow axis, e.g., so that first and second transducer 210, 220 operate on a diagonal with respect to the flow axis.

The first transducer 210 can be excited so as to direct ultrasonic signals US1 through the conduit 202. More specifically, the one or more processors 120 can cause a first signal generator 212 to generate and pulse one or more excitation signals ES1. The first signal generator 212 can include any suitable assortment of electronics for generating one or more excitation signals, including switches, transistors, gate drivers, etc. The first signal generator 212 can be electrically coupled with a suitable power source. Although the first signal generator 212 is shown as being separate from the electronic box 110, in alternative embodiments, the first signal generator 212 can be a component of the electronic box 110.

The excitation signals ES1 pulsed by the first signal generator 212 can be amplified by a driver 214, denoted schematically as an amplifier in FIG. 2. The driver 214 can include one or more amplifiers. The amplified excitation signals ES1 can be directed to the first transducer 210. The excitation signals ES1 can excite the active element(s) (e.g., a piezo or ferroelectric material) of the first transducer 210, causing the first transducer 210 to convert the electrical energy provided in the excitation signals ES1 into ultrasonic energy. In this way, the excitation signals ES1 cause the first transducer 210 to direct ultrasonic signals US1 through the fuel flowing through the conduit 202. For this embodiment, the first transducer 210 can be arranged to direct ultrasonic signals US1 downstream to the second transducer 220. In other embodiments, the first transducer 210 can be arranged to direct ultrasonic signals US1 at other objects within the conduit 202, such as at bubbles entrained within the fuel.

Similarly, the second transducer 220 can be excited so as to direct ultrasonic signals through the conduit 202. Particularly, the one or more processors 120 can cause a second signal generator 222 to generate and pulse one or more excitation signals ES2. The second signal generator 222 can include any suitable assortment of electronics for generating one or more excitation signals, including switches, transistors, gate drivers, etc. The second signal generator 222 can be electrically coupled with a suitable power source. Although the second signal generator 222 is shown as being separate from the electronic box 110, in alternative embodiments the second signal generator 222 can be a component of the electronic box 110. Further, in some embodiments, the first and second signal generators 212, 222 can be combined as a single unit.

The pulsed excitation signals ES2 can be amplified by a driver 224, denoted schematically as an amplifier in FIG. 2. The driver 224 can include one or more amplifiers. The amplified excitation signals ES2 can be directed to the second transducer 220. The amplified excitation signals ES2 can excite the active element(s) (e.g., a piezo or ferroelectric material) of the second transducer 220, causing the second transducer 220 to convert the electrical energy provided in the excitation signals ES2 into ultrasonic energy. In this way, the excitation signals ES2 cause the second transducer 220 to direct ultrasonic signals US2 through the fuel flowing through the conduit 202. For instance, the second transducer 220 can be arranged to direct ultrasonic signals US2 upstream to the first transducer 210. In other embodiments, the second transducer 220 can be arranged to direct ultrasonic signals US2 at other objects within the conduit 202.

A volumetric flow rate of the fuel flowing through the conduit 202 can be captured by the fuel flow sensor 200 in the following example manner. The time required for ultrasonic signals US1 emitted by the first transducer 210 to travel from the first transducer 210 to the second transducer 220 can be sensed and recorded. That is, the time-of-flight (TOF) of the ultrasonic signals US1 can be sensed and recorded. Likewise, the time required for ultrasonic signals US2 emitted by the second transducer 220 to travel from the second transducer 220 to the first transducer 210 can be sensed and recorded. That is, the TOF of the ultrasonic signals US2 can be sensed and recorded. The one or more processors 120 can determine an average speed of the ultrasonic signals US1 based at least in part on the recorded TOF of the ultrasonic signals US1 and the length L. Similarly, the one or more processors 120 can determine an average speed of the ultrasonic signals US2 based at least in part on the recorded TOF of the ultrasonic signals US2 and the length L. Generally, the average speeds are indicative of the speed of sound in the medium flowing through the conduit 202, which in this example is fuel.

With the average speeds determined, the one or more processors 120 can calculate a difference between the average speed of the ultrasonic signals US1 and the average speed of the ultrasonic signals US2. As will be appreciated, all other variables remaining constant, the average speed of the ultrasonic signals US1 will be faster than the average speed of the ultrasonic signals US2, namely because the ultrasonic signals US2 traverse upstream whereas the ultrasonic signals US1 traverse downstream through the fuel. The difference between the average speed of the ultrasonic signals US1 and the average speed of the ultrasonic signals US2 renders a fuel flow velocity of the fuel flowing through the conduit 202.

In other embodiments, an upstream TOF is compared directly to a downstream TOF to determine the fuel flow velocity without need to calculate and compare the average TOF or average velocity.

A volumetric flow rate of the fuel flowing through the conduit 202 can be determined by the one or more the one or more processors 120 based at least in part on the determined fuel flow velocity and a cross-sectional vector area of the conduit 202. The cross-sectional vector area of the conduit 202 may be known. The one or more processors 120 can then determine a mass flow rate of the fuel flowing through the conduit 202. The mass flow rate can be determined by the one or more processors 120 based at least in part on the determined volumetric flow rate and one or more known fuel properties and a fuel temperature and/or pressure. As depicted in FIG. 1, the mass flow rate 150 can be output by the one or more processors 120, e.g., to the electronic engine controller 160 associated with the gas turbine engine 170.

In accordance with the inventive aspects of the present disclosure, one or more characteristics of one or more excitation signals directed to a transducer can be set and/or updated in real time to maximize a Signal to Noise Ratio (SNR or S/N) of ultrasonic signals received by a transducer spaced from the excited transducer. Particularly, as will be explained in greater detail below, an excitation frequency, amplitude, and/or phase of one or more excitation signals directed to a first transducer can be set or updated in real time based at least in part on a complex impedance spectrum of a second transducer that receives ultrasonic signals from the first transducer. Similarly, an excitation frequency, amplitude, and/or phase of one or more excitation signals directed to a second transducer can be set or updated in real time based at least in part on a complex impedance spectrum of the first transducer that receives ultrasonic signals from the second transducer. Updating the excitation frequency, amplitude, and phase of excitation signals in real time may lead to consistently accurate readings (e.g., TOF readings associated with ultrasonic signals emitted by the transducers). Consequently, this may allow for more accurate volumetric flow estimates, which in turn allows for more accurate fuel mass flow rate predictions.

With reference to FIGS. 1 and 2, in one example aspect, the excitation frequency, amplitude, and phase of the excitation signals ES1 directed to the first transducer 210 can be set and/or updated in real time and the excitation frequency, amplitude, and phase of the excitation signals ES2 directed to the second transducer 220 can be set and updated in real time as well. Stated another way, the excitation signals ES1, ES2, directed to the first transducer 210 and the second transducer 220 can be tuned in real time to maximize the SNR of the ultrasonic signals US1, US2. One or more characteristics (e.g., frequency, amplitude, and/or phase) of the excitation signals ES1 and ES2 can be updated in the following example manner.

To commence the tuning or update process, the one or more processors 120 can cause the first transducer 210 to be excited at multiple frequencies one at a time. For instance, the one or more processors 120 can cause the first transducer 210 to be excited at a first excitation frequency at a first time, at a second excitation frequency at a second time, and at a third excitation frequency at a third time, wherein the first, second, and third excitation frequencies are different from one another and the times are different from one another. In other embodiments, the one or more processors 120 can cause the first transducer 210 to be excited at less than three excitation frequencies (e.g., two excitation frequencies) or more than three excitation frequencies (e.g., five excitation frequencies).

Figure 3:
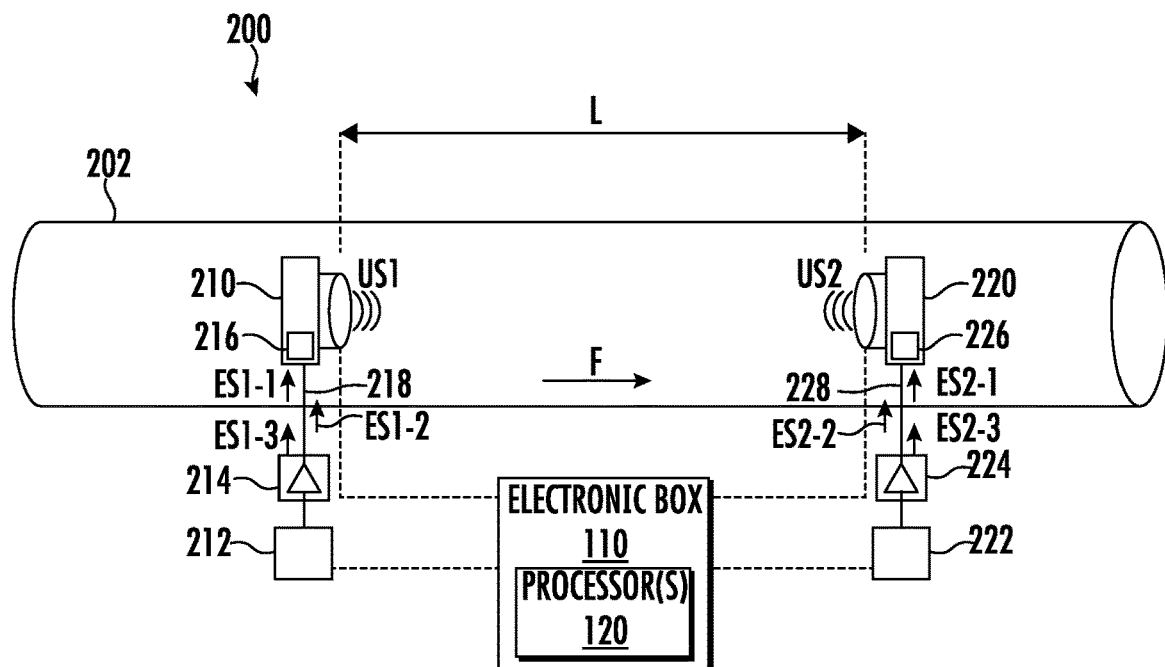
FIG. 3 is a schematic view of the ultrasonic fuel flow sensor of the fuel flow measuring system of FIG. 1 and depicts a first transducer and a second transducer being excited at multiple different frequencies one at a time.

By way of example, as depicted in FIG. 3, at a first time, the first signal generator 212 can be caused to generate and pulse a first excitation signal ES1-1 having a first excitation frequency, a first amplitude, and a first phase. At a second time, the first signal generator 212 can be caused to generate and pulse a second excitation signal ES1-2 having a second excitation frequency, a second amplitude, and a second phase. At a third time, the first signal generator 212 can be caused to generate and pulse a third excitation signal ES1-3 having a third excitation frequency, a third amplitude, and a third phase. The second time is later in time than the first time, and the third time is later in time than the second time. Each excitation signal ES1-1, ES1-2, ES1-3 may have a different amplitude or phase or they may be the same amplitude or phase.

Figure 4A:
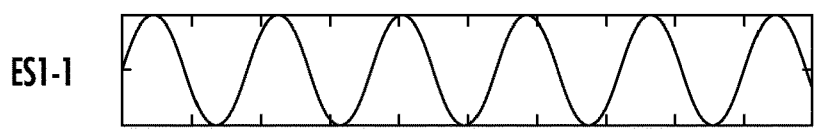
FIGS. 4A, 4B, 4C respectively depict a first excitation signal, a second excitation signal, and a third excitation signal used to excite the first transducer as depicted in FIG. 3.
Figure 4B:
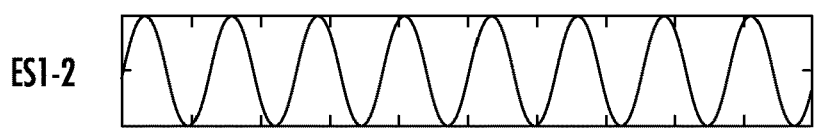
Figure 4C:
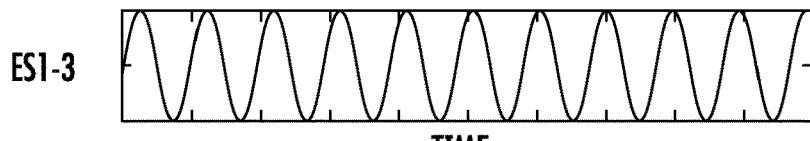

FIG. 4A depicts the first excitation signal ES1-1 having a first excitation frequency and first amplitude, FIG. 4B depicts the second excitation signal ES1-2 having a second excitation frequency and second amplitude, and FIG. 4C depicts the third excitation signal ES1-3 having a third excitation frequency and third amplitude. As shown, the frequencies of the first, second, and third excitation signals ES1-1, ES1-2, and ES1-3 are different from one another. The amplitudes of the first, second, and third excitation signals ES1-1, ES1-2, and ES1-3 are the same, although in other embodiments, they need not be. Moreover, as noted, each excitation signal ES1-1, ES1-2, ES1-3 has a phase, which may or may not be the same as one another.

Like the first transducer 210, the one or more processors 120 can cause the second transducer 220 to be excited at multiple frequencies one at a time. For instance, the one or more processors 120 can cause the first transducer 210 to be excited at a first excitation frequency at a first time, at a second excitation frequency at a second time, and at a third excitation frequency at a third time, wherein the first, second, and third excitation frequencies are different from one another and the times are different from one another. In other embodiments, the one or more processors 120 can cause the second transducer 220 to be excited at less than three excitation frequencies (e.g., two excitation frequencies) or more than three excitation frequencies (e.g., five excitation frequencies).

For example, as depicted in FIG. 3, at a first time, the second signal generator 222 can be caused to generate and pulse a first excitation signal ES2-1 having a first excitation frequency, a first amplitude, and a first phase. At a second time, the second signal generator 222 can be caused to generate and pulse a second excitation signal ES2-2 having a second excitation frequency, a second amplitude, and a second phase. At a third time, the second signal generator 222 can be caused to generate and pulse a third excitation signal ES2-3 having a third excitation frequency, a third amplitude, and a third phase. The second time is later in time than the first time, and the third time is later in time than the second time. As noted, the frequencies of the first, second, and third excitation signals ES2-1, ES2-2, ES2-3 are different from one another. The amplitudes of the first, second, and third excitation signals ES2-1, ES2-2, ES2-3 can be the same or different from one another. Moreover, the phases of the first, second, and third excitation signals ES2-1, ES2-2, ES2-3 can be the same or different from one another.

In some embodiments, the first transducer 210 can be excited at multiple different frequencies at one time or for a given excitation pulse. For instance, an excitation signal directed to the first transducer 210 can be a broadband signal transporting multiple excitation signals each having a different frequency. In this regard, an excitation signal can include a continuum of frequencies. In some instances, an excitation signal in the form of a broadband signal can be divided into specific frequency ranges so that the first transducer 210 can be excited at specific ranges of frequencies at particular times or for specific pulses. The second transducer 220 can likewise be excited at multiple different frequencies at one time or for a given excitation pulse.

When the first transducer 210 is excited at the multiple different excitation frequencies, an electric current, a voltage, and a phase difference between the electric current and the voltage at the first transducer 210 is sensed and recorded for each excitation frequency. Particularly, when the first transducer 210 is excited at the first excitation frequency, the electric current, voltage, and the phase difference at the first transducer 210 is sensed. When the first transducer 210 is excited at the second excitation frequency, the electric current, voltage, and the phase difference at the first transducer 210 is sensed. When the first transducer 210 is excited at the third excitation frequency, the electric current, voltage, and the phase difference at the first transducer 210 is sensed once again. The sensed electric current, voltage, and phase difference associated with each excitation frequency can be routed to the electronic box 110 to be stored, e.g., by the one or more memory devices 130 thereof.

The electric current, voltage, and phase difference between the electric current and the voltage can be sensed by a first sensor 216. The first sensor 216 can include any suitable assortment of components or circuitry to sense the electric current, voltage, and the phase difference at the first transducer 210. While the first sensor 216 is positioned onboard the first transducer 210 in FIG. 3 (e.g., mounted to or internal thereto), the first sensor 216 can be positioned anywhere along a first bus 218 that electrically connects the driver 214 and the first transducer 210. In this way, the first sensor 216 can sense the electric current, voltage, and the phase difference at the first transducer 210 regardless of whether the first sensor 216 is physically positioned onboard the first transducer 210. In some alternative embodiments, for example, the first sensor 216 can be positioned outside of the conduit 202 along the first bus 218 downstream of the driver 214.

Similarly, when the second transducer 220 is excited at the multiple different excitation frequencies, an electric current, a voltage, and a phase difference between the electric current and the voltage at the second transducer 220 is sensed and recorded for each excitation frequency. Particularly, when the second transducer 220 is excited at the first excitation frequency, the electric current, voltage, and the phase difference at the second transducer 220 is sensed. When the second transducer 220 is excited at the second excitation frequency, the electric current, voltage, and the phase difference at the second transducer 220 is sensed. When the second transducer 220 is excited at the third excitation frequency, the electric current, voltage, and the phase difference at the second transducer 220 is sensed once again. The sensed electric current, voltage, and phase difference associated with each excitation frequency can be routed to the electronic box 110 to be stored, e.g., by one or more memory devices thereof.

The electric current, voltage, and phase difference between the electric current and the voltage can be sensed by a second sensor 226. The second sensor 226 can include any suitable assortment of components or circuitry to sense the electric current, voltage, and the phase difference at the second transducer 220. While the second sensor 226 is positioned onboard the second transducer 220 in FIG. 3 (e.g., mounted to or internal thereto), the second sensor 226 can be positioned anywhere along a second bus 228 that electrically connects the driver 224 and the second transducer 220. In this way, the second sensor 226 can sense the electric current, voltage, and the phase difference at the second transducer 220 regardless of whether the second sensor 226 is physically positioned onboard the second transducer 220. In some alternative embodiments, for example, the second sensor 226 can be positioned outside of the conduit 202 along the second bus 228 electrically downstream of the driver 224. The first and second transducers 210, 220 can be excited by their respective excitation signals simultaneously or at a time offset.

Next, the one or more processors 120 can determine a complex impedance spectrum associated with the first transducer 210 and a complex impedance spectrum associated with the second transducer 220.

Particularly, the one or more processors 120 can determine the complex impedance spectrum associated with the first transducer 210 based at least in part on fitting a model to a first data set, wherein the first data set includes, for each excitation frequency at which the first transducer 210 is excited, i) a ratio indicating a relationship between a voltage and an electric current at the first transducer 210, and ii) a phase difference between the voltage and the electric current at the first transducer 210. The model can be a Butterworth Van-Dyke model or another suitable model, such as any suitable lumped-element electrical equivalent circuit model.

Figure 5:
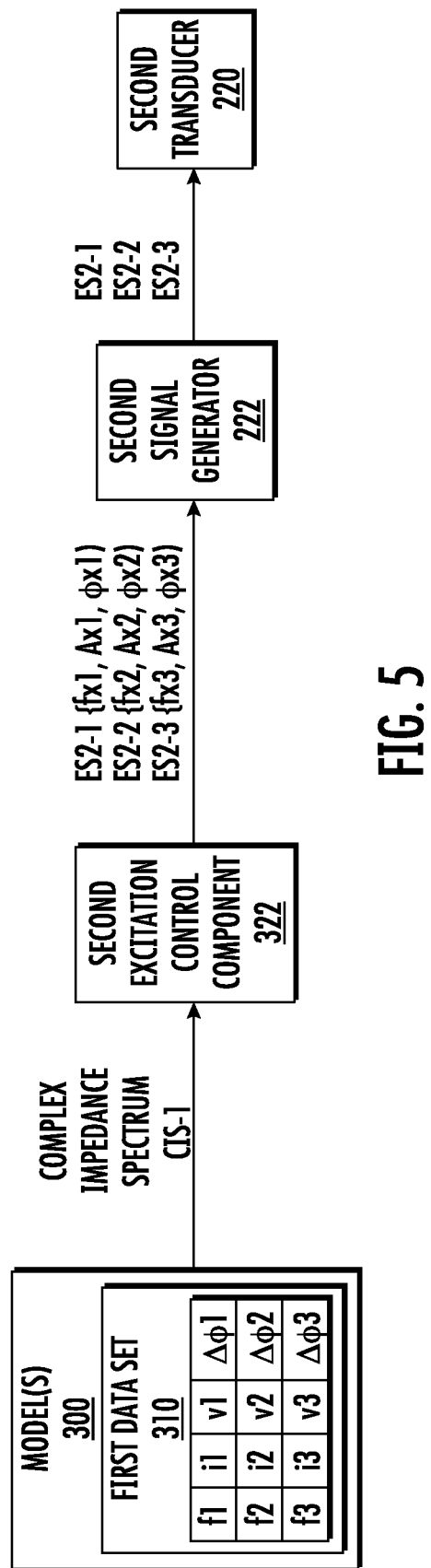
FIG. 5 is a flow diagram depicting an example manner in which excitation signals directed to the second transducer can be set or updated.
Figure 6:
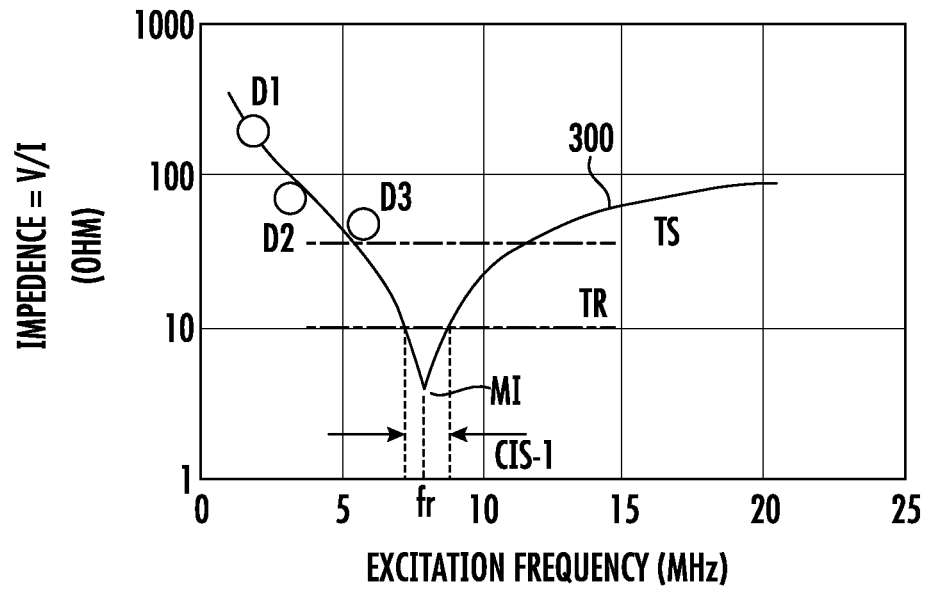
FIG. 6 is a graph depicting data points associated with a first data set plotted on a complex impedance versus excitation frequency graph and also shows a model fit to the data points.

For instance, with reference now to FIGS. 5 and 6 in addition to FIGS. 1 through 4, the one or more processors 120 can fit a model 300 to a first data set 310. For this example, the model 300 is a Butterworth Van-Dyke model. As depicted best in FIG. 5, the first data set 310 includes an electric current i1, a voltage v1, and a phase difference $\Delta\varphi1$ between the electric current i1 and the voltage v1 at the first transducer 210 when excited at the first excitation frequency f1, wherein the first excitation frequency f1 is the frequency of the first excitation signal ES1-1. The first data set 310 also includes an electric current i2, a voltage v2, and a phase difference $\Delta\varphi2$ between the electric current i2 and the voltage v2 at the first transducer 210 when excited at the second excitation frequency f2, wherein the second excitation frequency f2 is the frequency of the second excitation signal ES1-2. Further, the first data set 310 includes an electric current i3, a voltage v3, and a phase difference $\Delta\varphi3$ between the electric current i3 and the voltage v3 at the first transducer 210 when excited at the third excitation frequency f3, wherein the third excitation frequency f3 is the frequency of the third excitation signal ES1-3. In this regard, the first data set 310 includes or describes a ratio indicating a relationship between a voltage and an electric current at the first transducer 210 (i.e., a complex impedance) and a phase difference between the voltage and the electric current at the first transducer 210 for each excitation frequency at which the first transducer 210 is excited. The phase difference facilitates fitting of the model 300 to the first data set 310.

In fitting the model 300 to the first data set 310, the one or more processors 120 can generate data points based at least in part on the data of the first data set 310. Each data point is defined by a complex impedance and an excitation frequency. Particularly, for a given excitation frequency, a complex impedance can be calculated. For instance, the voltage v1 and the electric current i1 can be used to calculate a complex impedance associated with the first excitation frequency f1 to generate a first data point D1. The voltage v2 and the electric current i2 can be used to calculate a complex impedance associated with the second excitation frequency f2 to generate a second data point D2. In addition, the voltage v3 and the electric current i3 can be used to calculate a complex impedance associated with the third excitation frequency f3 to generate a third data point D3. In this way, a data point can be generated for each excitation frequency at which the first transducer 210 is excited.

With the data points D1, D2, D3 generated, the one or more processors 120 can fit the model 300 to the data points D1, D2, D3 as shown in FIG. 6. With the model 300 fit to the first data set 310, or more particularly to the data points D1, D2, D3, the one or more processors 120 can determine the complex impedance spectrum CIS-1 associated with the first transducer 210. Generally, the complex impedance spectrum CIS-1 indicates a range of excitation frequencies at which one or more excitation frequencies may be set to excite the second transducer 220 so as to maximize the SNR of the ultrasonic signals US1 received by the second transducer 220.

In some embodiments, in determining the complex impedance spectrum CIS-1 associated with the first transducer 210 based at least in part on fitting the model 300 to the first data set 310, the one or more processors 120 are configured to determine a peak resonance frequency fr associated with the first transducer 210. The phase difference at the peak resonance frequency fr associated with the first transducer 210 is at or nearly zero. As depicted in FIG. 6, the peak resonance frequency fr is approximately 8 MHz in this example embodiment. The one or more processors 120 can determine the peak resonance frequency fr by determining which frequency corresponds with a minimum impedance MI. That is, fitting the model 300 to the data points D1, D2, D3 allows the one or more processors 120 to determine the minimum impedance MI, and as noted, the frequency corresponding to the minimum impedance MI is the peak resonance frequency fr associated with the first transducer 210.

In some embodiments, the model 300 is fit to the data points D1, D2, D3 so that the minimum impedance MI, and consequently the peak resonance frequency fr, is within a predetermined design range of a designed resonance frequency of the first transducer 210. In some instances, the first transducer 210 may have more than one natural or resonance frequencies, and in such instances, the resonance frequency of interest is a preselected or designed peak resonance frequency of the first transducer 210. Accordingly, the model 300 is intelligently fit according to such constraints.

After determining the peak resonance frequency fr associated with the first transducer 210, the one or more processors 120 can determine a range of excitation frequencies within a predetermined range of the peak resonance frequency fr. The range of excitation frequencies within the predetermined range of the peak resonance frequency fr corresponds to the complex impedance spectrum CIS-1 associated with the first transducer 210. In some example embodiments, the predetermined range can be set as a fixed range. As one example, the predetermined range can include frequencies being within 2 MHz of the peak resonance frequency. As another example, the predetermined range can include frequencies being within 1 MHz of the peak resonance frequency.

In other example embodiments, the predetermined range can be set based at least in part on a receiving threshold TR. The receiving threshold TR can be set at any suitable preselected impedance value. In FIG. 6, for example, the receiving threshold TR is set at 10 ohms. Impedance values less than or equal to 10 ohms are considered less than or equal to the receiving threshold TR. The receiving threshold TR can instruct how a lower bound and an upper bound of the predetermined range can be set. As one example, a frequency, which is less than the peak resonance frequency fr, corresponding to a first instance at which the model 300 intersects the receiving threshold TR can be set as the frequency corresponding to the lower bound of the predetermined range, e.g., approximately 7 MHz in FIG. 6. Moreover, a frequency, which is greater than the peak resonance frequency fr, corresponding to a first instance at which the model 300 intersects the receiving threshold TR can be set as the frequency corresponding to the upper bound of the predetermined range, e.g., approximately 9 MHz in FIG. 6. Accordingly, for this embodiment, the complex impedance spectrum CIS-1 would correspond with a range spanning from 7 MHz to 9 MHz.

In yet other example embodiments, the one or more processors 120 can set a sending threshold TS associated with the second transducer 220. The sending threshold TS can be set at any suitable preselected impedance value. In FIG. 6, for example, the sending threshold TS is set at approximately 50 ohms. Impedance values less than or equal to 50 ohms are considered less than or equal to the sending threshold TS. The sending threshold TS can provide the upper bound for suitable impedance at the second transducer 220. Accordingly, excitation frequencies that cause the impedance at the second transducer 220 to exceed the sending threshold TS are not selected as frequencies that may be included in the complex impedance spectrum CIS-1.

As noted above, the one or more processors 120 can determine a complex impedance spectrum associated with the second transducer 220. Generally, the complex impedance spectrum associated with the second transducer 220 can be determined in the same or similar manner as described above with respect to determining the complex impedance spectrum associated with the first transducer 210. Specifically, the one or more processors 120 can determine the complex impedance spectrum associated with the second transducer 220 based at least in part on fitting a model to a second data set, wherein the second data set includes, for each excitation frequency at which the second transducer 220 is excited, i) a ratio indicating a relationship between a voltage and an electric current at the second transducer 220, and ii) a phase difference between the voltage and the electric current at the second transducer 220. The model can be a Butterworth Van-Dyke model or another suitable model, such as any suitable lumped-element electrical equivalent circuit model. In some embodiments, the model 300 associated with the first transducer 210 can be specifically designed for the first transducer 210 and the model associated with the second transducer 220 can be specifically designed for the second transducer 220. In other embodiments, the same model can be used for both the first and second transducers 210, 220.

Figure 8:
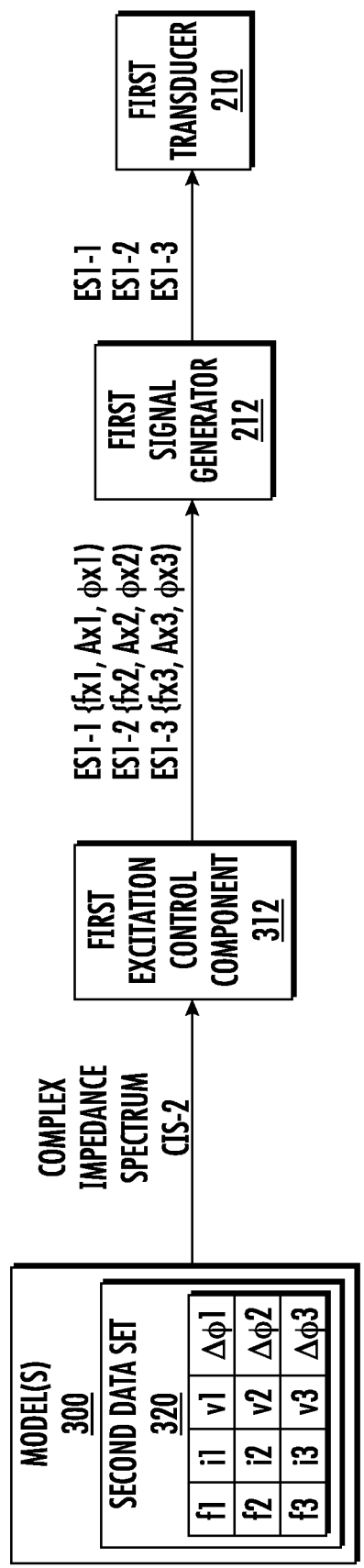
FIG. 8 is a flow diagram depicting an example manner in which excitation signals directed to the first transducer can be set or updated.

With reference now to FIG. 8 in addition to FIGS. 1 through 4, the one or more processors 120 can fit the model 300 to a second data set 320. As depicted best in FIG. 8, the second data set 320 includes an electric current i1, a voltage v1, and a phase difference $\Delta\varphi1$ between the electric current i1 and the voltage v1 at the second transducer 220 when excited at the first excitation frequency f1, wherein the first excitation frequency f1 is the frequency of the first excitation signal ES2-1. The second data set 320 also includes an electric current i2, a voltage v2, and a phase difference $\Delta\varphi2$ between the electric current i2 and the voltage v2 at the second transducer 220 when excited at the second excitation frequency f2, wherein the second excitation frequency f2 is the frequency of the second excitation signal ES2-2. Further, the second data set 320 includes an electric current i3, a voltage v3, and a phase difference $\Delta\varphi3$ between the electric current i3 and the voltage v3 at the second transducer 220 when excited at the third excitation frequency f3, wherein the third excitation frequency f3 is the frequency of the third excitation signal ES2-3. In this regard, the second data set 320 includes or describes a ratio indicating a relationship between a voltage and an electric current at the second transducer 220 (i.e., a complex impedance) and a phase difference between the voltage and the electric current at the second transducer 220 for each excitation frequency at which the second transducer 220 is excited.

In fitting the model 300 to the second data set 320, the one or more processors 120 can generate data points based at least in part on the data of the second data set 320. Each data point is defined by a complex impedance and an excitation frequency. Particularly, for a given excitation frequency, a complex impedance can be calculated. For instance, the voltage v1 and the electric current i1 can be used to calculate a complex impedance associated with the first excitation frequency f1 to generate a first data point D1. The voltage v2 and the electric current i2 can be used to calculate a complex impedance associated with the second excitation frequency f2 to generate a second data point D2. In addition, the voltage v3 and the electric current i3 can be used to calculate a complex impedance associated with the third excitation frequency f3 to generate a third data point D3. In this way, a data point can be generated for each excitation frequency at which the second transducer 220 is excited. The phase difference facilitates fitting of the model 300 to the second data set 320.

Figure 9:
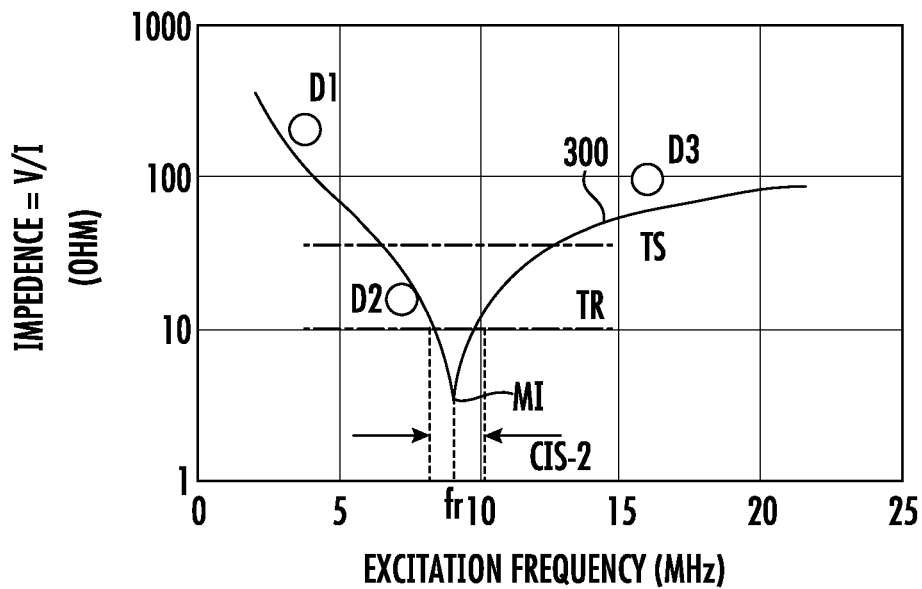
FIG. 9 is a graph depicting data points associated with a second data set plotted on a complex impedance versus excitation frequency graph and also shows a model fit to the data points.

With the data points D1, D2, D3 generated, the one or more processors 120 can fit the model 300 to the data points D1, D2, D3 as shown in FIG. 9. With the model 300 fit to the second data set 320, or more particularly to the data points D1, D2, D3, the one or more processors 120 can determine the complex impedance spectrum CIS-2 associated with the second transducer 220. Generally, the complex impedance spectrum CIS-2 indicates a range of excitation frequencies at which one or more excitation frequencies may be set to excite the first transducer 210 so as to maximize the SNR of the ultrasonic signals US2 received by the first transducer 210.

In some embodiments, in determining the complex impedance spectrum CIS-2 associated with the second transducer 220 based at least in part on fitting the model 300 to the second data set 320, the one or more processors 120 are configured to determine a peak resonance frequency fr associated with the second transducer 220. The phase difference at the peak resonance frequency fr associated with the second transducer 220 is at or nearly zero. As depicted in FIG. 9, the peak resonance frequency fr is approximately 9 MHz in this example embodiment. The one or more processors 120 can determine the peak resonance frequency fr by determining which frequency corresponds with a minimum impedance MI. That is, fitting the model 300 to the data points D1, D2, D3 allows the one or more processors 120 to determine the minimum impedance MI, and as noted, the frequency corresponding to the minimum impedance MI is the peak resonance frequency fr associated with the second transducer 220.

In some embodiments, the model 300 is fit to the data points D1, D2, D3 so that the minimum impedance MI, and consequently the peak resonance frequency fr, is within a predetermined design range of a designed resonance frequency of the second transducer 220. In some instances, the second transducer 220 may have more than one natural or resonance frequencies, and in such instances, the resonance frequency of interest is a preselected or designed peak resonance frequency of the second transducer 220. Accordingly, the model 300 is intelligently fit according to such constraints.

After determining the peak resonance frequency fr associated with the second transducer 220, the one or more processors 120 can determine a range of excitation frequencies within a predetermined range of the peak resonance frequency fr. The range of excitation frequencies within the predetermined range of the peak resonance frequency fr corresponds to the complex impedance spectrum CIS-2 associated with the second transducer 220. In some example embodiments, the predetermined range can be set as a fixed range. As one example, the predetermined range can include frequencies being within 2 MHz of the peak resonance frequency. As another example, the predetermined range can include frequencies being within 1 MHz of the peak resonance frequency.

In other example embodiments, the predetermined range can be set based at least in part on a receiving threshold TR. The receiving threshold TR can be set at any suitable impedance value. In FIG. 9, for example, the receiving threshold TR is set at 10 ohms. Impedance values less than or equal to 10 ohms are considered less than or equal to the receiving threshold TR. The receiving threshold TR can instruct how a lower bound and an upper bound of the predetermined range can be set. As one example, a frequency, which is less than the peak resonance frequency fr, corresponding to a first instance at which the model 300 intersects the receiving threshold TR can be set as the frequency corresponding to the lower bound of the predetermined range, e.g., approximately 8 MHz in FIG. 9. Moreover, a frequency, which is greater than the peak resonance frequency fr, corresponding to a first instance at which the model 300 intersects the receiving threshold TR can be set as the frequency corresponding to the upper bound of the predetermined range, e.g., approximately 10 MHz in FIG. 9. Accordingly, for this embodiment, the complex impedance spectrum CIS-2 corresponds with a range spanning from 8 MHz to 10 MHz.

In yet other example embodiments, the one or more processors 120 can set a sending threshold TS associated with the first transducer 210. The sending threshold TS can be set at any suitable preselected impedance value. In FIG. 9, for example, the sending threshold TS is set at approximately 50 ohms. Impedance values less than or equal to 50 ohms are considered less than or equal to the sending threshold TS. The sending threshold TS can provide the upper bound for suitable impedance at the first transducer 210. Accordingly, excitation frequencies that cause the impedance at the first transducer 210 to exceed the sending threshold TS are not selected as frequencies that may be included in the complex impedance spectrum CIS-2.

The determined complex impedance spectrum CIS-1 associated with the first transducer 210 can be used to set or update excitation signals directed to the second transducer 220 and the determined complex impedance spectrum CIS-2 associated with the second transducer 220 can be used to set or update excitation signals directed to the first transducer 210.

Particularly, the one or more processors 120 can set or update one or more characteristics of one or more excitation signals to be directed to the second transducer 220 based at least in part on the complex impedance spectrum CIS-1 associated with the first transducer 210. Similarly, the one or more processors 120 can set or update one or more characteristics of one or more excitation signals to be directed to the first transducer 210 based at least in part on the complex impedance spectrum CIS-2 associated with the second transducer 220.

For instance, as shown best in FIG. 5, the output of fitting the model 300 to the first data set 310 is the complex impedance spectrum CIS-1, which as noted above, indicates a range of excitation frequencies at which one or more excitation frequencies may be set to excite the second transducer 220 so as to maximize the SNR of the ultrasonic signals US2 received by the first transducer 210. As depicted, the complex impedance spectrum CIS-1 is input into a second excitation control component 322. The second excitation control component 322 can be a set of computer-readable instructions or logic that can be executed by the one or more processors 120. Upon executing the second excitation control component 322, the one or more processors 120 can set one or more characteristics of one or more excitation signals to be directed to the second transducer 220.

Specifically, in executing the second excitation control component 322, the one or more processors 120 can set an excitation frequency fx1, an amplitude Ax1, and a phase φx1 for a first excitation signal ES2-1 to be directed to the second transducer 220. The one or more processors 120 can set an excitation frequency fx2, an amplitude Ax1, and a phase φx2 for a second excitation signal ES2-2 to be directed to the second transducer 220. Also, the one or more processors 120 can set an excitation frequency fx3, an amplitude Ax3, and a phase φx3 for a third excitation signal ES2-3 to be directed to the second transducer 220. The excitation frequencies fx1, fx2, fx3 of the excitation signals ES2-1, ES2-2, ES2-3 can each be frequencies within the complex impedance spectrum CIS-1 associated with the first transducer 210. Thus, the excitation frequencies fx1, fx2, fx3 of the excitation signals ES2-1, ES2-2, ES2-3 can be at or within a range spanning from 7 to 9 MHz (i.e., the complex impedance spectrum CIS-1 depicted in FIG. 6). The characteristics for the excitation signals ES2-1, ES2-2, and ES2-3 can be input into the second signal generator 222. The second signal generator 222 can generate excitation signals ES2-1, ES2-2, and ES2-3 having the noted characteristics. The generated excitation signals ES2-1, ES2-2, and ES2-3 can be amplified by the driver 224 (FIG. 3) and directed to the second transducer 220.

As noted, the one or more processors 120 can set or update one or more characteristics of one or more excitation signals to be directed to the first transducer 210 based at least in part on the complex impedance spectrum CIS-2 associated with the second transducer 220.

For instance, as shown best in FIG. 8, the output of fitting the model 300 to the second data set 320 is the complex impedance spectrum CIS-2, which as noted above, indicates a range of excitation frequencies at which one or more excitation frequencies may be set to excite the first transducer 210 so as to maximize the SNR of the ultrasonic signals US1 received by the second transducer 220. As depicted, the complex impedance spectrum CIS-2 is input into a first excitation control component 312. The first excitation control component 312 can be a set of computer-readable instructions or logic that can be executed by the one or more processors 120. Upon executing the first excitation control component 312, the one or more processors 120 can set one or more characteristics of one or more excitation signals to be directed to the first transducer 210.

Specifically, in executing the first excitation control component 312, the one or more processors 120 can set an excitation frequency fx1, an amplitude Ax1, and a phase φx1 for a first excitation signal ES1-1 to be directed to the first transducer 210. The one or more processors 120 can set an excitation frequency fx2, an amplitude Ax1, and a phase φx2 for a second excitation signal ES1-2 to be directed to the first transducer 210. Also, the one or more processors 120 can set an excitation frequency fx3, an amplitude Ax3, and a phase φx3 for a third excitation signal ES1-3 to be directed to the first transducer 210. The excitation frequencies fx1, fx2, fx3 of the excitation signals ES1-1, ES1-2, ES1-3 can each be frequencies within the complex impedance spectrum CIS-2 associated with the second transducer 220. Thus, the excitation frequencies fx1, fx2, fx3 of the excitation signals ES1-1, ES1-2, ES1-3 can be at or within a range spanning from 8 to 10 MHz (i.e., the complex impedance spectrum CIS-2 depicted in FIG. 9). The characteristics for the excitation signals ES1-1, ES1-2, and ES1-3 can be input into the first signal generator 212. The first signal generator 212 can generate the excitation signals ES1-1, ES1-2, and ES1-3 having the noted characteristics. The generated excitation signals ES1-1, ES1-2, and ES1-3 can be amplified by the driver 214 (FIG. 3) and directed to the first transducer 210.

In some embodiments, in executing the second excitation control component 322, the one or more processors 120 can set the frequency of at least one excitation signal ES2-1, ES2-2, ES2-3 directed to the second transducer 220 at the peak resonance frequency fr associated with the first transducer 210 (e.g., the peak resonance frequency fr depicted in FIG. 6). In addition, in some embodiments, the one or more processors 120 can set the frequency of at least one excitation signal ES2-1, ES2-2, ES2-3 directed to the second transducer 220 to be less than the peak resonance frequency fr associated with the first transducer 210 and at least one excitation signal ES2-1, ES2-2, ES2-3 directed to the second transducer 220 to be greater than the peak resonance frequency fr associated with the first transducer 210.

Similarly, in some embodiments, in executing the first excitation control component 312, the one or more processors 120 can set the frequency of at least one excitation signal ES1-1, ES1-2, ES1-3 directed to the first transducer 210 at the peak resonance frequency fr associated with the second transducer 220 (e.g., the peak resonance frequency fr depicted in FIG. 9). In addition, in some embodiments, the one or more processors 120 can set the frequency of at least one excitation signal ES1-1, ES1-2, ES1-3 directed to the first transducer 210 to be less than the peak resonance frequency fr associated with the second transducer 220 and at least one excitation signal ES1-1, ES1-2, ES1-3 directed to the first transducer 210 to be greater than the peak resonance frequency fr associated with the second transducer 220.

In some further embodiments, in executing the second excitation control component 322, the one or more processors 120 can set the frequency of at least one excitation signal ES2-1, ES2-2, ES2-3 directed to the second transducer 220 based at least in part on the complex impedance associated with the driver 214 and/or first signal generator 212 and/or other electrical components or circuitry electrically upstream of the first transducer 210 in addition to the complex impedance spectrum CIS-1 associated with the first transducer 210. In such embodiments, as one example, the impedance associated with the driver 214 can be determined during calibration and input into the system 100 as a known constant. The known impedance can ultimately be used to adjust the complex impedance spectrum CIS-1 and/or the model 300.

As another example, a sensor can sense the electric current and voltage at the driver 214 as well as a phase difference between the electric current and voltage when the first transducer 210 is excited at a given excitation frequency. The sensed readings can be used to generate data points, and a model can be fit to the data points, e.g., as described above. The model can be a Butterworth Van-Dyke model, for example. The complex impedance spectrum associated with the driver 214 can then be determined, e.g., in a manner described above. The one or more processors 120 can set or update one or more characteristics of the one or more excitation signals to be directed to the second transducer 220 based at least in part on the complex impedance spectrum associated with the driver 214 in addition to the complex impedance spectrum CIS-1 associated with the first transducer 210.

Similarly, in some embodiments, in executing the first excitation control component 312, the one or more processors 120 can set the frequency of at least one excitation signal ES1-1, ES1-2, ES1-3 directed to the first transducer 210 based at least in part on the complex impedance associated with the driver 224 and/or second signal generator 222 and/or other electrical components or circuitry electrically upstream of the second transducer 220 in addition to the complex impedance spectrum CIS-2 associated with the second transducer 220. In such embodiments, as one example, the impedance associated with the driver 224 can be determined during calibration and input into the system 100 as a known constant. The known impedance can ultimately be used to adjust the complex impedance spectrum CIS-2 and/or the model 300.

As another example, a sensor can sense the electric current and voltage at the driver 224 as well as a phase difference between the electric current and voltage when the second transducer 220 is excited at a given excitation frequency. The sensed readings can be used to generate data points, and a model can be fit to the data points, e.g., as described above. The model can be a Butterworth Van-Dyke model, for example. The complex impedance spectrum associated with the driver 224 can then be determined, e.g., in a manner described above. The one or more processors 120 can set or update one or more characteristics of the one or more excitation signals to be directed to the first transducer 210 based at least in part on the complex impedance spectrum associated with the driver 224 in addition to the complex impedance spectrum CIS-2 associated with the second transducer 220.

After the one or more processors 120 set or update one or more characteristics of the one or more excitation signals ES2 to be directed to the second transducer 220 based at least in part on the complex impedance spectrum CIS-1 associated with the first transducer 210, the one or more processors 120 can cause the second transducer 220 to be excited by the one or more second excitation signals ES2 so that the second transducer 220 directs the ultrasonic signals US2 at or to the first transducer 210. In some embodiments, the one or more second excitation signals ES2 directed to the second transducer 220 can cause the second transducer 220 to be excited at multiple excitation frequencies, e.g., fx1 of ES2-1, fx2 of ES2-2, and fx3 of ES2-3 depicted in FIG. 5. The multiple excitation frequencies at which the second transducer 220 is excited can each be within a predetermined range of a peak resonance frequency fr associated with the first transducer 210 at a previous time step.

Figure 7:
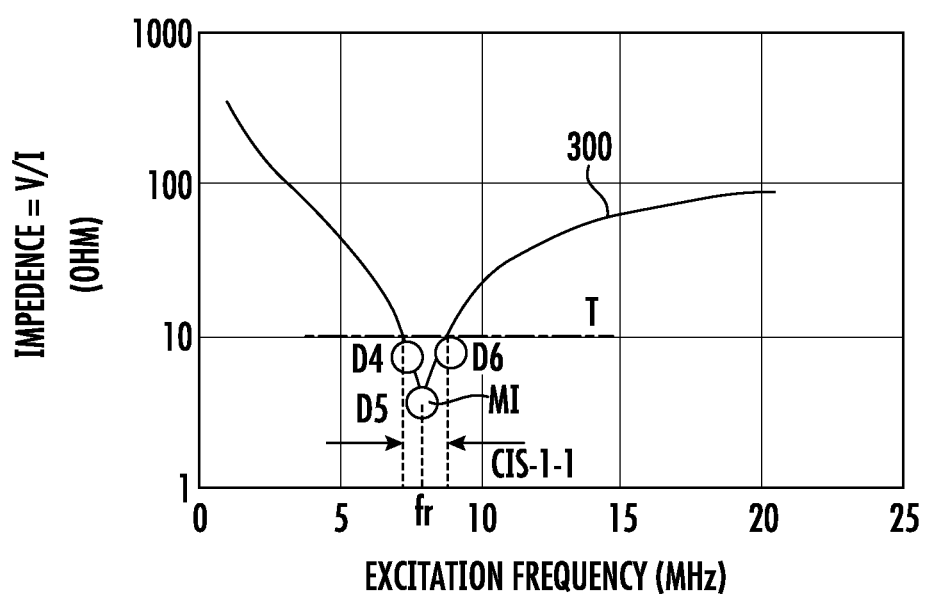
FIG. 7 is a graph depicting data points associated with a subsequent first data set plotted on a complex impedance versus excitation frequency graph and also shows a model fit to the data points associated with the subsequent first data set.

For instance, FIG. 7 depicts the model 300 fit to data points D4, D5, D6 at a time step subsequent to the time step associated with the model 300 fit to data points D1, D2, D3 of FIG. 6. Data points D4, D5, D6 are associated with a subsequent first data set, wherein the data recorded associated with the subsequent first data set is sensed when the second transducer 220 is excited by the set excitation frequencies fx1, fx2, fx3 of the excitation signals ES2-1, ES2-2, ES2-3 as depicted in FIG. 5. Notably, the second transducer 220 is excited as depicted in FIG. 5 at the set excitation frequencies fx1, fx2, fx3 of the excitation signals ES2-1, ES2-2, ES2-3 so that the excitation frequencies associated with data points D4, D5, and D6 are each within a predetermined range of the peak resonance frequency fr associated with the first transducer 210 at a previous time step. Particularly, as shown in FIG. 7, data points D4, D5, and D6 are each within the predetermined range of the peak resonance frequency fr associated with the first transducer 210 (i.e., within the complex impedance spectrum CIS-1) of the previous time step. Setting or updating the excitation frequencies used to excite the second transducer 220 in such a manner allows the first transducer 210 to receive ultrasonics signals at or near its peak resonance frequency fr, which consequently maximizes the voltage at the first transducer 210 when such ultrasonic signals US2 are received. This facilitates accurate sensor readings.

In a similar manner, after the one or more processors 120 set or update one or more characteristics of the one or more excitation signals ES1 to be directed to the first transducer 210 based at least in part on the complex impedance spectrum CIS-2 associated with the second transducer 220, the one or more processors 120 can cause the first transducer 210 to be excited by the one or more first excitation signals ES1 so that the first transducer 210 directs the ultrasonic signals US1 at or to the second transducer 220. In some embodiments, as noted above, the one or more first excitation signals ES1 directed to the first transducer 210 can cause the first transducer 210 to be excited at multiple excitation frequencies, e.g., fx1 of ES1-1, fx2 of ES1-2, and fx3 of ES1-3 depicted in FIG. 8. The multiple excitation frequencies at which the first transducer 210 is excited can each be within a predetermined range of a peak resonance frequency fr associated with the second transducer 220 at the previous time step.

Figure 10:
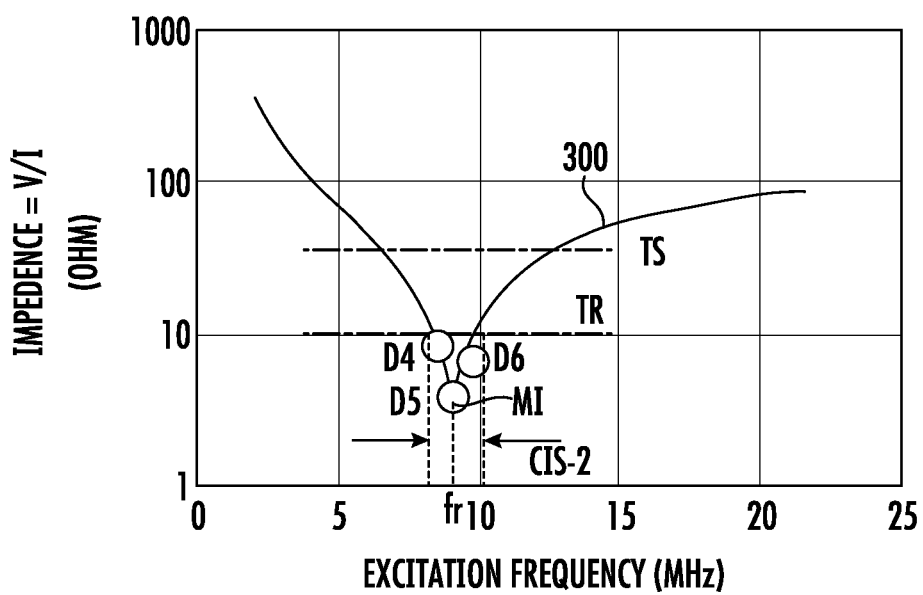
FIG. 10 is a graph depicting data points associated with a subsequent second data set plotted on a complex impedance versus excitation frequency graph and also shows the model fit to the data points associated with the subsequent second data set.

For instance, FIG. 10 depicts the model 300 fit to data points D4, D5, D6 at a time step subsequent to the time step associated with the model 300 fit to data points D1, D2, D3 of FIG. 9. Data points D4, D5, D6 are associated with a subsequent second data set, wherein the data recorded associated with the subsequent second data set is sensed when the first transducer 210 is excited by the set excitation frequencies fx1, fx2, fx3 of the excitation signals ES1-1, ES1-2, ES1-3 as depicted in FIG. 8. Notably, the first transducer 210 is excited as depicted in FIG. 8 at the set excitation frequencies fx1, fx2, fx3 of the excitation signals ES1-1, ES1-2, ES1-3 so that the excitation frequencies associated with data points D4, D5, and D6 are each within a predetermined range of the peak resonance frequency fr associated with the second transducer 220 at the previous time step. Particularly, as shown in FIG. 10, data points D4, D5, and D6 are each within the predetermined range of the peak resonance frequency fr associated with the second transducer 220 (i.e., within the complex impedance spectrum CIS-2) of the previous time step. Setting or updating the excitation frequencies used to excite the first transducer 210 in such a manner allows the second transducer 220 to receive ultrasonics signals US1 at or near its peak resonance frequency fr, which consequently maximizes the voltage at the second transducer 220 when such ultrasonic signals US1 are received. This facilitates accurate sensor readings.

The above-noted process for setting one or more characteristics of one or more excitation signals to be directed to a transducer can be iteratively repeated so that a sending transducer is continuously excited in such a way that the SNR of ultrasonic signals received by the receiving transducer are maximized or at least close to being maximized. That is, continuously updating the characteristics of the excitation signals directed to a sending transducer based on the complex impedance spectrum of the receiving transducer allows the voltage at the receiving transducer to be maximized or at least close to being maximized when ultrasonic signals sent by the sending transducer are received by the receiving transducer. Indeed, the above-noted technique can be iteratively repeated continuously so that one or more characteristics of one or more excitation signals to be directed to a sending transducer is set and/or updated in real time. This allows for one or more characteristics of the one or more excitation signals to be directed to a sending transducer to be optimally set despite changing conditions and/or characteristics of the fuel flowing through the conduit in which the sending and receiving transducers are arranged.

Figure 11:
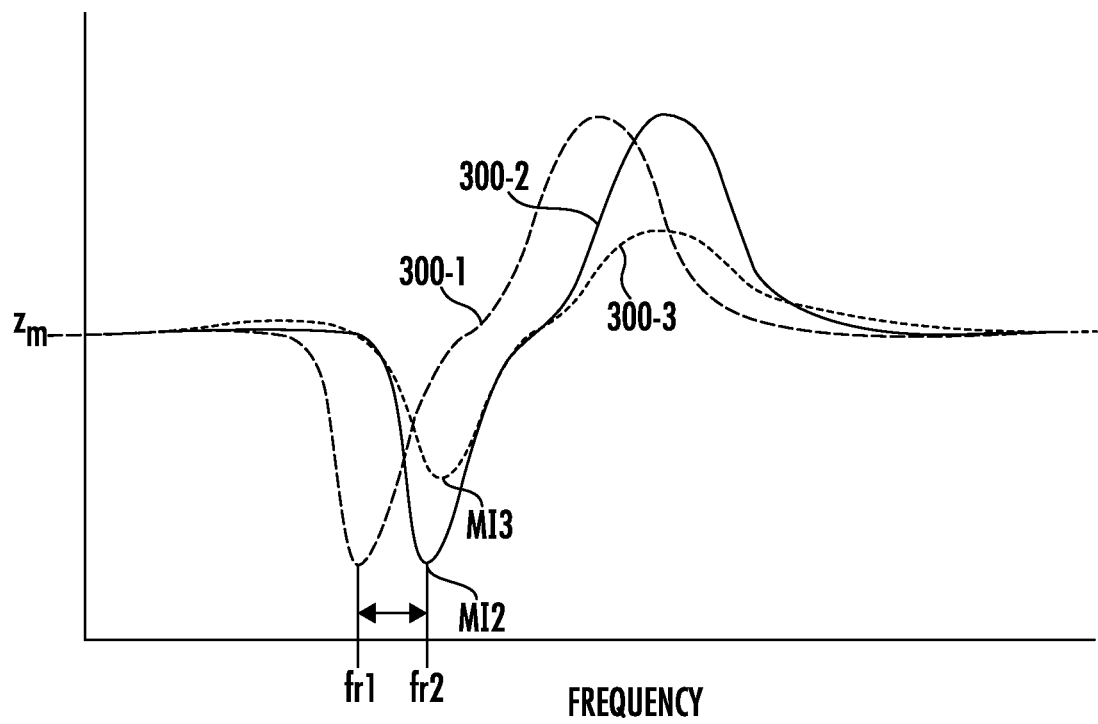
FIG. 11 is a graph depicting an example manner in which a model can be shifted or fit based on changing conditions of the fuel flowing through the conduit.

For instance, as shown in FIG. 11, the model is shown at three different time steps. The model is fit at one time step as represented by 300-1, at another time step as represented by 300-2, and at a further time step as represented by 300-3. As shown, changes in temperature of the fuel can cause the peak resonance frequency associated with a transducer to shift. An increase in the temperature of the fuel can cause the peak resonance frequency to increase, e.g., the model at 300-1 can shift to the right to 300-2 and the peak resonance frequency can shift from fr1 to fr2 accordingly. In contrast, a decrease in the temperature of the fuel can cause the peak resonance frequency to decrease. In addition, changes in pressure of the fuel can cause the minimum impedance to change. For instance, an increase in pressure can cause the minimum impedance to increase, e.g., the minimum impedance MI2 of the model at 300-2 can shift upward to MI3 when the model is shifted to 300-3. In contrast, a decrease in pressure can cause the minimum impedance to decrease. Accordingly, iteratively updating the excitation frequency and amplitude of the excitation signals directed to the sending transducer based on the complex impedance spectrum of the receiving transducer can account for such changing conditions, which ultimately allows for more accurate and consistent fuel mass flow rate predictions.

Figure 12:
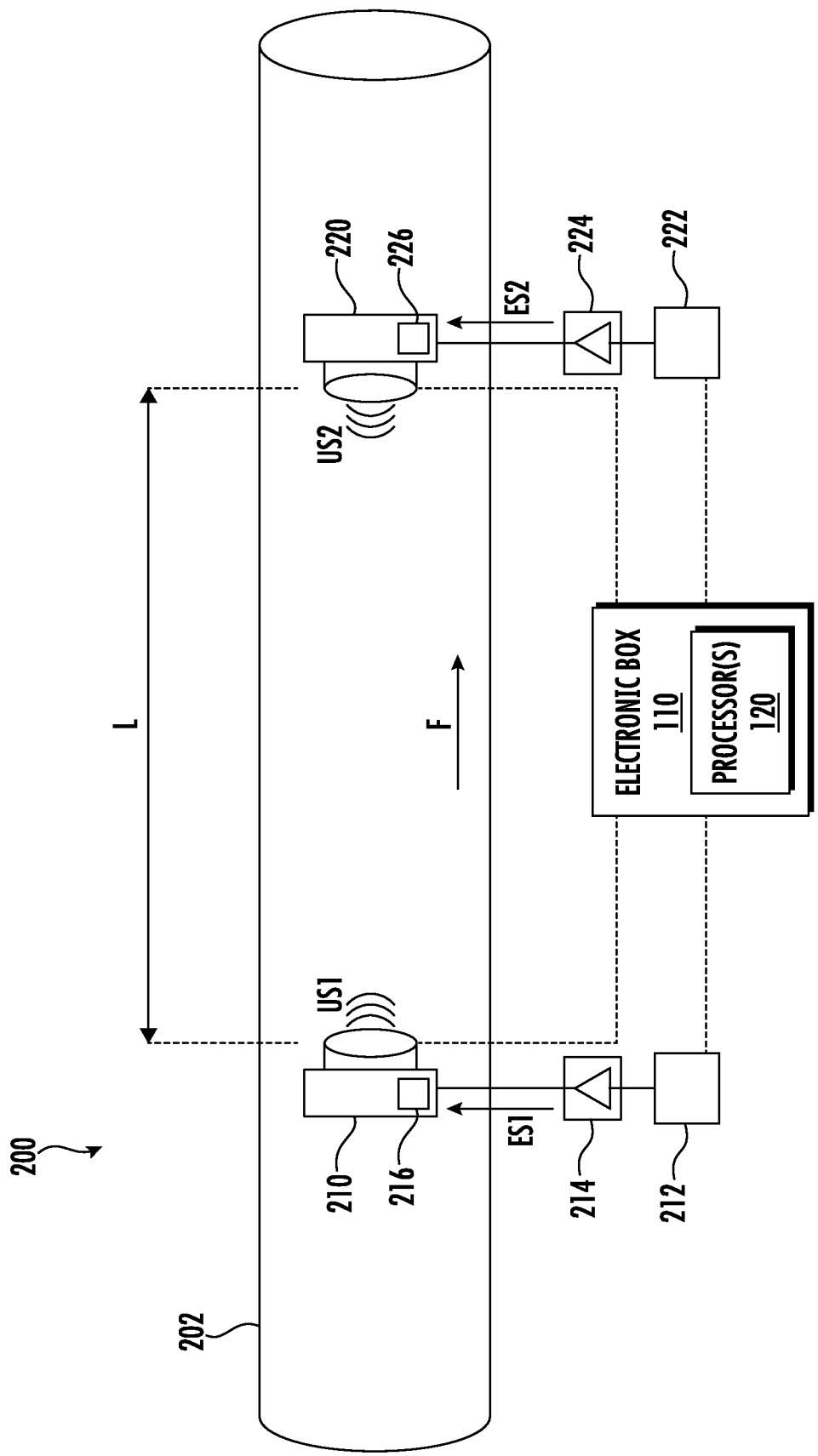
FIG. 12 is a schematic view of the ultrasonic fuel flow sensor of the fuel flow measuring system of FIG. 1 and depicts a first transducer being excited at multiple different frequencies simultaneously and a second transducer being excited at multiple different frequencies simultaneously.
Figure 13:
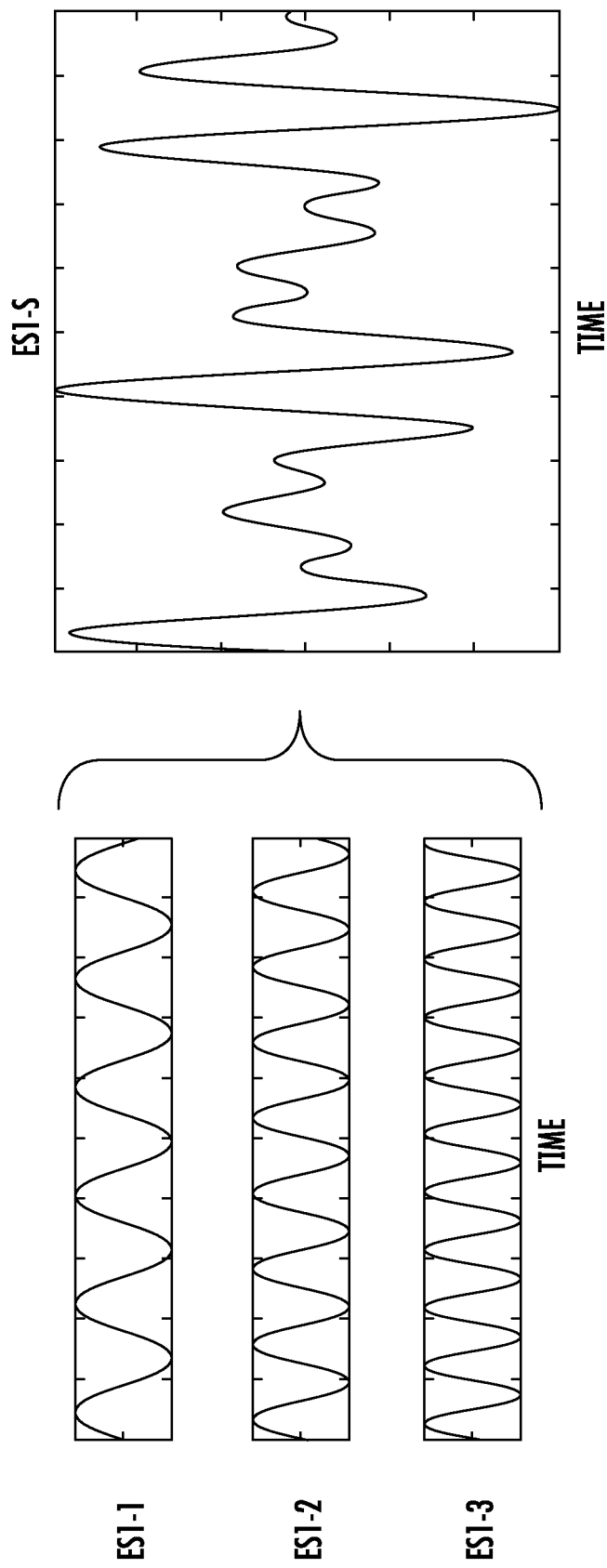
FIG. 13 depicts an example excitation signal that combines the characteristics of three excitation signals.

With reference now to FIGS. 12 and 13 in addition to FIG. 1, in some embodiments, instead of causing the first transducer 210 to be excited at different frequencies one at a time and the second transducer 220 to be excited at different frequencies one at a time as described above, the one or more processors 120 can cause the first transducer 210 and/or the second transducer 220 to be excited at multiple different frequencies simultaneously. For instance, the one or more processors 120 can cause the first transducer 210 and/or the second transducer 220 to be excited at a first excitation frequency, at a second excitation frequency, and at a third excitation frequency simultaneously, wherein the first, second, and third excitation frequencies are different from one another. In some embodiments, the first transducer 210 and/or the second transducer 220 can be excited by a broadband signal having multiple frequencies. Further, in other embodiments, the one or more processors 120 can cause the first transducer 210 and/or second transducer 220 to be excited at less than three excitation frequencies simultaneously (e.g., two excitation frequencies) or more than three excitation frequencies (e.g., five excitation frequencies). FIG. 13 depicts an example excitation signal ES1-S that combines the characteristics of three excitation signals, including ES1-1, ES1-2, and ES1-3. Excitation signal ES1-S can be directed to the first transducer 210 to excite the first transducer 210 at multiple different frequencies simultaneously. As will be appreciated the second transducer 220 can be excited using a similar excitation signal as shown in FIG. 13.

Figure 14:
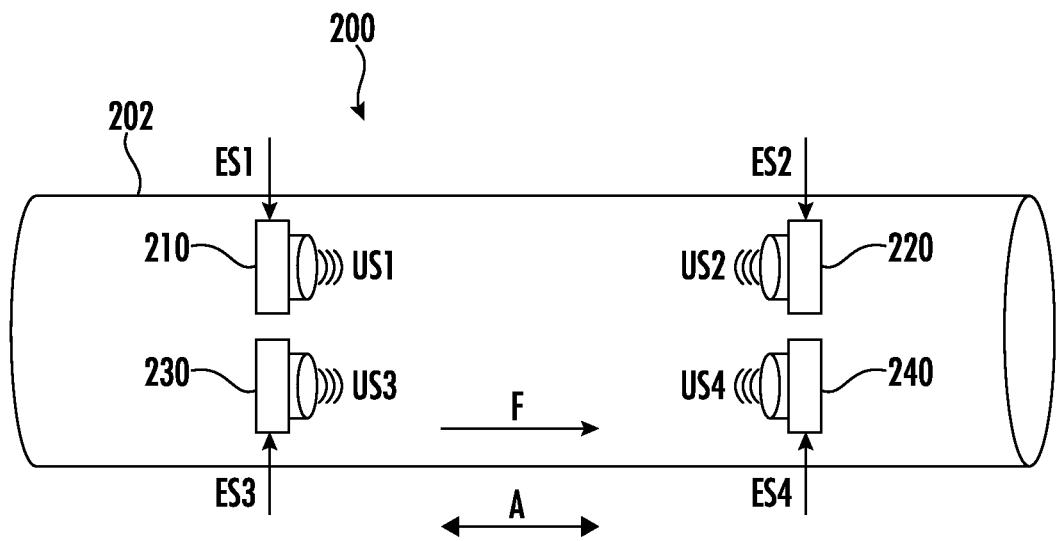
FIG. 14 is a schematic view of an ultrasonic fuel flow sensor of a fuel flow measuring system that includes two pairs of transducers.
Figure 15:
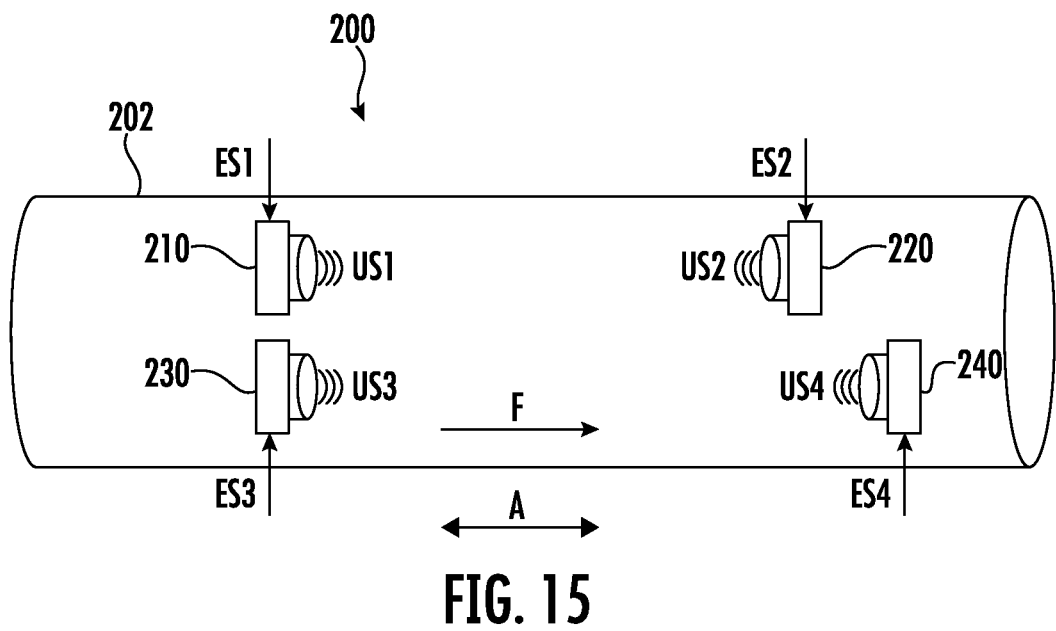
FIG. 15 is a schematic view of an ultrasonic fuel flow sensor of a fuel flow measuring system that includes two pairs of transducers, wherein one of the transducers is offset.

With reference now to FIGS. 14 and 15, in some embodiments, the fuel flow sensor 200 can include more than two transducers. For instance, for the depicted embodiments of FIGS. 14 and 15, the fuel flow sensor 200 includes four transducers, including first transducer 210, second transducer 220, a third transducer 230, and a fourth transducer 240. Such embodiments can provide electrical redundancy, among other benefits. Further, the conduit 202 defines an axial direction A, which is parallel to the flow axis in the example embodiments of FIGS. 14 and 15.

In FIG. 14, the third transducer 230 is arranged even with the first transducer 210 along the axial direction A and the fourth transducer 240 is arranged even with the second transducer 220 along the axial direction A. In this regard, the first and third transducers 210, 230 are axially aligned and the second and fourth transducers 220, 240 are axially aligned. In FIG. 15, in contrast, the fourth transducer 240 is offset from the second transducer 220, e.g., along the axial direction A, so that a length between the third and fourth transducers 230, 240 is greater than a length between the first and second transducers 210, 220. Embodiments in which there is a varying distance between the pairs of transducers can provide additional attenuation data, among other benefits.

Notably, for the embodiment of FIG. 14 and the embodiment of FIG. 15, one or more characteristics of one or more excitation signals can be set or updated as described above. For instance, one or more characteristics of one or more excitation signals directed to the first transducer 210 can be set or updated based at least in part on the complex impedance spectrum associated with the second transducer 220 and vice versa. Moreover, one or more characteristics of one or more excitation signals directed to the third transducer 230 can be set or updated based at least in part on the complex impedance spectrum associated with the fourth transducer 240 and vice versa.

In such embodiments, ultrasonic signals US1 emitted by the first transducer 210 and ultrasonic signals US3 emitted by the third transducer 230 can be received by the second transducer 220 and the fourth transducer 240. Similarly, ultrasonic signals US2 emitted by the second transducer 220 and ultrasonic signals US4 emitted by the fourth transducer 240 can be received by the first transducer 210 and the third transducer 230. To ensure satisfactory SNR of ultrasonic signals, notably, the first and second transducers 210, 220 have a same designed resonance frequency and the third and fourth transducers 230, 240 have a same designed resonance frequency, wherein the designed resonance frequency of the first and second transducers 210, 220 is different than the designed resonance frequency of the third and fourth transducers 230, 240. This gives the transducer pairs each a designed resonance frequency, which functions as a signature for each pair. These designed resonance frequencies allow for the transducers 210, 220, 230, 240 to distinguish between ultrasonic signals emitted from a pair mate and ultrasonic signals received from a non-pair mate.

Figure 16:
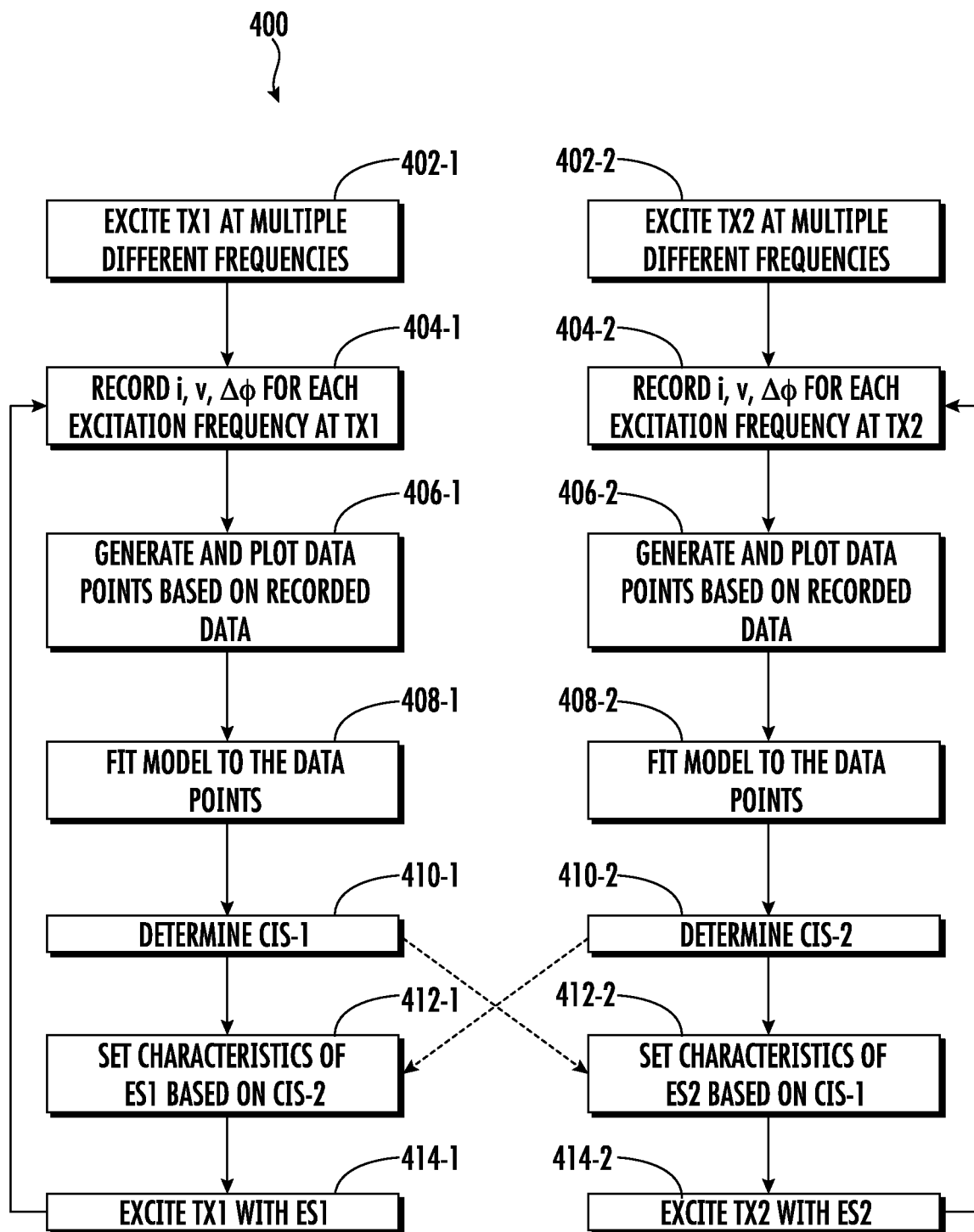
FIG. 16 is a flow diagram for a method of tuning one or more transducers of an ultrasonic fuel flow sensor according to an example aspect of the present disclosure.

FIG. 16 provides a flow diagram for a method 400 of tuning one or more transducers of an ultrasonic fuel flow sensor according to example aspects of the present disclosure. Although the flow diagram of FIG. 16 depicts method 400 being implemented to tune the excitation frequencies of two transducers, i.e., TX1 and TX2, it will be appreciated that method 400 can be utilized to tune any number of transducers of an ultrasonic flow sensor. For instance, the method 400 can be used to tune the excitation frequencies of one or more transducers of any of the fuel flow sensors provided herein.

At 402-1, the method 400 includes exciting a first transducer TX1 at a plurality of different excitation frequencies so that the first transducer TX1 directs one or more ultrasonic signals through a conduit to a second transducer TX2 spaced from the first transducer. The plurality of different excitation frequencies directed to the first transducer TX1 can be selected at random in some implementations. In other implementations, the plurality of different excitation frequencies can be selected so that the excitation frequencies are at a predetermined interval from one another. In some further implementations, the first transducer TX1 is excited with a broadband signal at a plurality of different excitation frequencies.

Similarly, at 402-2, the method 400 includes exciting the second transducer TX2 at a plurality of different excitation frequencies so that the second transducer TX2 directs one or more ultrasonic signals through the conduit to the first transducer TX1. The first transducer TX1 can be excited at multiple different frequencies one at a time, e.g., as shown in FIG. 3, or simultaneously, e.g., as shown in FIG. 12. Likewise, the second transducer TX2 can be excited at multiple different frequencies one at a time or simultaneously. The plurality of different excitation frequencies directed to the second transducer TX2 can be selected at random in some implementations. In other implementations, the plurality of different excitation frequencies can be selected so that the excitation frequencies are at a predetermined interval from one another. The first and second transducers TX1, TX2 can be excited at the same time. In some further implementations, the second transducer TX2 is excited with a broadband signal at a plurality of different excitation frequencies.

At 404-1, the method 400 includes recording an electric current i, a voltage v, and a phase difference ΔΦ between the electric current i and the voltage v at the first transducer TX1 when the first transducer TX1 is excited at the multiple different excitation frequencies. In this regard, each frequency at which the first transducer TX1 is excited has an associated recorded electric current i, voltage v, and phase difference ΔΦ. Such data associated with the first transducer TX1 can be compiled as a first data set. Similarly, at 404-2, the method 400 includes recording an electric current i, a voltage v, and a phase difference ΔΦ between the electric current i and the voltage v at the second transducer TX2 when the second transducer TX2 is excited at the multiple different excitation frequencies. In this regard, each frequency at which the second transducer TX2 is excited has an associated recorded electric current i, voltage v, and phase difference ΔΦ. Such data associated with the second transducer TX2 can be compiled as a second data set.

At 406-1, the method 400 includes generating data points based at least in part on the data recorded at 404-1. Each data point can be defined by a complex impedance and an excitation frequency of the plurality of different excitation frequencies. For instance, a first data point can be defined by a complex impedance and a first excitation frequency of the plurality of different excitation frequencies, a second data point can be defined by a complex impedance and a second excitation frequency of the plurality of different excitation frequencies, and so on for each of the excitation frequencies. The generated data points can be plotted on a complex impedance versus excitation frequency graph, e.g., as shown in FIG. 6. The complex impedance associated with a given data point is determined based at least in part on the ratio of the voltage to the electric current at the first transducer TX1 when excited at a given one of the plurality of different excitation frequencies. In a similar manner, at 406-2, the method 400 includes generating data points based at least in part on the data recorded at 404-2. This can be achieved in the same manner as described above with respect to 406-1.

At 408-1, the method 400 includes fitting the model to the data points generated at plotted at 406-1. The model can be a Butterworth Van-Dyke model, for example. FIG. 6 depicts a model being fit to data points associated with a first transducer. Similarly, at 408-2, the method 400 includes fitting the model to the data points generated at plotted at 406-2. FIG. 6 depicts a model being fit to data points associated with a second transducer.

At 410-1, the method 400 includes determining a complex impedance spectrum CIS-1 associated with the first transducer TX1 based at least in part on fitting the model to the data points associated with the first transducer TX1. In some implementations, determining the complex impedance spectrum CIS-1 associated with the first transducer TX1 can include determining a peak resonance frequency associated with the first transducer TX1, wherein the peak resonance frequency corresponds to a minimum impedance determined by fitting the model to the data points associated with the first transducer TX1. Further, determining the complex impedance spectrum CIS-1 associated with the first transducer TX1 can include determining a range of excitation frequencies within a predetermined range of the peak resonance frequency. The range of excitation frequencies within the predetermined range of the peak resonance frequency correlates to the complex impedance spectrum CIS-1 associated with the first transducer TX1.

Similarly, at 410-2, the method 400 includes determining a complex impedance spectrum CIS-2 associated with the second transducer TX2 based at least in part on fitting the model to the data points associated with the second transducer TX2. In some implementations, determining the complex impedance spectrum CIS-2 associated with the second transducer TX2 can include determining a peak resonance frequency associated with the second transducer TX2, wherein the peak resonance frequency corresponds to a minimum impedance determined by fitting the model to the data points associated with the second transducer TX2. Further, determining the complex impedance spectrum CIS-2 associated with the second transducer TX2 can include determining a range of excitation frequencies within a predetermined range of the peak resonance frequency. The range of excitation frequencies within the predetermined range of the peak resonance frequency correlates to the complex impedance spectrum CIS-2 associated with the second transducer TX2.

At 412-1, the method 400 includes setting one or more characteristics of one or more second excitation signals ES2 to be directed to the second transducer TX2 based at least in part on the complex impedance spectrum CIS-1 associated with the first transducer TX1. FIG. 16 schematically depicts the complex impedance spectrum CIS-1 associated with the first transducer TX1 being utilized to set the one or more characteristics of one or more second excitation signals ES2 to be directed to the second transducer TX2. The one or more characteristics can include at least one of an excitation frequency, an amplitude, and a phase of the one or more second excitation signals ES2 to be directed to the second transducer TX2. The excitation frequency or frequencies of the one or more second excitation signals ES2 can be set within the complex impedance spectrum CIS-1 associated with the first transducer TX1, or stated differently, within a predetermined range of the peak resonance frequency associated with the first transducer TX1.

Similarly, at 412-2, the method 400 includes setting one or more characteristics of one or more first excitation signals ES1 to be directed to the first transducer TX1 based at least in part on the complex impedance spectrum CIS-2 associated with the second transducer TX2. FIG. 16 schematically depicts the complex impedance spectrum CIS-2 associated with the second transducer TX2 being utilized to set the one or more characteristics of one or more first excitation signals ES1 to be directed to the first transducer TX1. The one or more characteristics can include at least one of an excitation frequency, an amplitude, and a phase of the one or more first excitation signals ES1 to be directed to the first transducer TX1. The excitation frequency or frequencies of the one or more first excitation signals ES1 can be set within the complex impedance spectrum CIS-2 associated with the second transducer TX2, or stated differently, within a predetermined range of the peak resonance frequency associated with the second transducer TX2.

At 414-1, the method 400 includes exciting the first transducer TX1 with the one or more first excitation signals ES1 having the one or more characteristics so that the first transducer TX1 directs one or more ultrasonic signals through the conduit to the second transducer TX2. As the first transducer TX1 is excited with the one or more first excitation signals ES1 having the one or more set or updated characteristics, the SNR of the ultrasonic signals received by the second transducer TX2 can be maximized. In some implementations, at least one frequency at which the first transducer TX1 is excited correlates to the peak resonance frequency of the second transducer TX2.

Similarly, at 414-2, the method 400 includes exciting the second transducer TX2 with the one or more second excitation signals ES2 having the one or more characteristics so that the second transducer TX2 directs one or more ultrasonic signals through the conduit to the first transducer TX1. As the second transducer TX2 is excited with the one or more second excitation signals ES2 having the one or more set or updated characteristics, the SNR of the ultrasonic signals received by the first transducer TX1 can be maximized. In some implementations, at least one frequency at which the second transducer TX2 is excited correlates to the peak resonance frequency of the first transducer TX1.

As further depicted in FIG. 16, the above-noted method 400 can iterate so that the excitation frequencies directed to the first and second transducers TX1, TX2 are iteratively set or updated, e.g., in real time. This may facilitate accurate sensor readings despite changing fuel conditions, among other benefits.

Turning now to FIGS. 17 and 18 in addition to FIG. 1, an example manner in which a medium type of a medium flowing through a conduit can be determined by an ultrasonic fuel flow sensor 200 of a fuel flow measuring system will now be described.

The one or more processors 120 are configured to cause the first transducer 210 to be excited at one or more first excitation frequencies via one or more first excitation signals ES1 so that the first transducer 210 directs a first ultrasonic signal US1 through a medium flowing through the conduit 202 to the second transducer 220. In this example embodiment, the medium is fuel.

Figure 17A:
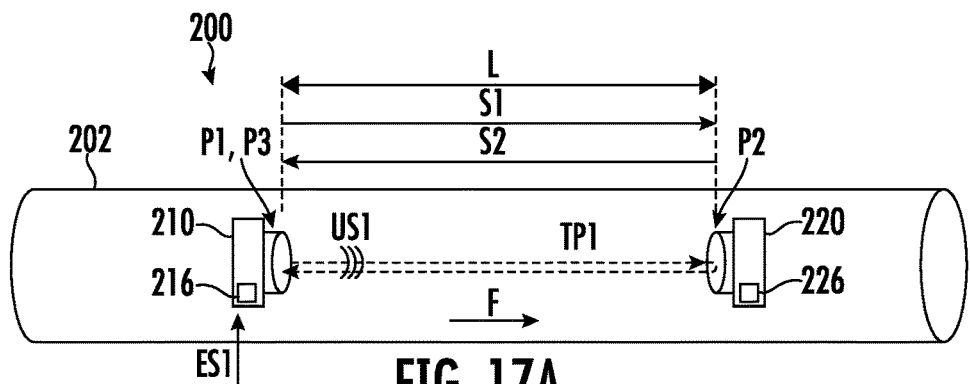
FIGS. 17A, 17B, 17C, 17D provide schematic views of an ultrasonic fuel flow sensor of a fuel flow measuring system and depict a sequence of an ultrasonic signal emitted by a first transducer of the fuel ultrasonic fuel flow sensor according to an example aspect of the present disclosure.

The one or more processors 120 are also configured to determine, at one or more frequencies of the one or more first excitation frequencies, an amplitude of the first ultrasonic signal US1 at two or more points along a first traversing path TP1 of the first ultrasonic signal US1. For instance, as shown in FIG. 17A, the first traversing path TP1 includes at least a first segment S1 spanning between the first transducer 210 and the second transducer 220 and a second segment S2 spanning between the second transducer 220 and the first transducer 210. The first segment S1 and the second segment S2 span the same distance L but they are directional in that the first segment S1 represents the segment of the first traversing path TP1 that corresponds to the first ultrasonic signal US1 being emitted by the first transducer 210 and traversing to the second transducer 220 while the second segment S2 represents the segment of the first traversing path TP1 that corresponds to the first ultrasonic signal US1 reverberating off the second transducer 220 and returning to the first transducer 210.

Figure 17B:
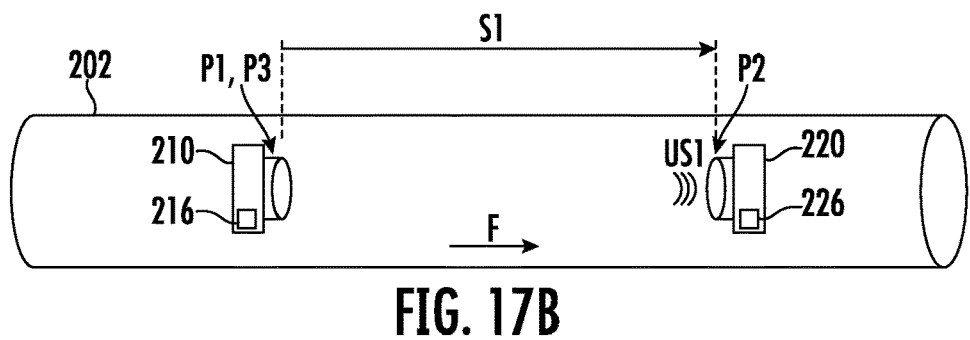
Figure 17C:
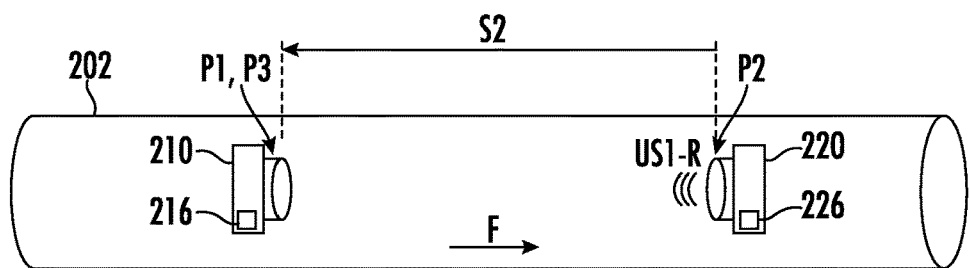
Figure 17D:
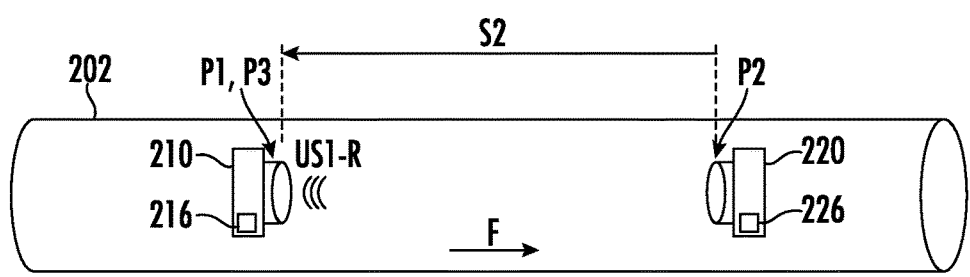

Accordingly, when the first transducer 210 is excited by the one or more first excitation signals ES1, the first ultrasonic signal US1 is emitted by the first transducer 210 and traverses along the first segment S1 from the first transducer 210 to the second transducer 220, reverberates off at least the second transducer 220 (the first ultrasonic signal US1 may also reverberate off other objects, such as the conduit 202 and other objects), and traverses along the second segment S2 from the second transducer 220 to the first transducer 210. In FIG. 17A, the first ultrasonic signal US1 is shown being emitted from the first transducer 210. In FIG. 17B, the first ultrasonic signal US1 is shown being received by the second transducer 220 after traversing along the first segment S1 of the first traversing path TP1. In FIG. 17C, the first ultrasonic signal US1 is shown reverberating off the second transducer 220 back toward the first transducer 210, denoted by reverberated first ultrasonic signal US1-R. In FIG. 17D, the reverberated first ultrasonic signal US1-R is shown being received by the first transducer 210 after traversing along the second segment S2 of the first traversing path TP1.

As noted, the amplitude of the first ultrasonic signal US1 is sensed at two or more points along the first traversing path TP1 of the first ultrasonic signal US1. For this example embodiment, the two or more points along the first traversing path TP1 of the first ultrasonic signal US1 include: a first point P1 located at the first transducer 210 and corresponding to the first segment S1 of the first traversing path TP1; a second point P2 located at the second transducer 220 and corresponding to a transition point between the first and second segments S1, S2 of the first traversing path TP1; and a third point P3 located at the first transducer 210 and corresponding to the second segment S2 of the first traversing path TP1. In this regard, the first and third points P1, P3 both correspond to the same location, the location of the first transducer 210. However, the first point P1 corresponds to a point along the first traversing path TP1 that corresponds with the initial emittance of the first ultrasonic signal US1 while the third point P3 corresponds to a point along the first traversing path TP1 that corresponds with the receipt of the first ultrasonic signal US1, or more particularly the reverberated first ultrasonic US-R, after the first ultrasonic signal US1 has reverberated off the second transducer 220 at the second point P2 and returned to the first transducer 210.

By way of example, when the first transducer 210 emits the first ultrasonic signal US1, the amplitude of the first ultrasonic signal US1 can be sensed at the first point P1, or rather, at the first transducer 210. This can be achieved by sensing the amplitude of the voltage at the first transducer 210 when the first transducer 210 is excited at a particular excitation frequency, for example. Then, when the first ultrasonic signal US1 reaches the second transducer 220, e.g., as shown in FIG. 17B, the amplitude of the first ultrasonic signal US1 can be sensed at the second point P2. After reverberating off the second transducer 220, e.g., as shown in FIG. 17C, and traversing along the second segment S2 and reaching the first transducer 210, e.g., as shown in FIG. 17D, the amplitude of the first ultrasonic signal US1 can be sensed at the third point P3. Sensing the amplitude of the first ultrasonic signal US1 at each point can be sensed by sensing the amplitude of the voltage at that particular point or transducer.

Figure 19:
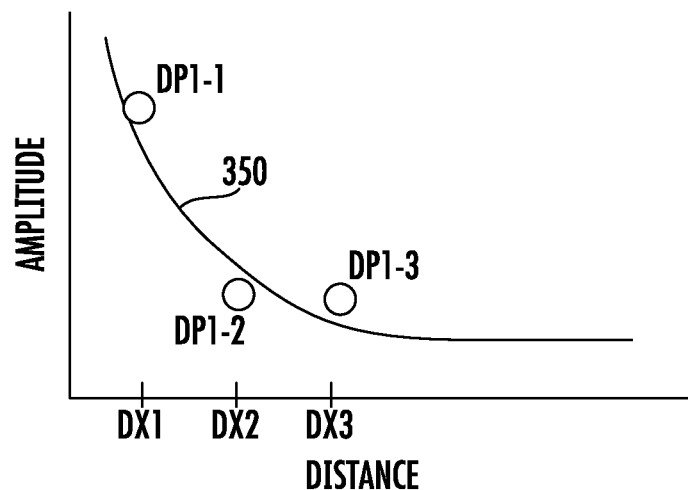
FIG. 19 depicts a model of attenuation being fit to first data points plotted on an amplitude versus distance graph.

The one or more processors 120 are further configured to generate first data points based at least in part on the sensed amplitudes of the first ultrasonic signal US1. Each first data point is defined by the amplitude of the first ultrasonic signal US1 at a given one of the two or more points along the first traversing path TP1, a total distance the first ultrasonic signal US1 has traversed through the medium to the given one of the two or more points, and the frequency of the one or more first excitation frequencies at which the first transducer 210 is excited. For instance, FIG. 19 depicts three first data points DP1-1, DP1-2, and DP1-3. The first data points DP1-1, DP1-2, DP1-3 all correspond to the same excitation frequency, but as shown, they correspond to different distances and have different amplitudes.

Specifically, the first data point DP1-1 corresponds to the amplitude of the ultrasonic signal US1 at first point P1 depicted in FIG. 17A. At first point P1, the ultrasonic signal US1 has traveled a distance DX1. The second data point DP1-2 corresponds to the amplitude of the ultrasonic signal US1 at second point P2 depicted in FIG. 17A. At the second point P2, the ultrasonic signal US1 has traveled a distance DX2, or the distance L depicted in FIG. 17A. The third data point DP1-3 corresponds to the amplitude of the ultrasonic signal US1 at the third point P3 depicted in FIG. 17A. At the third point P3, the ultrasonic signal US1 has traveled a distance DX3, or a distance that is two times the distance L, or 2L. As depicted in FIG. 19, the amplitude of the ultrasonic signal US1 decreases as the distance traversed by the first ultrasonic signal US1 increases. In this way, FIG. 19 depicts the manner in which the first ultrasonic signal US1 attenuates over the course of the first traversing path TP1.

First data points can be generated for each excitation frequency at which the first transducer 210 is excited. For instance, where the first transducer 210 is excited by a first excitation frequency, a second excitation frequency, and a third excitation frequency, first data points can be generated and plotted on a graph corresponding to the first excitation frequency, first data points can be generated and plotted on a graph corresponding to the second excitation frequency, and first data points can be generated and plotted on a graph corresponding to the third excitation frequency. In this regard, each graph corresponds to a particular excitation frequency.

With the first data points DP1-1, DP1-2, DP1-3 generated, the one or more processors 120 are further configured to determine one or more characteristics of the medium by fitting a model of attenuation 350 to the first data points DP1-1, DP1-2, DP1-3. The model of attenuation 350 can be fit to the data points DP1-1, DP1-2, DP1-3 using any suitable fitting technique, including one or more machine-learned techniques. As depicted in FIG. 19, the model of attenuation 350 is fit to the first data points DP1-1, DP1-2, DP1-3.

Notably, a resultant function RF (FIG. 21) of the model of attenuation 350 fit to the first data points DP1-1, DP1-2, DP1-3 correlates to the one or more characteristics of the medium. As will be appreciated, Stokes' law of sound attenuation states that the amplitude of a signal decreases exponentially with distance traveled at a rate α given by:

$$\alpha = \frac{2\eta\omega^2}{3\rho V^3} \qquad \text{(Equation 1)}$$

wherein η is the dynamic viscosity coefficient of the medium, ω is the signal's angular frequency, ρ is the density of the medium, and V is the speed of sound in the medium. In this regard, the rate α is dependent on one or more characteristics of the medium. By fitting the model of attenuation to the first data points DP1-1, DP1-2, DP1-3, the rate α associated with the medium flowing through the conduit 202 can be determined without knowing the specific parameters that define the rate α, such as the dynamic viscosity coefficient of the medium η and the density of the medium ρ. Accordingly, the resultant function RF of the model of attenuation 350 fit to the data points DP1-1, DP1-2, DP1-3 instructs or correlates to the rate α associated with the medium flowing through the conduit 202, wherein the rate α in turn correlates to one or more characteristics of the medium.

Figure 21:
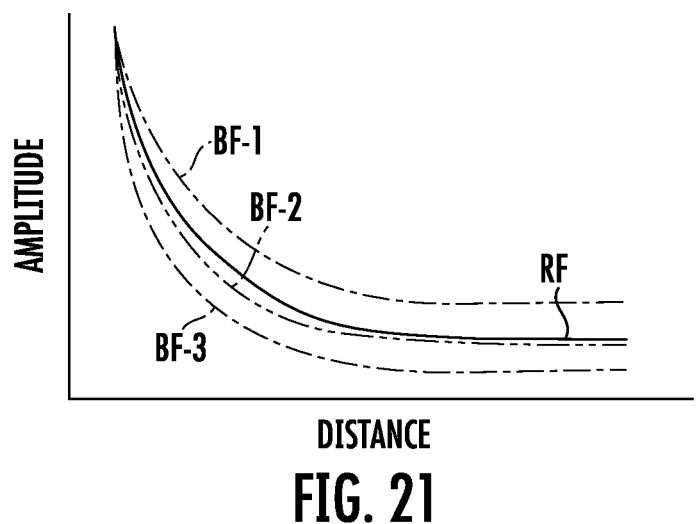
FIG. 21 depicts a graph showing a resultant function compared to a plurality of baseline functions.

With the resultant function RF determined (i.e., the function corresponding to the model of attenuation 350 fit to the data points), the one or more processors 120 are configured to classify a medium type of the medium based at least in part on a comparison between the one or more characteristics of the medium and one or more baseline characteristics. For instance, as shown in FIG. 21, the resultant function RF can be compared to a plurality of baseline functions each corresponding to a predetermined medium type. In this example, the plurality of baseline functions include a first baseline function BF-1, a second baseline function BF-2, and a third baseline function BF-3. The first baseline function BF-1 can correspond to a first predetermined medium type, e.g., Jet-A, the second baseline function BF-2 can correspond to a second predetermined medium type, e.g., JP-4, and the third baseline function BF-3 can correspond to a third predetermined medium type, e.g., JP-5. As will be appreciated, in other embodiments, the plurality of baseline functions can include more than three baseline functions or less than three functions.

In some embodiments, the predetermined medium type associated with a baseline function of the plurality of baseline functions that most closely matches the resultant function RF is classified as the medium type of the medium flowing through the conduit 202. That is, the one or more processors 120 can classify the medium type of the medium flowing through the conduit 202 as the medium type that corresponds to the baseline function that most closely matches the resultant function RF. For instance, as depicted, in FIG. 21, the second baseline function BF-2 of the plurality of baseline functions most closely matches the resultant function RF, and consequently, the medium type of the medium flowing through the conduit 202 is classified by the one or more processors 120 as the medium type corresponding to the second baseline function BF-2. In other embodiments, the one or more processors 120 can classify the medium type of the medium flowing through the conduit 202 as the medium type according to one or more other criteria.

In some alternative embodiments, the curve or function of the resultant function can be compared to baseline curves or functions stored in a lookup table or the like.

In some further embodiments, the model of attenuation 350 can be fit to data points generated based on an ultrasonic signal emitted by the second transducer 220 in addition to the first data points.

More specifically, in some embodiments, the one or more processors 120 are configured to cause the second transducer 220 to be excited at one or more second excitation frequencies via one or more second excitation signals ES2 so that the second transducer 220 directs a second ultrasonic signal US2 through the medium flowing through the conduit 202 to the first transducer 210.

Figure 18A:
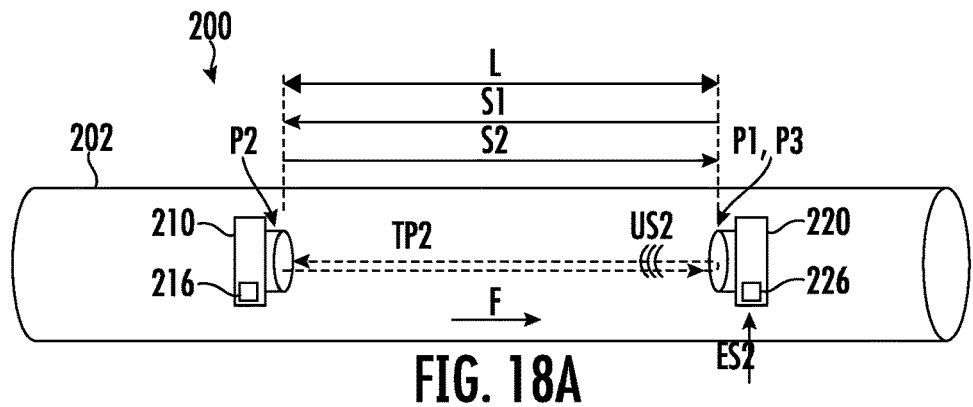
FIGS. 18A, 18B, 18C, 18D provide schematic views of the ultrasonic fuel flow sensor of FIGS. 17A, 17B, 17C, 17D and depict a sequence of an ultrasonic signal emitted by a second transducer of the fuel ultrasonic fuel flow sensor.

The one or more processors 120 are also configured to determine, at one or more frequencies of the one or more second excitation frequencies, an amplitude of the second ultrasonic signal US2 at two or more points along a second traversing path TP2 of the second ultrasonic signal US2. For instance, as shown in FIG. 18A, the first traversing path TP1 includes at least a first segment S1 spanning between the second transducer 220 and the first transducer 210 and a second segment S2 spanning between the first transducer 210 and the second transducer 220. The first segment S1 and the second segment S2 span the same distance L but they are directional in that the first segment S1 represents the segment of the second traversing path TP2 that corresponds to the second ultrasonic signal US2 being emitted by the second transducer 220 and traversing to the first transducer 210 while the second segment S2 represents the segment of the second traversing path TP2 that corresponds to the second ultrasonic signal US2 reverberating off the first transducer 210 and returning to the second transducer 220.

Figure 18B:
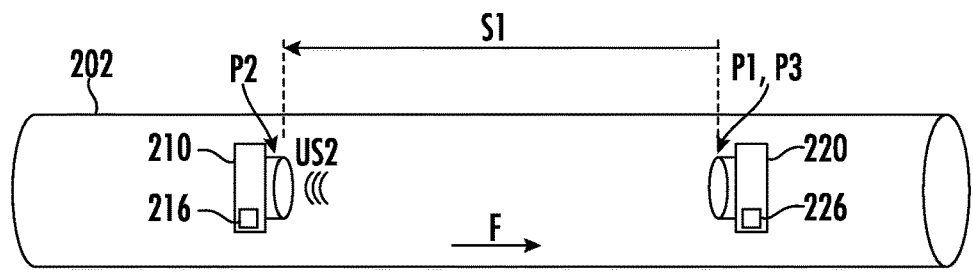
Figure 18C:
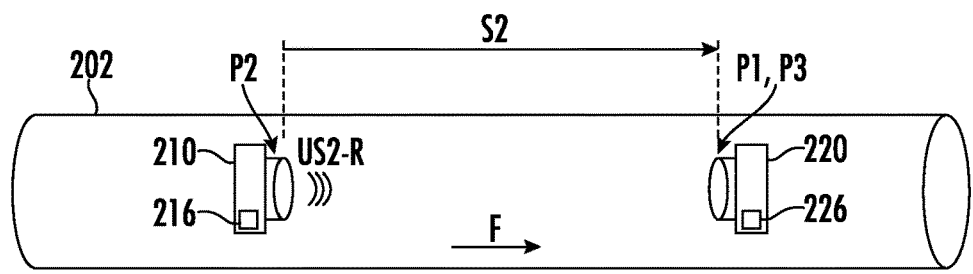
Figure 18D:
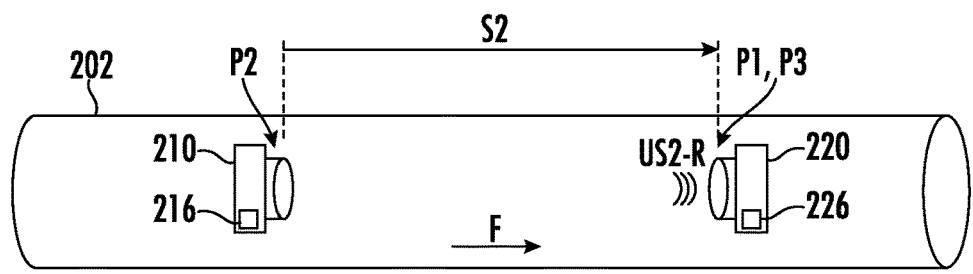

Accordingly, when the second transducer 220 is excited by the one or more second excitation signals ES2, the second ultrasonic signal US2 is emitted by the second transducer 220 and traverses along the first segment S1 from the second transducer 220 to the first transducer 210, reverberates off the first transducer 210 (the second ultrasonic signal US2 may also reverberate off other objects, such as the conduit 202 and other objects), and traverses along the second segment S2 from the first transducer 210 to the second transducer 220. In FIG. 18A, the second ultrasonic signal US2 is shown being emitted from the second transducer 220. In FIG. 18B, the second ultrasonic signal US2 is shown being received by the first transducer 210 after traversing along the first segment S1 of the second traversing path TP2. In FIG. 18C, the second ultrasonic signal US2 is shown reverberating off the first transducer 210 back toward the second transducer 220, denoted by reverberated second ultrasonic signal US2-R. In FIG. 18D, the reverberated second ultrasonic signal US2-R is shown being received by the second transducer 220 after traversing along the second segment S2 of the second traversing path TP2.

As noted, the amplitude of the second ultrasonic signal US2 is sensed at two or more points along the second traversing path TP2 of the second ultrasonic signal US2. For this example embodiment, the two or more points along the second traversing path TP2 of the second ultrasonic signal US2 include: a first point P1 located at the second transducer 220 and corresponding to the first segment S1 of the second traversing path TP2; a second point P2 located at the first transducer 210 and corresponding to a transition point between the first and second segments S1, S2 of the second traversing path TP2; and a third point P3 located at the second transducer 220 and corresponding to the second segment S2 of the second traversing path TP2. In this regard, the first and third points P1, P3 both correspond to the same location, the location of the second transducer 220. However, the first point P1 corresponds to a point along the second traversing path TP2 that corresponds with the initial emittance of the second ultrasonic signal US2 while the third point P3 corresponds to a point along the second traversing path TP2 that corresponds with the receipt of the second ultrasonic signal US2, or more particularly the reverberated second ultrasonic US2-R, after the second ultrasonic signal US2 has reverberated off the first transducer 210 at the second point P2 and returned to the second transducer 220.

By way of example, when the second transducer 220 emits the second ultrasonic signal US2, the amplitude of the second ultrasonic signal US2 can be sensed at the first point P1, or rather, at the second transducer 220. This can be achieved by sensing the amplitude of the voltage at the second transducer 220 when the second transducer 220 is excited at a particular excitation frequency, for example. Then, when the second ultrasonic signal US2 reaches the first transducer 210, e.g., as shown in FIG. 18B, the amplitude of the second ultrasonic signal US2 can be sensed at the second point P2. After reverberating off the first transducer 210, e.g., as shown in FIG. 18C, and traversing along the second segment S2 and reaching the second transducer 220, e.g., as shown in FIG. 18D, the amplitude of the second ultrasonic signal US2 can be sensed at the third point P3. Sensing the amplitude of the second ultrasonic signal US2 at each point can be sensed by sensing the amplitude of the voltage at that particular point or transducer.

Figure 20:
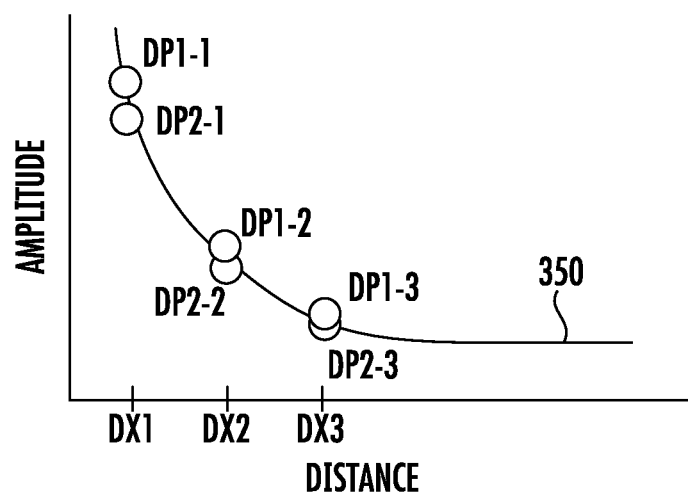
FIG. 20 depicts the model of attenuation being fit to first and second data points plotted on an amplitude versus distance graph.

The one or more processors 120 are further configured to generate second data points based at least in part on the sensed amplitudes of the second ultrasonic signal US2. Each second data point is defined by the amplitude of the second ultrasonic signal US2 at a given one of the two or more points along the second traversing path TP2, a total distance the second ultrasonic signal US2 has traversed through the medium to the given one of the two or more points, and the frequency of the one or more second excitation frequencies at which the second transducer 210 is excited. For instance, FIG. 20 depicts three second data points DP2-1, DP2-2, and DP2-3 plotted on an amplitude versus distance graph. The first data points DP1-1, DP1-2, DP1-3 are also plotted on the graph of FIG. 20. The second data points DP2-1, DP2-2, DP2-3 all correspond to the same excitation frequency, but as shown, they correspond to different distances and have different amplitudes.

Specifically, the first data point DP2-1 corresponds to the amplitude of the second ultrasonic signal US2 at first point P1 depicted in FIG. 18A. At the first point P1, the second ultrasonic signal US2 has traveled a distance DX1. The second data point DP2-2 corresponds to the amplitude of the second ultrasonic signal US2 at second point P2 depicted in FIG. 18A. At the second point P2, the second ultrasonic signal US2 has traveled a distance DX2, or the distance L depicted in FIG. 18A. The third data point DP2-3 corresponds to the amplitude of the second ultrasonic signal US2 at the third point P3 depicted in FIG. 18A. At the third point P3, the second ultrasonic signal US2 has traveled a distance DX3, or a distance that is two times the distance L, or 2L. As depicted in FIG. 20, the amplitude of the second ultrasonic signal US2 decreases as the distance traversed by the second ultrasonic signal US2 increases. Likewise, as noted above, the amplitude of the first ultrasonic signal US1 decreases as the distance traversed by the first ultrasonic signal US1 increases. In this manner, FIG. 20 depicts the manner in which the first and second ultrasonic signals US1, US2 attenuate over the course of their respective first and second traversing paths TP1, TP2.

Second data points can be generated for each excitation frequency at which the second transducer 220 is excited. For instance, where the second transducer 220 is excited by a first excitation frequency, a second excitation frequency, and a third excitation frequency, second data points can be generated and plotted on a graph corresponding to the first excitation frequency, second data points can be generated and plotted on a graph corresponding to the second excitation frequency, and second data points can be generated and plotted on a graph corresponding to the third excitation frequency. In this regard, each graph corresponds to a particular excitation frequency.

Further, in determining the one or more characteristics of the medium as described above, the one or more processors 120 can be configured to fit the model of attenuation 350 to second data points in addition to the first data points, e.g., as shown in FIG. 20. This may potentially provide double the data points to which the model of attenuation 350 can be fit. This may ultimately provide for a more accurate classification of the medium type.

Figure 22:
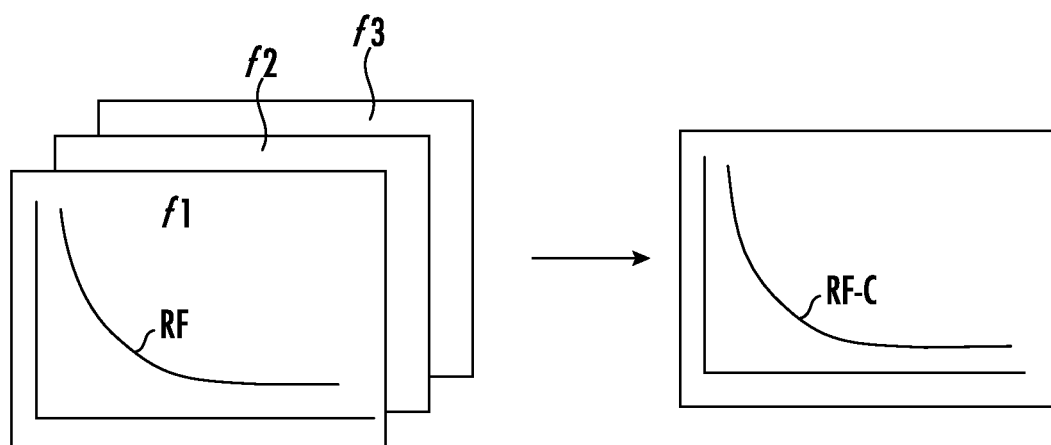
FIG. 22 schematically depicts a collective resultant function being generated based on a plurality of resultant functions each corresponding to a different excitation frequency.

As noted above, data points can be generated for each excitation frequency at which a given transducer is excited. In some embodiments, the model of attenuation 350 is fit to the data points corresponding to a given one of the excitation frequencies, and the resultant functions corresponding to each excitation frequency can be averaged to render a collective resultant function. By way of example, as shown in FIG. 22, a resultant function RF for each excitation frequency f1, f2, and f3 at which a transducer is excited can be determined, e.g., by fitting the model of attenuation 350 to the data points generated for a given excitation frequency. The one or more processors 120 can generate a collective resultant function RF-C based at least in part on the resultant function RF associated with each excitation frequency. As one example, a suitable curve averaging algorithm can be used to average the resultant function RF associated with each excitation frequency to render an average curve, or collective resultant function RF-C. In some embodiments, the collective resultant function RF-C is compared to one or more baseline functions as described above. The medium type that corresponds to the baseline function that most closely matches the collective resultant function RF-C can be classified as the medium type of the medium flowing through the conduit 202.

Figure 23:
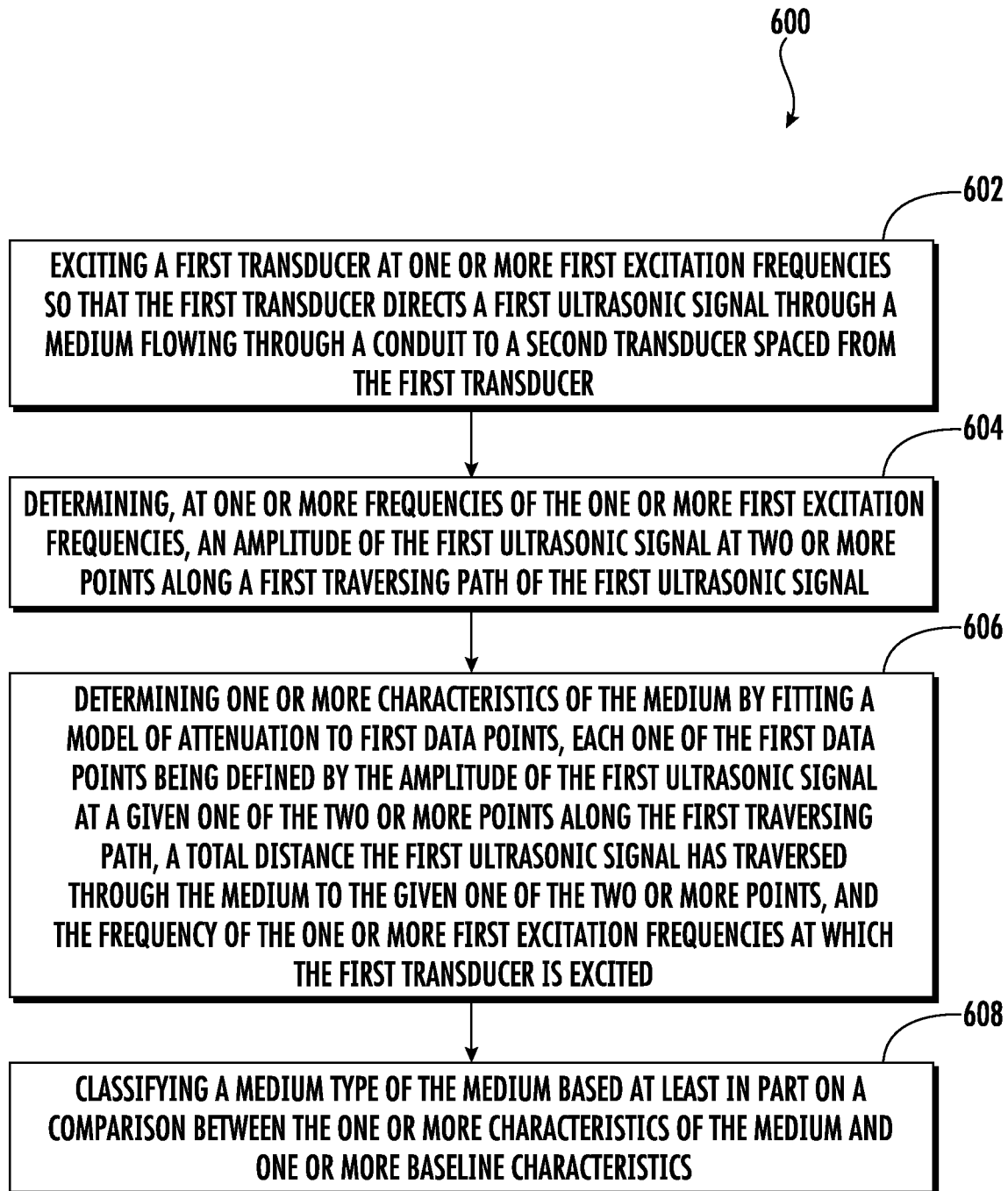
FIG. 23 is a flow diagram for a method of classifying a medium type of the medium flowing through a conduit using one or more transducers of an ultrasonic fuel flow sensor according to an example aspect of the present disclosure.

FIG. 23 provides a flow diagram for a method 600 of classifying a medium type of a medium flowing through a conduit using at least two transducers of an ultrasonic fuel flow sensor according to example aspects of the present disclosure. Method 600 can be implemented to determine the medium type At 602, the method 600 includes exciting a first transducer at one or more first excitation frequencies so that the first transducer directs a first ultrasonic signal through a medium flowing through a conduit to a second transducer spaced from the first transducer. For instance, as shown in FIG. 17A, the first transducer is excited by one or more excitation signals having one or more first excitation frequencies. In some implementations, the first transducer is upstream of the second transducer, e.g., as shown in FIGS. 17A-D and

18A-D. In other implementations, the first transducer is downstream of the second transducer.

At 604, the method 600 includes determining, at one or more frequencies of the one or more first excitation frequencies, an amplitude of the first ultrasonic signal at two or more points along a first traversing path of the first ultrasonic signal. For instance, the amplitude can be sensed at the first transducer when the first ultrasonic signal is emitted, at the second transducer when the ultrasonic signal is received thereby, and then at the first transducer after the first ultrasonic signal reverberates off the second transducer and returns to the first transducer. In some implementations, the amplitude can be sensed only initially at the first transducer and then at the second transducer. Accordingly, in such implementations, the amplitude of the reverberated ultrasonic signal need not be taken into account.

At 606, the method 600 includes determining one or more characteristics of the medium by fitting a model of attenuation to first data points, each one of the first data points being defined by the amplitude of the first ultrasonic signal at a given one of the two or more points along the first traversing path, a total distance the first ultrasonic signal has traversed through the medium to the given one of the two or more points, and the frequency of the one or more first excitation frequencies at which the first transducer is excited. For instance, in some implementations, a resultant function of the model of attenuation fit to the first data points correlates to the one or more characteristics of the medium. Accordingly, in some implementations, the one or more characteristics of the medium correlate to the rate α as defined by Equation 1. In this regard, by fitting the model of attenuation to the first data points, the rate α associated with the medium flowing through the conduit 202 can be determined without knowing the specific parameters that define the rate α.

In some implementations, the first traversing path includes at least a first segment spanning between the first transducer and the second transducer and a second segment spanning between the second transducer and the first transducer, e.g., as shown in FIG. 17A. When the first transducer is excited, the first ultrasonic signal traverses along the first segment from the first transducer to the second transducer, reverberates off the second transducer, and traverses along the second segment from the second transducer to the first transducer, e.g., as shown in the sequence of FIGS. 17A-D. Further, in such implementations, the two or more points along the first traversing path of the first ultrasonic signal include a first point located at the first transducer and corresponding to the first segment of the first traversing path, a second point located at the second transducer and corresponding to a transition point between the first and second segments of the first traversing path, and a third point located at the first transducer and corresponding to the second segment of the first traversing path.

At 608, the method includes classifying a medium type of the medium based at least in part on a comparison between the one or more characteristics of the medium and one or more baseline characteristics. In some implementation, classifying the medium type of the medium based at least in part on the comparison between the one or more characteristics of the medium and the one or more baseline characteristics includes comparing the resultant function to a plurality of baseline functions each corresponding to a predetermined medium type. Further, in some implementations, the predetermined medium type associated with a baseline function of the plurality of baseline functions that most closely matches the resultant function is classified as the medium type of the medium flowing through the conduit.

In some further implementations, the method 600 includes determining, for each one of the one or more first excitation frequencies, the amplitude of the first ultrasonic signal at two or more points along a first traversing path of the first ultrasonic signal. In such implementations, determining the one or more characteristics of the medium by fitting the model of attenuation to the first data points at 606 includes fitting the model of attenuation to the first data points associated with each one of the one or more first excitation frequencies so as to render a resultant function associated with each one of the one or more first excitation frequencies and determining a collective resultant function based at least in part on each one of the resultant functions. In such implementations, in classifying the medium type of the medium based at least in part on the comparison between the one or more characteristics of the medium and the one or more baseline characteristics, the one or more processors are configured to compare the collective resultant function to a plurality of baseline functions.

In yet some further implementations, the second transducer can be excited simultaneously with the first transducer so that readings associated with a second ultrasonic signal emitted by the second transducer can be utilized to ultimately classify the medium type of the medium flowing through the conduit. Particularly, in some implementations, the method 600 includes exciting the second transducer at one or more second excitation frequencies so that the second transducer directs a second ultrasonic signal through the medium to the first transducer. Further, the method 60 includes determining, at one or more frequencies of the one or more second excitation frequencies, an amplitude of the second ultrasonic signal at two or more points along a second traversing path of the second ultrasonic signal. In such implementations, in determining the one or more characteristics of the medium, the one or more processors are configured to fit the model of attenuation to second data points in addition to the first data points, each of the second data points being defined by the amplitude of the second ultrasonic signal at a given one of the two or more points along the second traversing path, a total distance the second ultrasonic signal has traversed through the medium to the given one of the two or more points along the second traversing path, and the frequency of the one or more second excitation frequencies at which the second transducer is excited.

Further, in such implementations, the second traversing path includes at least a first segment spanning between the second transducer and the first transducer and a second segment spanning between the first transducer and the second transducer, wherein when the second transducer is excited, the second ultrasonic signal traverses along the first segment from the second transducer to the first transducer, reverberates off the first transducer, and traverses along the second segment from the first transducer to the second transducer. Moreover, in such implementations, the two or more points along the second traversing path of the second ultrasonic signal include a first point located at the second transducer and corresponding to the first segment of the second traversing path, a second point located at the first transducer and corresponding to a transition point between the first and second segments of the second traversing path, and a third point located at the second transducer and corresponding to the second segment of the second traversing path.

Figure 24:
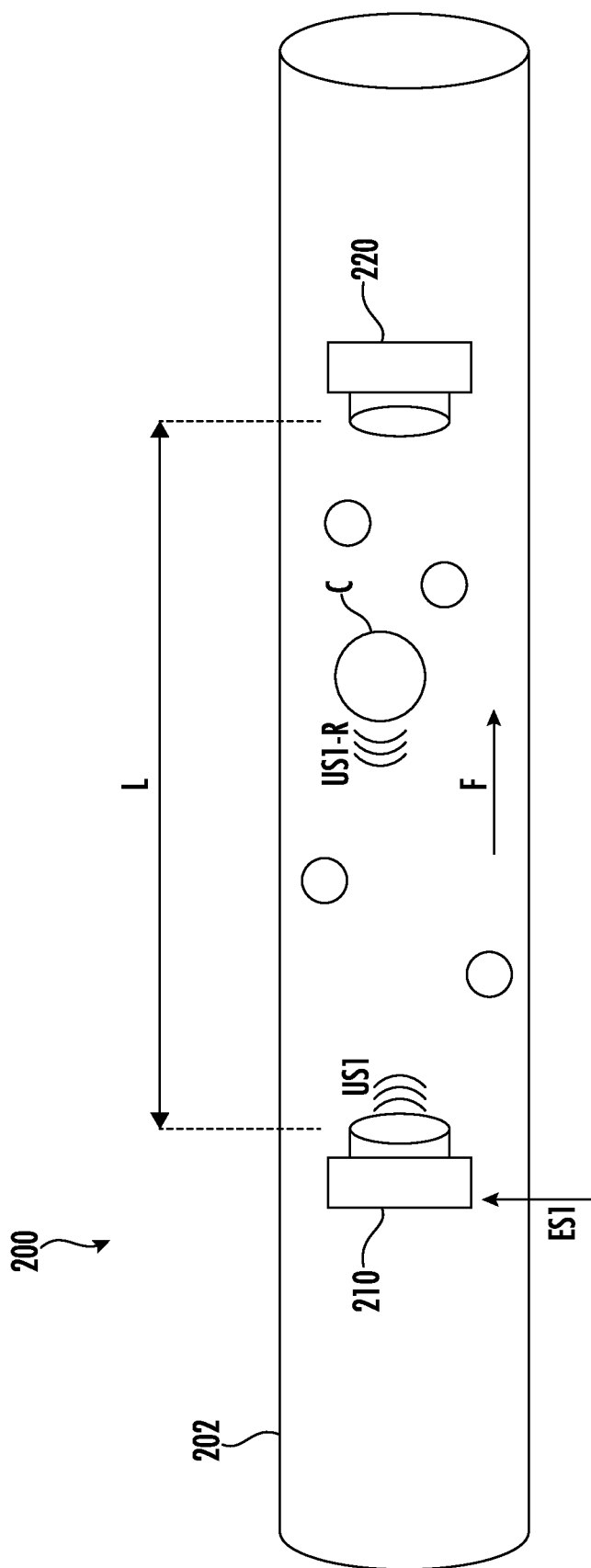
FIG. 24 is a schematic view of an ultrasonic fuel flow sensor of a fuel flow measuring system that is operable to detect a contaminant in the medium flowing through a conduit according to an example aspect of the present disclosure.

With reference now to FIGS. 1 and 24, FIG. 24 is a schematic view of an ultrasonic fuel flow sensor 200 of a fuel flow measuring system that is operable to detect a contaminant in the medium flowing through conduit 202 according to an example aspect of the present disclosure. For this embodiment, as shown in FIG. 24, the one or more processors 120 are configured to cause the first transducer 210 to emit an ultrasonic signal US1 through a medium flowing through the conduit 202 toward the second transducer 220. The one or more processors 120 are further configured to determine a Time Of Flight (TOF) of the ultrasonic signal US1, wherein the TOF indicates a time taken by the ultrasonic signal US1 to traverse through the medium and return to the first transducer 210.

In such embodiments, the one or more processors 120 can compare the TOF of the ultrasonic signal US1 with a baseline time of flight. For instance, the baseline TOF can correspond to an expected time for the ultrasonic signal US1 to traverse through the medium, reverberate off the second transducer 220, and return to the first transducer 210. Further, the one or more processors 120 can determine whether a contaminant is present within the medium based at least in part on a comparison between the TOF of the ultrasonic signal US1 and the baseline TOF. That is, the actual TOF of the ultrasonic signal US1 is compared to the baseline TOF.

In some embodiments, when the TOF of the ultrasonic signal US1 is within a predetermined time range of the baseline TOF, the one or more processors 120 determine that there is not a contaminant present within the medium. In contrast, when the TOF of the ultrasonic signal US1 is not within a predetermined time range of the baseline TOF, the one or more processors 120 determine that there is indeed a contaminant present within the medium. In such embodiments, the one or more processors 120 can be configured to generate an alert indicating that a contaminant is present within the medium.

For example, as shown in FIG. 24, a number of bubbles of a contaminant C are depicted within the medium of the conduit 202. In such instances, when an ultrasonic signal US1 is emitted by the first transducer 210, the ultrasonic signal US1 can traverse through the medium and reverberate off one of the bubbles or objects of the contaminant C. The reverberated ultrasonic signal, denoted as US1-R in FIG. 24, traverses back toward the first transducer 210. As will be appreciated, the ultrasonic signal US1 returns to the first transducer 210 faster when it reverberates off contaminant C rather than when the ultrasonic signal US1 travels the length L, reverberates off the second transducer 220, and traverses the length L once again so as to be received by the first transducer 210. In this manner, the actual TOF of the ultrasonic signal is less than its expected TOF when the ultrasonic signal reverberates off the second transducer 220. In some embodiments, the expected or baseline TOF is preselected or determined based at least in part on the medium type.

One example contaminant is boiling of the medium within the conduit 202. Boiling may indicate that the medium is undergoing a phase change, which may be undesirable in some instances (e.g., jet fuel coking) and desirable in some instances (e.g., changing cryogenically-stored liquid hydrogen to gaseous hydrogen prior to combustion), depending on the medium or fuel. In this regard, detecting whether a contaminant is present within the medium flowing through the conduit 202 may be useful. For instance, when a contaminant is detected, one or more processors associated with the ultrasonic fuel flow sensor 200 can trigger a response causing adjustment of one or more upstream and/or downstream systems to control the state or phase of the medium flowing through the conduit 202 (e.g., by communicating an alert to one or more controllers of the one or more upstream and/or downstream systems. Example upstream and/or downstream systems include one or more heat exchangers, one or more pumps, one or more fluid compression devices, one or more heat sinks and/or heat sources, etc. As one example, when a contaminant is present within the medium flowing through the conduit 202 (e.g., when boiling is detected in jet fuel), one or more controllable devices can be controlled to adjust one or more upstream and/or downstream systems to reduce or eliminate boiling of the medium. As another example, when a contaminant is detected as being present within the medium flowing through the conduit 202 (e.g., when cryogenically-stored liquid hydrogen is detected as changing to gaseous hydrogen prior to combustion), one or more controllable devices can be controlled to maintain operation of one or more upstream and/or downstream systems to continue preheating the hydrogen.

Further, the absence of a contaminant can be useful in determining whether upstream and/or downstream systems are functioning properly. In this regard, the health of upstream and/or downstream systems can be determined when contaminants are not detected, and one or more controllable devices can be controlled to adjust or maintain operation of such upstream and/or downstream systems depending on whether contaminants are desirable or not.

Figure 25:
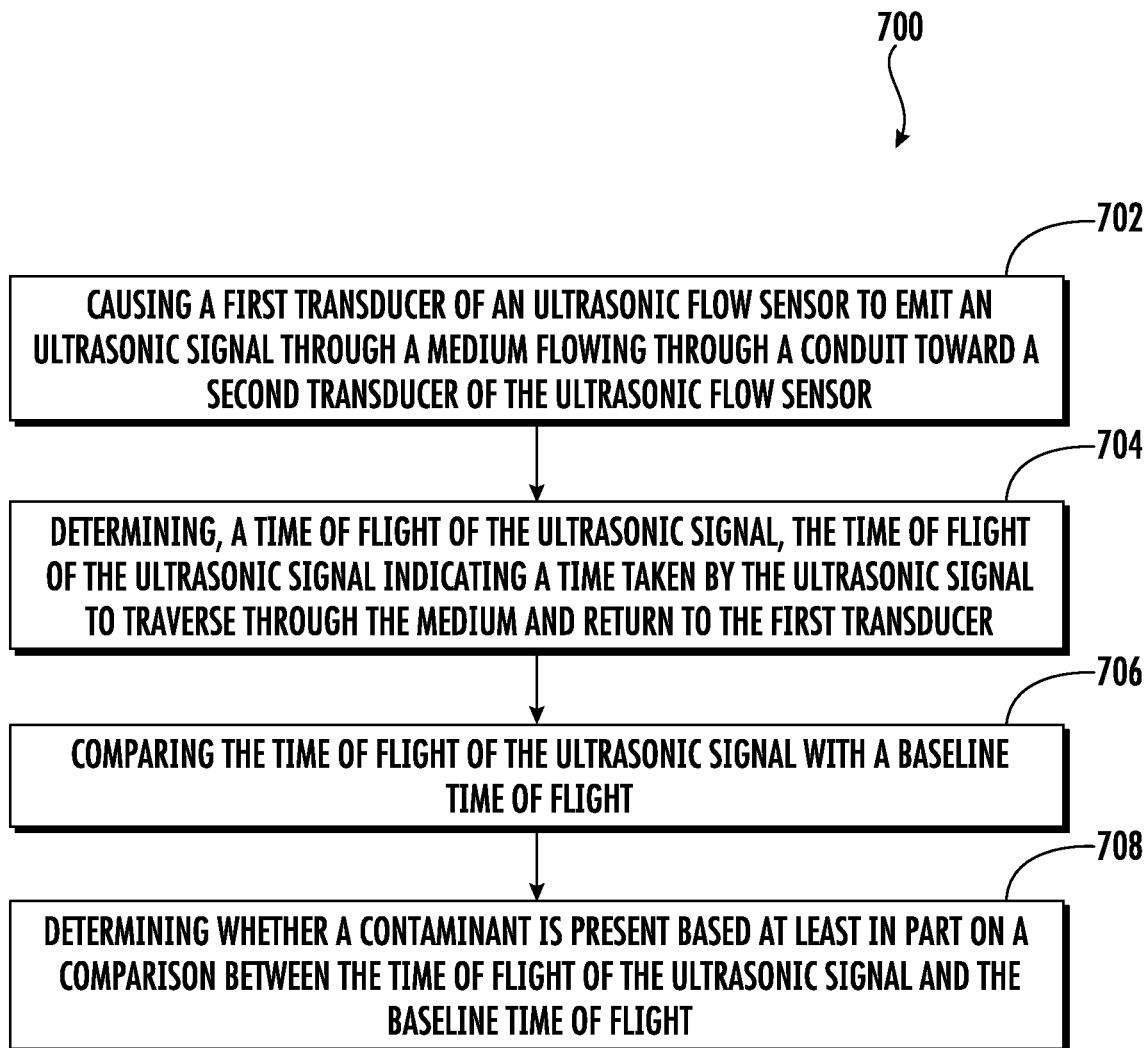
FIG. 25 is a flow diagram for a method of determining whether a contaminant is present within a medium flowing through a conduit using one or more transducers of an ultrasonic fuel flow sensor according to an example aspect of the present disclosure.

FIG. 25 is a flow diagram for a method 700 of determining whether a contaminant is present within a medium flowing through a conduit using one or more transducers of an ultrasonic fuel flow sensor according to an example aspect of the present disclosure.

At 702, the method 700 includes causing a first transducer of an ultrasonic flow sensor to emit an ultrasonic signal through a medium flowing through a conduit toward a second transducer of the ultrasonic flow sensor. In some implementations, the first transducer is positioned upstream of the second transducer. In other implementations, the first transducer is positioned downstream of the second transducer.

As 704, the method 700 includes determining a time of flight of the ultrasonic signal, the time of flight of the ultrasonic signal indicating a time taken by the ultrasonic signal to traverse through the medium and return to the first transducer.

At 706, the method 700 includes comparing the time of flight of the ultrasonic signal with a baseline time of flight. For instance, the baseline TOF can correspond to an expected time for the ultrasonic signal to traverse through the medium, reverberate off the second transducer, and return to the first transducer.

At 708, the method 700 includes determining whether a contaminant is present based at least in part on a comparison between the time of flight of the ultrasonic signal and the baseline time of flight. In some implementations, when the TOF of the ultrasonic signal is within a predetermined time range of the baseline TOF, it is determined that there is not a contaminant present within the medium. In contrast, when the TOF of the ultrasonic signal is not within a predetermined time range of the baseline TOF, the one or more processors can determine that there is a contaminant present within the medium. In some further implementations, the method 700 can include generating an alert indicating that a contaminant is present within the medium. The alert can be provided to maintenance personnel, an aircrew member, an entity, etc.

In some further implementations, the method 700 can include causing the second transducer to emit a second ultrasonic signal through the medium flowing through the conduit toward the first transducer. The method 700 can further include determining a time of flight of the second ultrasonic signal, the time of flight of the second ultrasonic signal indicating a time taken by the second ultrasonic signal to traverse through the medium and return to the second transducer. In addition, the method 700 can include comparing the time of flight of the second ultrasonic signal with a second baseline time of flight. For instance, the second baseline TOF can correspond to an expected time for the second ultrasonic signal to traverse through the medium, reverberate off the first transducer, and return to the second transducer. In such implementations, the comparison between the time of flight of the second ultrasonic signal and the second baseline time of flight can be used in addition to the comparison between the time of flight of the ultrasonic signal emitted by the first transducer and the baseline time of flight. For instance, when both comparisons indicate that a contaminant is present, an alert indicating the same can be generated, e.g., with a high confidence score. When only one of the comparisons indicate that that a contaminant is present, the alert can indicate that either a contaminant is present, that a transducer has malfunctioned, and/or both. When neither of the comparisons indicate that that a contaminant is present within the medium, an alert an alert indicating the same can be generated, e.g., with a high confidence score.

In accordance with yet another aspect of the present disclosure, a method of setting an excitation frequency of one or more transducers of a fuel flow sensor assembly is provided. In one example aspect, the method of setting the excitation frequency includes exciting a transducer of a fuel flow sensor assembly at one or more excitation frequencies so that the transducer directs one or more ultrasonic signals through a medium flowing through a conduit. The amplitude of the one or more ultrasonic signals are measured or otherwise determined. The amplitude can be measured at another transducer spaced from the emitting transducer and/or at the emitting transducer after the ultrasonic signals are reverberated back to the emitting transducer. Data points can be determined based on the determined amplitudes, wherein a given data point is defined by an amplitude and a frequency of an ultrasonic signal. Based on one or more data points, an amplitude response transfer function can be determined. For instance, a predefined model (e.g., a predefined model of attenuation) can be fit to the data points, e.g., based on their relative position to one another and their amplitude magnitudes. The fit predefined model can render the resultant amplitude response transfer function. The excitation frequency at which the emitting transducer is to be set can then selected based on the amplitude response transfer function. As one example, the amplitude response transfer function can be used to select the excitation frequency as the frequency that corresponds with the greatest amplitude response (that is determined not to be noise). As another example, the amplitude response transfer function can be used to select the excitation frequency as the frequency that provides the best signal-to-noise ratio (SNR).

Accordingly, such a method can be used to set the excitation frequency of one or more transducers based on captured amplitude responses at different frequencies. Advantageously, the excitation frequency for a given transducer can be set or updated continuously in real time, at predetermined intervals, upon a condition being satisfied, etc. using such a method so that the given transducer of fuel flow sensor assembly is set as desired, e.g., optimally for a specific purposes, such as maximizing the SNR. As discovered by the inventors, such a method may require less computing resources and may require sensing fewer parameters or characteristics than conventional methods for setting an excitation frequency for a transducer. In this regard, the method provides an efficient manner for setting an excitation frequency of a transducer of a fuel flow sensor assembly.

Figure 26:
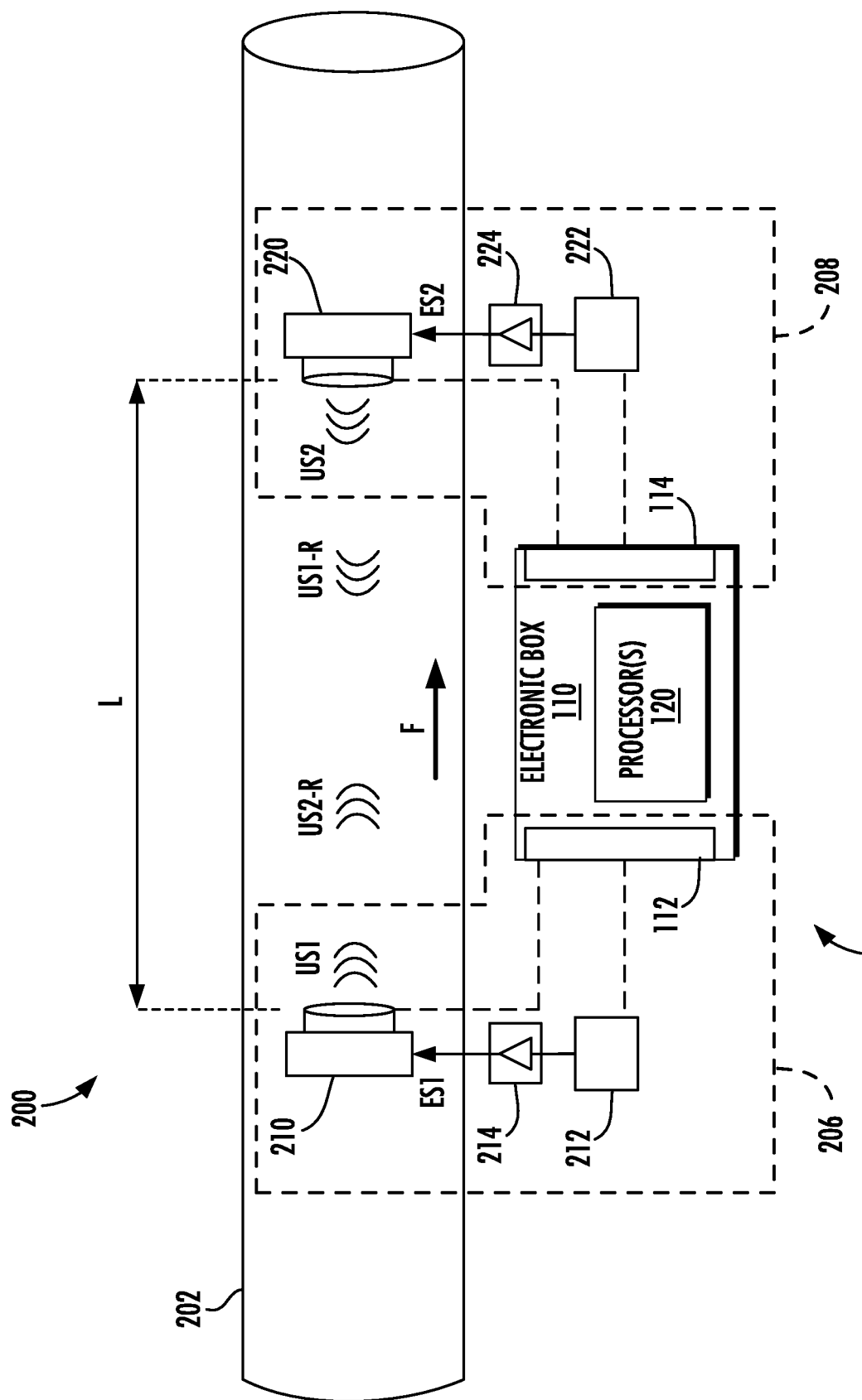
FIG. 26 is a schematic view of an ultrasonic fuel flow sensor assembly of according to an example aspect of the present disclosure.

FIG. 26 is a schematic view of an ultrasonic fuel flow sensor assembly 204 according to an example aspect of the present disclosure. The ultrasonic fuel flow sensor assembly 204 includes the ultrasonic fuel flow sensor 200, which includes the first transducer 210 and the second transducer 220 spaced from the first transducer 210. The first transducer 210 and the second transducer 220 are positioned within the conduit 202 arranged to flow a medium (e.g., fuel) therethrough. For the depicted embodiment of FIG. 26, the first transducer 210 is positioned upstream of the second transducer 220. In this regard, fuel flowing through the conduit 202 flows in a left-to-right direction in FIG. 26, denoted by arrow F. The first transducer 210 is spaced apart from the second transducer 220. Particularly, the first transducer 210 is spaced apart from the second transducer 220 by a length L, which is a distance spanning between the faces of the first transducer 210 and the second transducer 220. Moreover, for this embodiment, the first transducer 210 and the second transducer 220 are spaced apart from one another in a direction parallel to the flow axis of the fluid flowing through the conduit 202. The first transducer 210 and the second transducer 220 are generally aligned with the flow axis. In alternative embodiments, however, the first transducer 210 and the second transducer 220 need not be aligned with the axis of flow. For instance, in some embodiments, first transducer 210 and the second transducer 220 can be offset from the flow axis, e.g., so that first and second transducer 210, 220 operate on a diagonal with respect to the flow axis. Further, in other example embodiments, the second transducer 220 can be positioned upstream of the first transducer 210.

The ultrasonic fuel flow sensor assembly 204 also includes the electronic box, a first circuitry 206 and a second circuitry 208. The first circuitry 206 includes a plurality of electrically coupled first components, including the first transducer 210 (which is also a part of the ultrasonic fuel flow sensor 200), the first signal generator 212, the first driver 214, and a first input/output circuitry 112 of the electronic box 110. The second circuitry 208 includes a plurality of electrically coupled second components, including the second transducer 220 (which is also a part of the ultrasonic fuel flow sensor 200), the second signal generator 222, the second driver 224, and a second input/output circuitry 114 of the electronic box 110.

For the depicted embodiment of FIG. 26, the one or more processors 120 of the electronic box 110 are configured to cause the first transducer 210 to be excited at one or more first excitation frequencies ES1 so that the first transducer 210 directs one or more first ultrasonic signals US1 through a medium (e.g., fuel) flowing through the conduit 202. As shown in FIG. 26, the one or more first ultrasonic signals US1 are shown being directed toward the second transducer 220. The one or more processors 120 of the electronic box 110 are also configured to determine, at one or more frequencies of the one or more first excitation frequencies ES1, an amplitude of the one or more first ultrasonic signals US1 received at the second transducer 220 and/or the amplitude of the one or more first ultrasonic signals reverberated back to (represented by US1-R) and received by the first transducer 210. In this regard, the attenuation of the one or more first ultrasonic signals US1 can be determined, e.g., at the second transducer 220 and/or at the first transducer 210 after being reverberated thereto.

In addition, the one or more processors 120 of the electronic box 110 are configured to determine one or both of: i) a first amplitude response transfer function associated with the fuel flow sensor assembly 204 based at least in part on the amplitude of the one or more first ultrasonic signals US1 received at the second transducer 220 at one or more frequencies; and ii) a third amplitude response transfer function associated with the fuel flow sensor assembly 204 based at least in part on the amplitude of the one or more first ultrasonic signals reverberated back to (represented by US1-R) and received by the first transducer 210 at one or more frequencies.

Figure 27:
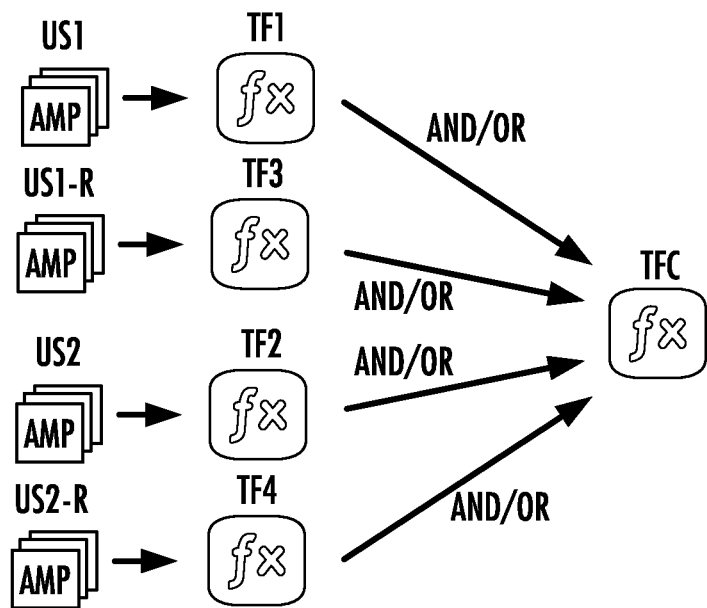
FIG. 27 is a flow diagram depicting an example manner in which one or more amplitude response transfer functions can be determined.

For instance, as shown in FIG. 27, the amplitudes received at the second transducer 220 at one or more frequencies of the one or more first excitation frequencies ES1 are depicted schematically with each box representing an amplitude of a first ultrasonic signal received at the second transducer 220 for a given one of the one or more first excitation frequencies ES1. As illustrated, the amplitudes received at the second transducer 220 at one or more frequencies of the one or more first excitation frequencies ES1 are used to determine the first amplitude response transfer function TF1 associated with the fuel flow sensor assembly 204, or more particularly, of the first circuitry 206 and the second circuitry 208 of the fuel flow sensor assembly 204. In this regard, the first amplitude response transfer function TF1 models an amplitude response of the first circuitry 206 and the second circuitry 208 of the fuel flow sensor assembly 204 at one or more frequencies.

The first amplitude response transfer function TF1 can model the amplitude response of the first circuitry 206 and the second circuitry 208 as a function of frequency. In this regard, each data point of the first amplitude response transfer function TF1 represents a value for the amplitude a first ultrasonic signal US1 received at the second transducer 220 as a function of frequency. In alternative embodiments, the first amplitude response transfer function TF1 can model an amplitude ratio as a function of frequency, wherein the amplitude ratio is a ratio of an amplitude of the first ultrasonic signal US1 received at the second transducer 220 to an amplitude of the first ultrasonic US1 when excited at the first transducer 210, or vice versa. The shape of the first amplitude response transfer function TF1 is dependent on the given fuel flow sensor assembly 204, or rather its arrangement, transducer characteristics, associated circuitry, etc.

Figure 28:
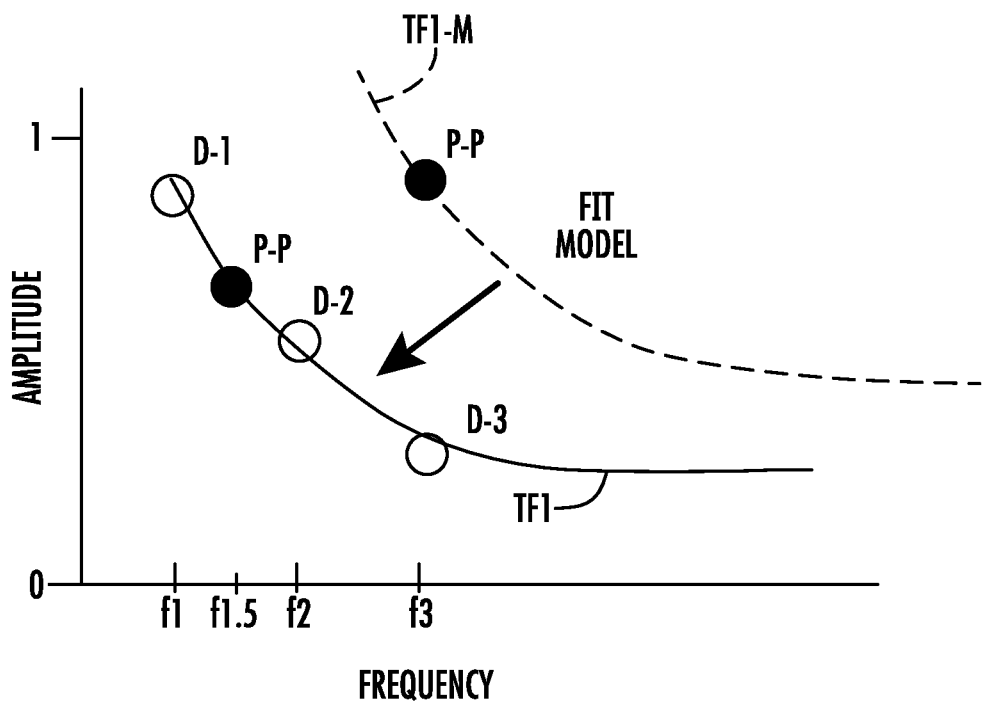
FIG. 28 depicts a predefined model being fit to data points plotted on an amplitude versus frequency graph to determine an amplitude response transfer function.

In some embodiments, with reference to FIG. 28, the first amplitude response transfer function TF1 can be determined by fitting a predefined function or predefined model TF1-M to one or more data points D-1, D-2, D-3, wherein each data point D-1, D-2, D-3 represents a value for the amplitude of a first ultrasonic signal US1 received at the second transducer 220 (or an amplitude ratio) as a function of frequency. For the depicted example of FIG. 28, a first data point D-1 corresponds to the amplitude of a first ultrasonic signal US1 received at the second transducer 220 at a first frequency f-1, a second data point D-2 corresponds to the amplitude of a first ultrasonic signal US1 received at the second transducer 220 at a second frequency f-2, and a third data point D-3 corresponds to the amplitude of a first ultrasonic signal US1 received at the second transducer 220 at a third frequency f-3. As shown in FIG. 28, the predefined model TF1-M is fit to the data points D-1, D-2, D-3 (moved downward and to left in FIG. 28). The resultant position of the predefined model TF1-M corresponds to the first amplitude response transfer function TF1. In alternative embodiments, the first amplitude response transfer function TF1 can be determined by plotting the data points D-1, D-2, D-3, and then connecting the data points D-1, D-2, D-3 with a line. The resultant line corresponds to the determined first amplitude response transfer function TF1.

As further shown in FIG. 27, the amplitudes of the first ultrasonic signals US1 received at the first transducer 210 at one or more frequencies of the one or more first excitation frequencies ES1 are depicted schematically with each box representing an amplitude received at the first transducer 210 for a given one of the one or more first excitation frequencies ES1. As illustrated, the amplitudes received at the first transducer 210 at one or more frequencies of the one or more first excitation frequencies ES1 are used to determine the third amplitude response transfer function TF3 associated with the fuel flow sensor assembly 204, or more particularly, of the first circuitry 206 of the fuel flow sensor assembly 204. In this regard, the third amplitude response transfer function TF3 models an amplitude response of the first circuitry 206 (and not the second circuitry 208) of the fuel flow sensor assembly 204.

The third amplitude response transfer function TF3 can model the amplitude response as a function of frequency. In this regard, each data point of the third amplitude response transfer function TF3 represents a value for the amplitude for a first ultrasonic signal US1 received at the first transducer 210 as a function of frequency. In alternative embodiments, the third amplitude response transfer function TF can model an amplitude ratio as a function of frequency, wherein the amplitude ratio is a ratio of an amplitude of a first ultrasonic signal US1 received at the first transducer 210 to an amplitude of the first ultrasonic US1 when excited at the first transducer 210, or vice versa. The shape of the third amplitude response transfer function TF3 is dependent on the given fuel flow sensor assembly 204. In some embodiments, the third amplitude response transfer function TF3 can be determined by fitting a predefined function or predefined model to one or more data points, wherein each data point represents a value for the amplitude of the first ultrasonic signal US1 received at the second transducer 220 (or an amplitude ratio) as a function of frequency. The predefined model can be fit to the data points as explained above with reference to FIG. 28. The third amplitude response transfer function TF3 can also be determined in other suitable manners, such as any of the manners described herein.

In some embodiments, with reference to FIGS. 26 and 27, the one or more processors 120 of the electronic box 110 are configured to select an excitation frequency for the first transducer 210 based at least in part on the first amplitude response transfer function TF1 and/or the third amplitude response transfer function TF3. As one example, the one or more processors 120 of the electronic box 110 can be configured to select the excitation frequency that maximizes the signal-to-noise ratio of the fuel flow sensor assembly 204 using the first amplitude response transfer function TF1 and/or the third amplitude response transfer function TF3. As another example, the one or more processors 120 of the electronic box 110 can be configured to select the excitation frequency to correspond to a frequency at which the fuel flow sensor assembly 204 operates at a minimum power level but still provides a predefined level of measurement accuracy, e.g., 95% accuracy.

In still further embodiments, the one or more processors 120 of the electronic box 110 can be configured to select the excitation frequency as the frequency that corresponds with a peak amplitude (a greatest peak or peak that corresponds with the largest received amplitude) of a given amplitude response transfer function. For instance, with reference to FIG. 28, the one or more processors 120 of the electronic box 110 can be configured to select the excitation frequency as the frequency corresponding to f-1 as this frequency corresponds with a peak amplitude of the first amplitude response transfer function TF1. In some instances, the peak amplitude of an amplitude response transfer function may not correspond with a measured data point, but rather with a largest peak of the amplitude response transfer function regardless of whether the largest peak is a measured data point.

In yet other embodiments, the one or more processors 120 of the electronic box 110 can be configured to select the excitation frequency as a frequency that corresponds with a predefined point along an amplitude response transfer function. For instance, through testing, it may be determined that a particular predefined point along an amplitude response transfer function provides optimal balance of the signal-to-noise ratio and power required for operation. For instance, with reference to FIG. 28, the one or more processors 120 of the electronic box 110 can be configured to select the excitation frequency as the frequency corresponding to f-1.5 as this frequency corresponds with the predefined point P-P of the first amplitude response transfer function TF1.

In some further embodiments, the one or more processors 120 of the electronic box 110 are configured to track the excitation frequency selected at two or more different sampling times (e.g., at a first sampling time and at a different, second sampling time). The one or more processors 120 of the electronic box 110 are then configured to monitor a health of the fuel flow sensor assembly 204 based at least in part on the tracked excitation frequencies. For instance, the health of the fuel flow sensor assembly 204 can be ascertained by determining a difference between one selected excitation frequency sampled at one of the two or more different sampling times and another selected excitation frequency sampled at another one of the two or more different sampling times. A difference that satisfies a threshold can be used to determine unacceptable degradation of the fuel flow sensor assembly 204. The magnitude of the difference can be used to determine a priority level of an alert provided to a health system, an operator, etc.

In some alternative embodiments, instead of tracking the excitation frequency selected at two or more different sampling times, the one or more processors 120 of the electronic box 110 are configured to track the signal-to-noise ratio of the fuel flow sensor assembly 204 at two or more different sampling times (e.g., at a first sampling time and at a different, second sampling time). The one or more processors 120 of the electronic box 110 are then configured to monitor a health of the fuel flow sensor assembly 204 based at least in part on the tracked signal-to-noise ratios. For instance, the health of the fuel flow sensor assembly 204 can be ascertained by determining a difference between one signal-to-noise ratio determined at one of the two or more different sampling times and another signal-to-noise ratio determined at another one of the two or more different sampling times. A difference that satisfies a threshold can be used to determine unacceptable degradation of the fuel flow sensor assembly 204. The magnitude of the difference can be used to determine a priority level of an alert provided to a health system, an operator, etc. In some instances, the fuel flow sensor assembly 204 may degrade even though the excitation frequencies do not change over time, but the determined signal-to-noise ratio does, which may indicate degradation. Accordingly, tracking the signal-to-noise ratio in addition or alternatively to the selected excitation frequencies may be beneficial.

In some embodiments, the one or more processors 120 of the electronic box 110 are configured to combine the first amplitude response transfer function TF1 and the third amplitude response transfer function TF3 into a combined amplitude response transfer function TFC. In this way, the combined amplitude response transfer function TFC can be based on a transfer function determined based on one or more amplitudes of the one or more first ultrasonic signals US1 received at the second transducer 220 and a transfer function determined based on one or more amplitudes of one or more reverberated first ultrasonic signals US1-R received at the first transducer 210. In this regard, the excitation frequency selected may be selected with enhanced accuracy.

In some further embodiments, as depicted in FIG. 26, the one or more processors 120 of the electronic box 110 are configured to cause the second transducer 220 to be excited at one or more second excitation frequencies ES2 so that the second transducer 220 directs one or more second ultrasonic signals US2 through the medium flowing through the conduit 202. As shown in FIG. 26, one or more second ultrasonic signals US2 are shown being directed toward the first transducer 210. The one or more processors 120 of the electronic box 110 are also configured to determine, at one or more frequencies of the one or more second excitation frequencies ES2, an amplitude of the one or more second ultrasonic signals US2 received at the first transducer 210 and/or the amplitude of the one or more second ultrasonic signals reverberated back to (represented by US2-R) and received by the second transducer 220. In this regard, the attenuation of the one or more second ultrasonic signals US2 can be determined, e.g., at the first transducer 210 and/or at the second transducer 220 after being reverberated thereto.

Moreover, the one or more processors 120 of the electronic box 110 are configured to determine one or both of: i) a second amplitude response transfer function associated with the fuel flow sensor assembly 204 based at least in part on the amplitude of the one or more second ultrasonic signals US2 received at the first transducer 210 at the one or more frequencies of the one or more second excitation frequencies ES2; and ii) a fourth amplitude response transfer function associated with the fuel flow sensor assembly 204 based at least in part on the amplitude of the one or more second ultrasonic signals reverberated back to (represented by US2-R) and received by the second transducer 220 at the one or more frequencies of the one or more second excitation frequencies ES2.

For instance, as illustrated in FIG. 27, the amplitudes of the one or more second ultrasonic signals US2 received at the first transducer 210 at one or more frequencies of the one or more second excitation frequencies ES2 are depicted schematically with each box representing an amplitude received at the first transducer 210 for a given one of the one or more second excitation frequencies ES2. As illustrated, the amplitudes received at the first transducer 210 at one or more frequencies of the one or more second excitation frequencies ES2 are used to determine the second amplitude response transfer function TF2 associated with the fuel flow sensor assembly 204, or more particularly, of the first circuitry 206 and the second circuitry 208 of the fuel flow sensor assembly 204. In this regard, the second amplitude response transfer function TF2 models an amplitude response of the first circuitry 206 and the second circuitry 208 of the fuel flow sensor assembly 204.

As further shown in FIG. 27, the amplitudes of the second ultrasonic signals US2 reverberated and received at the second transducer 220 at one or more frequencies of the one or more second excitation frequencies ES2 are depicted schematically with each box representing an amplitude received at the second transducer 220 for a given one of the one or more second excitation frequencies ES2. As illustrated, the amplitudes received at the second transducer 220 at one or more frequencies of the one or more second excitation frequencies ES2 are used to determine the fourth amplitude response transfer function TF4 associated with the fuel flow sensor assembly 204, or more particularly, of the second circuitry 208 of the fuel flow sensor assembly 204. In this regard, the fourth amplitude response transfer function TF4 models an amplitude response of the second circuitry 208 (and not the first circuitry 206) of the fuel flow sensor assembly 204. The second and fourth amplitude response transfer functions can each be determined as described above with respect to the first and third amplitude response transfer functions.

In some embodiments, with reference to FIGS. 26 and 27, the one or more processors 120 of the electronic box 110 are configured to select an excitation frequency for the second transducer 220 based at least in part on the second amplitude response transfer function TF2 and/or the fourth amplitude response transfer function TF4. As one example, the one or more processors 120 of the electronic box 110 can be configured to select the excitation frequency that maximizes the signal-to-noise ratio of the fuel flow sensor assembly 204 using the second amplitude response transfer function TF2 and/or the fourth amplitude response transfer function TF4. As another example, the one or more processors 120 of the electronic box 110 can be configured to select the excitation frequency for the second transducer 220 that corresponds to a frequency at which the fuel flow sensor assembly 204 operates at a minimum power level but still provides a predefined level of measurement accuracy, e.g., 95% accuracy. In some other embodiments, the excitation frequency for the second transducer 220 is selected to correspond with a peak amplitude of a given amplitude response transfer function, which may or may not be associated with a measured data point. In further embodiments, the excitation frequency for the second transducer 220 is selected to correspond with a predefined point along an amplitude response transfer function.

In some further embodiments, the one or more processors 120 of the electronic box 110 are configured to track the excitation frequency selected at two or more different sampling times (e.g., at a first sampling time and at a different, second sampling time). The one or more processors 120 of the electronic box 110 are then configured to monitor a health of the fuel flow sensor assembly 204 based at least in part on the tracked excitation frequencies. For instance, the health of the fuel flow sensor assembly 204 can be ascertained by determining a difference between one selected excitation frequency sampled at one of the two or more different sampling times and another selected excitation frequency sampled at another one of the two or more different sampling times. A difference that satisfies a threshold can be used to determine unacceptable degradation of the fuel flow sensor assembly 204. The magnitude of the difference can be used to determine a priority level of an alert provided to a health system, an operator, etc.

In some embodiments, the one or more processors 120 of the electronic box 110 are configured to combine the second amplitude response transfer function TF2 and the fourth amplitude response transfer function TF4 into a combined amplitude response transfer function TFC. In this way, the combined amplitude response transfer function TFC can be based on a transfer function determined based on one or more amplitudes of the second ultrasonic signal US2 received at the first transducer 210 and a transfer function determined based on one or more amplitudes of a reverberated second ultrasonic signal US2-R received at the second transducer 220. In this regard, the excitation frequency selected for the second transducer 220 may be selected with enhanced accuracy.

In some embodiments, the one or more processors 120 of the electronic box 110 are configured to combine the third amplitude response transfer function TF3 and the fourth amplitude response transfer function TF4 into a combined amplitude response transfer function TCF. In other embodiments, the one or more processors 120 of the electronic box 110 are configured to combine the first amplitude response transfer function TF1 and the second amplitude response transfer function TF2 into a combined amplitude response transfer function TCF. In yet other embodiments, the one or more processors 120 of the electronic box 110 are configured to combine the first TF1, second TF2, and at least one of the third and fourth amplitude response transfer functions TF3, TF4 into a combined amplitude response transfer function TCF. In some embodiments, any combination of the first, second, third, and fourth transfer function TF1, TF2, TF3, and TF4 can be combined into a combined amplitude response transfer function TCF as shown in FIG. 27. That is, the first, second, third, and fourth transfer function TF1, TF2, TF3, and/or TF4 can be combined as TF1-TF2; TF1-TF3; TF1-TF4; TF2-TF3; TF2-TF4; TF3-TF4; TF1-TF2-TF3; TF1-TF2-TF4; TF1-TF3-TF4; TF2-TF3-TF4; and TF1-TF2-TF3-TF4.

Figure 29:
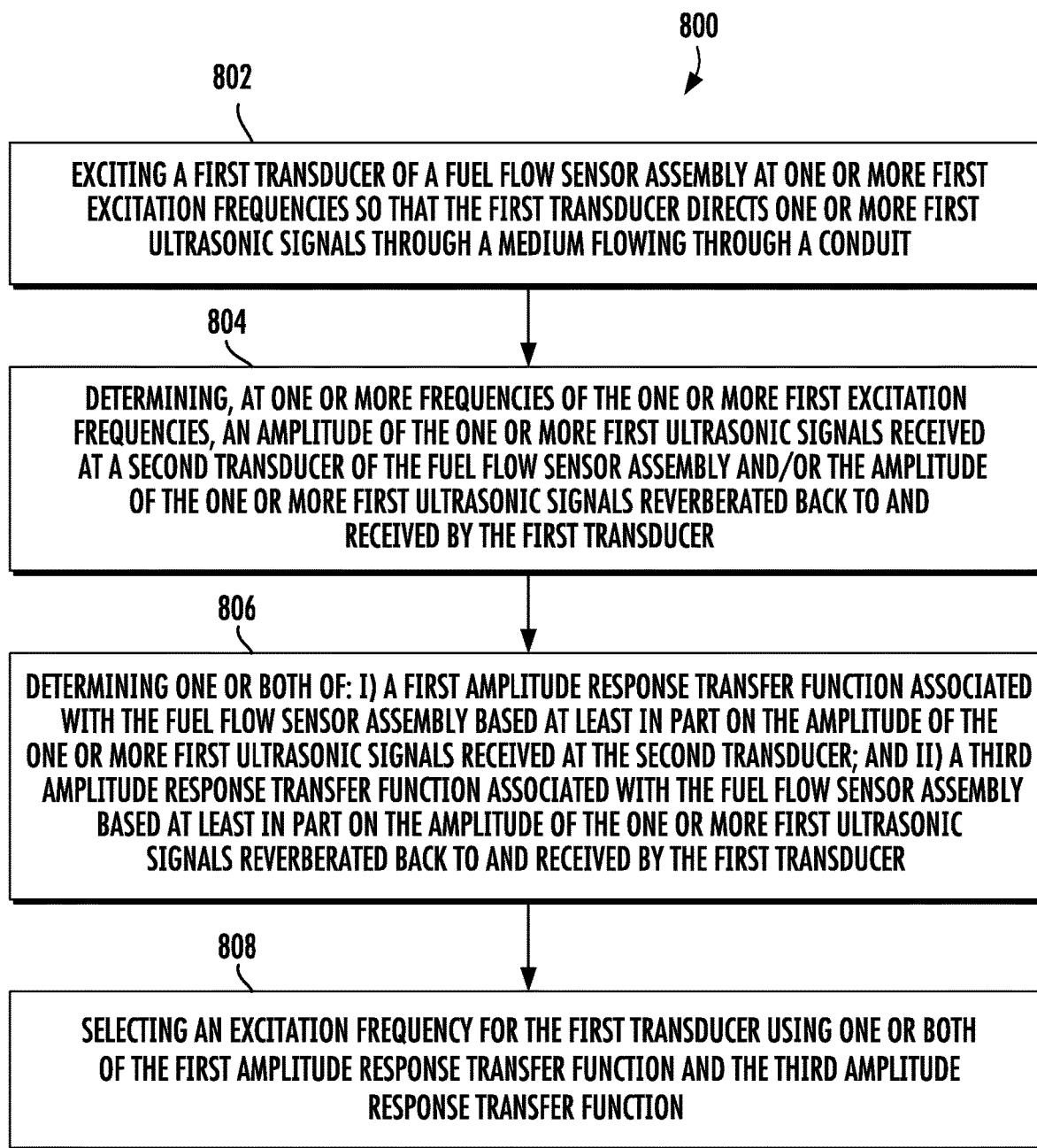
FIG. 29 is a flow diagram for a method of determining an amplitude response transfer function associated with a fuel slow sensor assembly according to an example aspect of the present disclosure.

FIG. 29 is a flow diagram for a method 800 of determining an amplitude response transfer function associated with a fuel flow sensor assembly according to an example aspect of the present disclosure.

At 802, the method 800 includes exciting a first transducer of a fuel flow sensor assembly at one or more first excitation frequencies so that the first transducer directs one or more first ultrasonic signals through a medium flowing through a conduit. The first transducer can be excited at different first excitation frequencies at different times or at a single time via a broadband signal transporting multiple different excitation signals each having different frequencies.

At 804, the method 800 includes determining, at one or more frequencies of the one or more first excitation frequencies, an amplitude of the one or more first ultrasonic signals received at a second transducer of the fuel flow sensor assembly and/or the amplitude of the one or more first ultrasonic signals reverberated back to and received by the first transducer.

At 806, the method 800 includes determining one or both of: i) a first amplitude response transfer function associated with the fuel flow sensor assembly based at least in part on the amplitude of the one or more first ultrasonic signals received at the second transducer; and ii) a third amplitude response transfer function associated with the fuel flow sensor assembly based at least in part on the amplitude of the one or more first ultrasonic signals reverberated back to and received by the first transducer. The first amplitude response transfer function can be determined by fitting a predefined model to one or more data points, wherein each data point represents a measured amplitude of a first ultrasonic signal at the second transducer at a given frequency. The third amplitude response transfer function can be determined by fitting a predefined model to one or more data points, wherein each data point represents a measured amplitude of a first ultrasonic signal reverberated back to and received at the first transducer at a given frequency.

The first amplitude response transfer function models an amplitude response of the one or more first ultrasonic signals at a first circuitry and a second circuitry of the fuel flow sensor assembly, the first circuitry including a plurality of electrically coupled first components, including the first transducer, a first signal generator, a first driver, and a first input/output circuitry of an electronic box, the second circuitry including a plurality of electrically coupled second components, including the second transducer, a second signal generator, a second driver, and a second input/output circuitry of the electronic box. The third amplitude response transfer function models an amplitude response of the one or more first ultrasonic signals at the first circuitry and not at the second circuitry of the fuel flow sensor assembly.

At 808, the method 800 includes selecting an excitation frequency for the first transducer using one or both of the first amplitude response transfer function and the third amplitude response transfer function. For instance, in some implementations, the excitation frequency is selected to maximize a signal-to-noise ratio of the fuel flow sensor assembly. In other implementations, the excitation frequency is selected to correspond to a frequency at which the fuel flow sensor assembly operates at a minimum power level but still provides a predefined level of measurement accuracy. In some other implementations, the excitation frequency is selected to correspond with a peak amplitude of a given amplitude response transfer function, which may or may not be associated with a measured data point. In further implementations, the excitation frequency is selected to correspond with a predefined point along an amplitude response transfer function.

In some implementations, the first transducer is positioned upstream of the second transducer. In other implementations, the second transducer is positioned upstream of the first transducer.

In some other implementations, the method 800 can include tracking the excitation frequency selected at two or more different sampling times. In such implementations, the method 800 can also include monitoring a health of the fuel flow sensor assembly based at least in part on the tracked excitation frequencies. Further, in such implementations, the health of the fuel flow sensor assembly can be ascertained by determining a difference between one excitation frequency sampled at one of the two or more different sampling times and another excitation frequency sampled at another one of the two or more different sampling times.

In some further implementations, the method 800 includes exciting a second transducer at one or more second excitation frequencies so that the second transducer directs a second ultrasonic signal through the medium flowing through the conduit. Further, the method 800 includes determining, at one or more frequencies of the one or more second excitation frequencies, an amplitude of the second ultrasonic signal received at the first transducer and/or the amplitude of the second ultrasonic signal reverberated back to and received by the second transducer. In addition, the method 800 includes determining one or both of: i) a second amplitude response transfer function associated with the fuel flow sensor assembly based at least in part on the amplitude of the second ultrasonic signal received at the first transducer; and ii) a fourth amplitude response transfer function associated with the fuel flow sensor assembly based at least in part on the amplitude of the second ultrasonic signal reverberated back to and received by the second transducer. The second amplitude response transfer function models an amplitude response of the second ultrasonic signal at the first circuitry and the second circuitry of the fuel flow sensor assembly. The fourth amplitude response transfer function models an amplitude response of the second ultrasonic signal at the second circuitry and not at the first circuitry of the fuel flow sensor assembly.

In some implementations, the method 800 includes combining the first amplitude response transfer function and the third amplitude response transfer function into a combined amplitude response transfer function. In some implementations, the method 800 includes combining the second amplitude response transfer function and the fourth amplitude response transfer function into a combined amplitude response transfer function. In some implementations, the method 800 includes combining the third and fourth amplitude response transfer functions into a combined amplitude response transfer function. In some implementations, the method 800 includes combining the first and second amplitude response transfer functions into a combined amplitude response transfer function. In some implementations, the method 800 includes combining the first, second, and at least one of the third and fourth amplitude response transfer functions into a combined amplitude response transfer function. In some implementations, the method 800 includes combining the third, fourth, and at least one of the first and second amplitude response transfer functions into a combined amplitude response transfer function. In some implementations, the method 800 includes combining the first, second, third, and fourth amplitude response transfer functions into a combined amplitude response transfer function.

Figure 30:
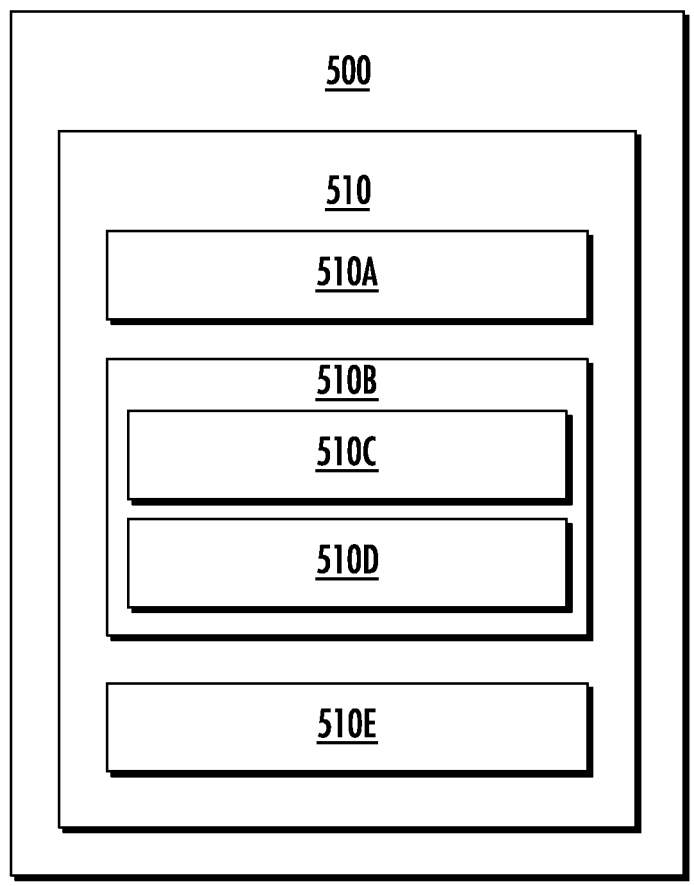
FIG. 30 is a block diagram of an example computing system according to an example aspect of the present disclosure.

FIG. 30 provides an example computing system 500 according to example embodiments of the present disclosure. The electronic box 110 and/or the electronic engine controller 160 disclosed herein can include one, some, or all the components of computing system 500. As shown, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-executable or computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured. The instructions 510C can be software written in any suitable programming language or in hardware and/or firmware. Additionally, and/or alternatively, the instructions 510C can be executed in logically and/or virtually separate threads on processor(s) 510A. The memory device(s) 510B can further store data 510D that can be accessed by the processor(s) 510A.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as an external remote control, can be configured to receive one or more commands from the computing device(s) 510 or provide one or more commands to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

1. A system, comprising: a first transducer arranged to direct ultrasonic signals through a conduit; a second transducer spaced from the first transducer and arranged to direct ultrasonic signals through the conduit; and one or more processors being configured to: cause the first transducer to be excited at a first excitation frequency and at a second excitation frequency, the first and second excitation frequencies being different from one another; determine a complex impedance spectrum associated with the first transducer based at least in part on fitting a model to a first data set, the first data set indicating i) a ratio of a voltage to an electric current at the first transducer when excited at the first excitation frequency and a ratio of the voltage to the electric current at the first transducer when excited at the second excitation frequency, and ii) a phase difference between the voltage and the electric current at the first transducer when excited at the first excitation frequency and a phase difference between the voltage and the electric current at the first transducer when excited at the second excitation frequency; and set one or more characteristics of one or more second excitation signals to be directed to the second transducer based at least in part on the complex impedance spectrum associated with the first transducer.

2. The system of any preceding clause, wherein the first transducer is caused to be excited by a first excitation signal at the first excitation frequency and by a second excitation signal at the second excitation frequency one at a time.

3. The system of any preceding clause, wherein the first transducer is caused to be excited by a first excitation signal at the first excitation frequency and by a second excitation signal at the second excitation frequency simultaneously, the first excitation signal having a first phase and the second excitation signal having a second phase.

4. The system of any preceding clause, wherein the model is a Butterworth Van-Dyke Model.

5. The system of any preceding clause, wherein the one or more processors are further configured to: cause the second transducer to be excited at a first excitation frequency and at a second excitation frequency, the first and second excitation frequencies associated with the second transducer being different from one another; determine a complex impedance spectrum associated with the second transducer based at least in part on fitting a model to a second data set, the second data set indicating i) a ratio of a voltage to an electric current at the second transducer when excited at the first excitation frequency and a ratio of the voltage to the electric current at the second transducer when excited at the second excitation frequency, and ii) a phase difference between the voltage and the electric current at the second transducer when excited at the first excitation frequency and a phase difference between the voltage and the electric current at the second transducer when excited at the second excitation frequency; and set one or more characteristics of one or more first excitation signals to be directed to the first transducer based at least in part on the complex impedance spectrum associated with the second transducer.

6. The system of any preceding clause, wherein the one or more processors are further configured to: cause the second transducer to be excited by the one or more second excitation signals so that the second transducer directs the ultrasonic signals at the first transducer; and cause the first transducer to be excited by the one or more first excitation signals so that the first transducer directs the ultrasonic signals at the second transducer.

7. The system of any preceding clause, wherein: i) the one or more second excitation signals directed to the second transducer cause the second transducer to be excited at multiple excitation frequencies, and wherein the multiple excitation frequencies at which the second transducer is excited are each within a predetermined range of a peak resonance frequency associated with the first transducer at a previous time step; and ii) the one or more first excitation signals directed to the first transducer cause the first transducer to be excited at multiple excitation frequencies, and wherein the multiple excitation frequencies at which the first transducer is excited are each within a predetermined range of a peak resonance frequency associated with the second transducer at the previous time step.

8. The system of any preceding clause, wherein in determining the complex impedance spectrum associated with the first transducer based at least in part on fitting the model to the first data set, the one or more processors are configured to: determine a peak resonance frequency associated with the first transducer, the peak resonance frequency corresponding to a minimum impedance determined by fitting the model to the first data set; and determine a range of excitation frequencies within a predetermined range of the peak resonance frequency, and wherein the range of excitation frequencies within the predetermined range of the peak resonance frequency correlates to the complex impedance spectrum associated with the first transducer.

9. The system of any preceding clause, wherein a lower bound and an upper bound of the predetermined range are set based at least in part on a receiving threshold, the receiving threshold being set at a preselected impedance value.

10. The system of any preceding clause, wherein in determining the complex impedance spectrum associated with the first transducer based at least in part on fitting the model to the first data set, the one or more processors are configured to: generate a first data point defined by a complex impedance and the first excitation frequency, the complex impedance associated with the first data point being determined based at least in part on the ratio of the voltage to the electric current at the first transducer when excited at the first excitation frequency; generate a second data point defined by a complex impedance and the second excitation frequency, the complex impedance associated with the second data point being determined based at least in part on the ratio of the voltage to the electric current at the first transducer when excited at the second excitation frequency; and fit the model to at least the first and second data points.

11. The system of any preceding clause, wherein the one or more characteristics include at least an excitation frequency and an amplitude of the excitation signal to be directed to the second transducer.

12. The system of any preceding clause, wherein the one or more characteristics of the one or more first excitation signals to be directed to the first transducer are set in real time based at least in part on the complex impedance spectrum associated with the second transducer.

13. The system of any preceding clause, wherein the conduit defines an axial direction, and wherein the system further comprises: a third transducer arranged even with the first transducer along the axial direction; a fourth transducer arranged even with the second transducer along the axial direction; and wherein the first and second transducers have a same designed resonance frequency and the third and fourth transducers have a same designed resonance frequency, the designed resonance frequency of the first and second transducers being different than the designed resonance frequency of the third and fourth transducers.

14. The system of any preceding clause, further comprising: a third transducer; and a fourth transducer, the fourth transducer being offset from the second transducer so that a signal path length between the third and fourth transducers is greater than a signal path length between the first and second transducers, and wherein the first and second transducers have a same designed resonance frequency and the third and fourth transducers have a same designed resonance frequency, the designed resonance frequency of the first and second transducers being different than the designed resonance frequency of the third and fourth transducers.

15. A method, comprising: exciting a first transducer at a plurality of different excitation frequencies so that the first transducer directs one or more ultrasonic signals through a conduit to a second transducer spaced from the first transducer; determining a complex impedance spectrum associated with the first transducer based at least in part on fitting a model to a first data set, the first data set indicating, for at least two frequencies of the plurality of different excitation frequencies, i) a ratio of a voltage and an electric current at the first transducer, and ii) a phase difference between the voltage and the electric current at the first transducer when excited at a given one of the plurality of different excitation frequencies; setting one or more characteristics of one or more second excitation signals to be directed to the second transducer based at least in part on the complex impedance spectrum associated with the first transducer; and exciting the second transducer with the one or more second excitation signals having the one or more characteristics so that the second transducer directs one or more ultrasonic signals through the conduit to the first transducer.

16. The method of any preceding clause, further comprising: exciting the second transducer at a plurality of different second excitation frequencies so that the second transducer directs one or more ultrasonic signals through the conduit to the first transducer; determining a complex impedance spectrum associated with the second transducer based at least in part on fitting the model to a second data set, the second data set indicating, for at least two frequencies of the plurality of different second excitation frequencies, i) a ratio of a voltage and an electric current at the second transducer, and ii) a phase difference between the voltage and the electric current at the second transducer when excited at a given one of the plurality of different second excitation frequencies; setting one or more characteristics of one or more first excitation signals to be directed to the first transducer based at least in part on the complex impedance spectrum associated with the second transducer; and exciting the first transducer with the one or more first excitation signals having the one or more characteristics so that the first transducer directs one or more ultrasonic signals through the conduit to the second transducer.

17. The method of any preceding clause, wherein determining the complex impedance spectrum associated with the first transducer based at least in part on fitting the model to the first data set comprises: generating a first data point defined by a complex impedance and a first excitation frequency of the plurality of different excitation frequencies, the complex impedance associated with the first data point being determined based at least in part on the ratio of the voltage to the electric current at the first transducer when excited at the first excitation frequency; generating a second data point defined by a complex impedance and a second excitation frequency of the plurality of different excitation frequencies, the complex impedance associated with the second data point being determined based at least in part on the ratio of the voltage to the electric current at the first transducer when excited at the second excitation frequency; and fitting the model to at least the first and second data points.

18. The method of any preceding clause, wherein determining the complex impedance spectrum associated with the first transducer based at least in part on fitting the model to the first data set comprises: determining a peak resonance frequency associated with the first transducer, the peak resonance frequency corresponding to a minimum impedance determined by fitting the model to the first data set; and determining a range of excitation frequencies within a predetermined range of the peak resonance frequency, and wherein the range of excitation frequencies within the predetermined range of the peak resonance frequency correlates to the complex impedance spectrum associated with the first transducer.

19. A non-transitory computer readable medium comprising computer-executable instructions, which, when executed by one or more processors of a fuel flow measuring system, cause the one or more processors to: cause a first transducer of a fuel flow sensor to be excited at a first excitation frequency and at a second excitation frequency so that the first transducer directs one or more ultrasonic signals through a conduit to a second transducer of the fuel flow sensor, the second transducer being spaced from the first transducer, the first and second excitation frequencies being different from one another; determine a complex impedance spectrum associated with the first transducer based at least in part on fitting a model to a first data set, the first data set indicating i) a ratio of a voltage to an electric current at the first transducer when excited at the first excitation frequency and a ratio of the voltage to the electric current at the first transducer when excited at the second excitation frequency, and ii) a phase difference between the voltage and the electric current at the first transducer when excited at the first excitation frequency and a phase difference between the voltage and the electric current at the first transducer when excited at the second excitation frequency; and set one or more characteristics of one or more second excitation signals to be directed to the second transducer spaced from the first transducer based at least in part on the complex impedance spectrum associated with the first transducer.

20. The non-transitory computer readable medium of any preceding clause, wherein when the computer-executable instructions are executed by the one or more processors of the fuel flow measuring system, the one or more processors are further caused to: cause the second transducer to be excited at a first excitation frequency and at a second excitation frequency so that the second transducer directs one or more ultrasonic signals through the conduit to the first transducer, the first and second excitation frequencies at which the second transducer is excited being different from one another; determine a complex impedance spectrum associated with the second transducer based at least in part on fitting the model to a second data set, the second data set indicating i) a ratio of a voltage to an electric current at the second transducer when excited at the first excitation frequency and a ratio of the voltage to the electric current at the second transducer when excited at the second excitation frequency, and ii) a phase difference between the voltage and the electric current at the second transducer when excited at the first excitation frequency and a phase difference between the voltage and the electric current at the second transducer when excited at the second excitation frequency; and set one or more characteristics of one or more first excitation signals to be directed to the first transducer based at least in part on the complex impedance spectrum associated with the second transducer.

21. A system, comprising: a first transducer; a second transducer spaced from the first transducer; and one or more processors being configured to: cause the first transducer to be excited at one or more first excitation frequencies so that the first transducer directs a first ultrasonic signal through a medium flowing through a conduit to the second transducer; determine, at one or more frequencies of the one or more first excitation frequencies, an amplitude of the first ultrasonic signal at two or more points along a first traversing path of the first ultrasonic signal; determine one or more characteristics of the medium by fitting a model of attenuation to first data points, each one of the first data points being defined by the amplitude of the first ultrasonic signal at a given one of the two or more points along the first traversing path, a total distance the first ultrasonic signal has traversed through the medium to the given one of the two or more points, and the frequency of the one or more first excitation frequencies at which the first transducer is excited; and classify a medium type of the medium based at least in part on a comparison between the one or more characteristics of the medium and one or more baseline characteristics.

22. The system of any preceding clause, wherein the two or more points along the first traversing path of the first ultrasonic signal include a first point located at the first transducer and a second point located at the second transducer.

23. The system of any preceding clause, wherein: the first traversing path includes at least a first segment spanning between the first transducer and the second transducer and a second segment spanning between the second transducer and the first transducer, wherein when the first transducer is excited, the first ultrasonic signal traverses along the first segment from the first transducer to the second transducer, reverberates off at least the second transducer, and traverses along the second segment from the second transducer to the first transducer, and wherein the two or more points along the first traversing path of the first ultrasonic signal include a first point located at the first transducer and corresponding to the first segment of the first traversing path, a second point located at the second transducer and corresponding to a transition point between the first and second segments of the first traversing path, and a third point located at the first transducer and corresponding to the second segment of the first traversing path.

24. The system of any preceding clause, wherein the one or more processors are further configured to: cause the second transducer to be excited at one or more second excitation frequencies so that the second transducer directs a second ultrasonic signal through the medium to the first transducer; determine, at one or more frequencies of the one or more second excitation frequencies, an amplitude of the second ultrasonic signal at two or more points along a second traversing path of the second ultrasonic signal, and wherein in determining the one or more characteristics of the medium, the one or more processors are configured to fit the model of attenuation to second data points in addition to the first data points, each of the second data points being defined by the amplitude of the second ultrasonic signal at a given one of the two or more points along the second traversing path, a total distance the second ultrasonic signal has traversed through the medium to the given one of the two or more points along the second traversing path, and the frequency of the one or more second excitation frequencies at which the second transducer is excited.

25. The system of any preceding clause, wherein: the second traversing path includes at least a first segment spanning between the second transducer and the first transducer and a second segment spanning between the first transducer and the second transducer, wherein when the second transducer is excited, the second ultrasonic signal traverses along the first segment from the second transducer to the first transducer, reverberates off at least the first transducer, and traverses along the second segment from the first transducer to the second transducer, and wherein the two or more points along the second traversing path of the second ultrasonic signal include a first point located at the second transducer and corresponding to the first segment of the second traversing path, a second point located at the first transducer and corresponding to a transition point between the first and second segments of the second traversing path, and a third point located at the second transducer and corresponding to the second segment of the second traversing path.

26. The system of any preceding clause, wherein a resultant function of the model of attenuation fit to the first data points correlates to the one or more characteristics of the medium.

27. The system of any preceding clause, wherein in classifying the medium type of the medium based at least in part on the comparison between the one or more characteristics of the medium and the one or more baseline characteristics, the one or more processors are configured to compare the resultant function to a plurality of baseline functions each corresponding to a predetermined medium type.

28. The system of any preceding clause, wherein the predetermined medium type associated with a baseline function of the plurality of baseline functions that most closely matches the resultant function is classified as the medium type of the medium flowing through the conduit.

29. The system of any preceding clause, wherein the one or more processors are further configured to: determine, for each one of the one or more first excitation frequencies, the amplitude of the first ultrasonic signal at two or more points along a first traversing path of the first ultrasonic signal, and wherein in determining the one or more characteristics of the medium by fitting the model of attenuation to the first data points, the one or more processors are configured to: fit the model of attenuation to the first data points associated with each one of the one or more first excitation frequencies so as to render a resultant function associated with each one of the one or more first excitation frequencies; determine a collective resultant function based at least in part on each one of the resultant functions, and wherein in classifying the medium type of the medium based at least in part on the comparison between the one or more characteristics of the medium and the one or more baseline characteristics, the one or more processors are configured to compare the collective resultant function to a plurality of baseline functions.

30. A method, comprising: exciting a first transducer at one or more first excitation frequencies so that the first transducer directs a first ultrasonic signal through a medium flowing through a conduit to a second transducer spaced from the first transducer; determining, at one or more frequencies of the one or more first excitation frequencies, an amplitude of the first ultrasonic signal at two or more points along a first traversing path of the first ultrasonic signal; determining one or more characteristics of the medium by fitting a model of attenuation to first data points, each one of the first data points being defined by the amplitude of the first ultrasonic signal at a given one of the two or more points along the first traversing path, a total distance the first ultrasonic signal has traversed through the medium to the given one of the two or more points, and the frequency of the one or more first excitation frequencies at which the first transducer is excited; and classifying a medium type of the medium based at least in part on a comparison between the one or more characteristics of the medium and one or more baseline characteristics.

31. The method of any preceding clause, wherein the two or more points along the first traversing path of the first ultrasonic signal include a first point located at the first transducer and a second point located at the second transducer.

32. The system of any preceding clause, wherein: the first traversing path includes at least a first segment spanning between the first transducer and the second transducer and a second segment spanning between the second transducer and the first transducer, wherein when the first transducer is excited, the first ultrasonic signal traverses along the first segment from the first transducer to the second transducer, reverberates off the second transducer, and traverses along the second segment from the second transducer to the first transducer, and wherein the two or more points along the first traversing path of the first ultrasonic signal include a first point located at the first transducer and corresponding to the first segment of the first traversing path, a second point located at the second transducer and corresponding to a transition point between the first and second segments of the first traversing path, and a third point located at the first transducer and corresponding to the second segment of the first traversing path.

33. The method of any preceding clause, further comprising: exciting the second transducer at one or more second excitation frequencies so that the second transducer directs a second ultrasonic signal through the medium to the first transducer; determining, at one or more frequencies of the one or more second excitation frequencies, an amplitude of the second ultrasonic signal at two or more points along a second traversing path of the second ultrasonic signal, and wherein in determining the one or more characteristics of the medium, the one or more processors are configured to fit the model of attenuation to second data points in addition to the first data points, each of the second data points being defined by the amplitude of the second ultrasonic signal at a given one of the two or more points along the second traversing path, a total distance the second ultrasonic signal has traversed through the medium to the given one of the two or more points along the second traversing path, and the frequency of the one or more second excitation frequencies at which the second transducer is excited.

34. The method of any preceding clause, wherein: the second traversing path includes at least a first segment spanning between the second transducer and the first transducer and a second segment spanning between the first transducer and the second transducer, wherein when the second transducer is excited, the second ultrasonic signal traverses along the first segment from the second transducer to the first transducer, reverberates off the first transducer, and traverses along the second segment from the first transducer to the second transducer, and wherein the two or more points along the second traversing path of the second ultrasonic signal include a first point located at the second transducer and corresponding to the first segment of the second traversing path, a second point located at the first transducer and corresponding to a transition point between the first and second segments of the second traversing path, and a third point located at the second transducer and corresponding to the second segment of the second traversing path.

35. The method of any preceding clause, wherein a resultant function of the model of attenuation fit to the first data points correlates to the one or more characteristics of the medium.

36. The method of any preceding clause, wherein classifying the medium type of the medium based at least in part on the comparison between the one or more characteristics of the medium and the one or more baseline characteristics comprises: comparing the resultant function to a plurality of baseline functions each corresponding to a predetermined medium type.

37. The method of any preceding clause, wherein the predetermined medium type associated with a baseline function of the plurality of baseline functions that most closely matches the resultant function is classified as the medium type of the medium flowing through the conduit.

38. The method of any preceding clause, further comprising: determining, for each one of the one or more first excitation frequencies, the amplitude of the first ultrasonic signal at two or more points along a first traversing path of the first ultrasonic signal, and wherein determining the one or more characteristics of the medium by fitting the model of attenuation to the first data points comprises: fitting the model of attenuation to the first data points associated with each one of the one or more first excitation frequencies so as to render a resultant function associated with each one of the one or more first excitation frequencies; determining a collective resultant function based at least in part on each one of the resultant functions, and wherein in classifying the medium type of the medium based at least in part on the comparison between the one or more characteristics of the medium and the one or more baseline characteristics, the one or more processors are configured to compare the collective resultant function to a plurality of baseline functions.

39. A non-transitory computer readable medium comprising computer-executable instructions, which, when executed by one or more processors of a fuel flow measuring system, cause the one or more processors to: cause a first transducer of fuel flow measuring system to be excited at one or more first excitation frequencies so that the first transducer directs a first ultrasonic signal through a medium flowing through a conduit to a second transducer of the fuel flow measuring system; determine, at one or more frequencies of the one or more first excitation frequencies, an amplitude of the first ultrasonic signal at two or more points along a first traversing path of the first ultrasonic signal; determine one or more characteristics of the medium by fitting a model of attenuation to first data points, each one of the first data points being defined by the amplitude of the first ultrasonic signal at a given one of the two or more points along the first traversing path, a total distance the first ultrasonic signal has traversed through the medium to the given one of the two or more points, and the frequency of the one or more first excitation frequencies at which the first transducer is excited; and classify a medium type of the medium based at least in part on a comparison between the one or more characteristics of the medium and one or more baseline characteristics.

40. The non-transitory computer readable medium of any preceding clause, wherein the one or more characteristics of the medium determined by fitting the model of attenuation to the first data points correlates to a rate of attenuation of the medium.

41. A system, comprising: a first transducer; a second transducer spaced from the first transducer; and one or more processors being configured to: cause the first transducer to emit an ultrasonic signal through a medium flowing through a conduit toward the second transducer; determine a time of flight of the ultrasonic signal indicating a time taken by the ultrasonic signal to traverse through the medium and return to the first transducer; compare the time of flight of the ultrasonic signal with a baseline time of flight; and determine whether a contaminant is present based at least in part on a comparison between the time of flight of the ultrasonic signal and the baseline time of flight.

42. The system of any preceding clause, wherein the medium is hydrogen.

43. The system of any preceding clause, wherein the medium is jet fuel.

44. The system of any preceding clause, wherein the contaminant is boiling of the medium.

45. The system of any preceding clause, wherein the one or more processors are further configured to: when the contaminant is detected, trigger a response causing adjustment of one or more upstream and/or downstream systems to control the state or phase of the medium flowing through the conduit.

46. The system of any preceding clause, wherein the one or more upstream and/or downstream systems include one or more heat exchangers, one or more pumps, one or more fluid compression devices, and/or one or more heat sinks and/or heat sources.

47. The system of any preceding clause, wherein the one or more processors are further configured to: when the contaminant is detected, trigger a response causing one or more upstream and/or downstream systems to maintain current operation.

48. A method, comprising: causing a first transducer of an ultrasonic flow sensor to emit an ultrasonic signal through a medium flowing through a conduit toward a second transducer of the ultrasonic flow sensor; determining a time of flight of the ultrasonic signal, the time of flight of the ultrasonic signal indicating a time taken by the ultrasonic signal to traverse through the medium and return to the first transducer; comparing the time of flight of the ultrasonic signal with a baseline time of flight; and determining whether a contaminant is present based at least in part on a comparison between the time of flight of the ultrasonic signal and the baseline time of flight.

49. A non-transitory computer readable medium comprising computer-executable instructions, which, when executed by one or more processors of a flow measuring system, cause the one or more processors to: cause a first transducer of an ultrasonic flow sensor to emit an ultrasonic signal through a medium flowing through a conduit toward a second transducer of the ultrasonic flow sensor; determine a time of flight of the ultrasonic signal, the time of flight of the ultrasonic signal indicating a time taken by the ultrasonic signal to traverse through the medium and return to the first transducer; compare the time of flight of the ultrasonic signal with a baseline time of flight; and determine whether a contaminant is present based at least in part on a comparison between the time of flight of the ultrasonic signal and the baseline time of flight.

50. A system, comprising: a first transducer arranged to direct ultrasonic signals through a conduit; a second transducer spaced from the first transducer and arranged to direct ultrasonic signals through the conduit; and one or more processors being configured to: cause the first transducer to be excited at a first excitation frequency and at a second excitation frequency, the first and second excitation frequencies being different from one another; determine a range of frequencies within a predetermined range of a peak resonance frequency associated with the first transducer based at least in part on fitting a model to a first data set, the first data set indicating i) an impedance when excited at the first excitation frequency and an impedance at the first transducer when excited at the second excitation frequency, and ii) a phase difference between a voltage and an electric current at the first transducer when excited at the first excitation frequency and a phase difference between the voltage and the electric current at the first transducer when excited at the second excitation frequency; and set one or more characteristics of one or more second excitation signals to be directed to the second transducer based at least in part on the range of frequencies associated with the first transducer.

We claim:

1. A system, comprising:
a first transducer arranged to direct ultrasonic signals through a conduit;
a second transducer spaced from the first transducer and arranged to direct ultrasonic signals through the conduit; and
one or more processors being configured to:
cause the first transducer to be excited at a first excitation frequency and at a second excitation frequency, the first and second excitation frequencies being different from one another;
determine a complex impedance spectrum associated with the first transducer based at least in part on fitting a model to a first data set, the first data set indicating i) a ratio of a voltage to an electric current at the first transducer when excited at the first excitation frequency and a ratio of the voltage to the electric current at the first transducer when excited at the second excitation frequency, and ii) a phase difference between the voltage and the electric current at the first transducer when excited at the first excitation frequency and a phase difference between the voltage and the electric current at the first transducer when excited at the second excitation frequency; and
set one or more characteristics of one or more second excitation signals to be directed to the second transducer based at least in part on the complex impedance spectrum associated with the first transducer.

2. The system of claim 1, wherein the first transducer is caused to be excited by a first excitation signal at the first excitation frequency and by a second excitation signal at the second excitation frequency one at a time.

3. The system of claim 1, wherein the first transducer is caused to be excited by a first excitation signal at the first excitation frequency and by a second excitation signal at the second excitation frequency simultaneously, the first excitation signal having a first phase and the second excitation signal having a second phase.

4. The system of claim 1, wherein the model is a Butterworth Van-Dyke Model.

5. The system of claim 1, wherein the one or more processors are further configured to:
cause the second transducer to be excited at a first excitation frequency and at a second excitation frequency, the first and second excitation frequencies associated with the second transducer being different from one another;
determine a complex impedance spectrum associated with the second transducer based at least in part on fitting a model to a second data set, the second data set indicating i) a ratio of a voltage to an electric current at the second transducer when excited at the first excitation frequency and a ratio of the voltage to the electric current at the second transducer when excited at the second excitation frequency, and ii) a phase difference between the voltage and the electric current at the second transducer when excited at the first excitation frequency and a phase difference between the voltage and the electric current at the second transducer when excited at the second excitation frequency; and
set one or more characteristics of one or more first excitation signals to be directed to the first transducer based at least in part on the complex impedance spectrum associated with the second transducer.

6. The system of claim 5, wherein the one or more processors are further configured to:
cause the second transducer to be excited by the one or more second excitation signals so that the second transducer directs the ultrasonic signals at the first transducer; and
cause the first transducer to be excited by the one or more first excitation signals so that the first transducer directs the ultrasonic signals at the second transducer.

7. The system of claim 6, wherein:
i) the one or more second excitation signals directed to the second transducer cause the second transducer to be excited at multiple excitation frequencies, and wherein the multiple excitation frequencies at which the second transducer is excited are each within a predetermined range of a peak resonance frequency associated with the first transducer at a previous time step; and
ii) the one or more first excitation signals directed to the first transducer cause the first transducer to be excited at multiple excitation frequencies, and wherein the multiple excitation frequencies at which the first transducer is excited are each within a predetermined range of a peak resonance frequency associated with the second transducer at the previous time step.

8. The system of claim 1, wherein in determining the complex impedance spectrum associated with the first transducer based at least in part on fitting the model to the first data set, the one or more processors are configured to:
determine a peak resonance frequency associated with the first transducer, the peak resonance frequency corresponding to a minimum impedance determined by fitting the model to the first data set; and
determine a range of excitation frequencies within a predetermined range of the peak resonance frequency, and
wherein the range of excitation frequencies within the predetermined range of the peak resonance frequency correlates to the complex impedance spectrum associated with the first transducer.

9. The system of claim 8, wherein a lower bound and an upper bound of the predetermined range are set based at least in part on a receiving threshold, the receiving threshold being set at a preselected impedance value.

10. The system of claim 1, wherein in determining the complex impedance spectrum associated with the first transducer based at least in part on fitting the model to the first data set, the one or more processors are configured to:
generate a first data point defined by a complex impedance and the first excitation frequency, the complex impedance associated with the first data point being determined based at least in part on the ratio of the voltage to the electric current at the first transducer when excited at the first excitation frequency;
generate a second data point defined by a complex impedance and the second excitation frequency, the complex impedance associated with the second data point being determined based at least in part on the ratio of the voltage to the electric current at the first transducer when excited at the second excitation frequency; and
fit the model to at least the first and second data points.

11. The system of claim 1, wherein the one or more characteristics include at least an excitation frequency and an amplitude of the second excitation signal to be directed to the second transducer.

12. The system of claim 1, wherein one or more characteristics of one or more first excitation signals to be directed to the first transducer are set in real time based at least in part on a complex impedance spectrum associated with the second transducer.

13. The system of claim 1, wherein the conduit defines an axial direction, and wherein the system further comprises:
a third transducer arranged even with the first transducer along the axial direction;
a fourth transducer arranged even with the second transducer along the axial direction; and
wherein the first and second transducers have a same designed resonance frequency and the third and fourth transducers have a same designed resonance frequency, the designed resonance frequency of the first and second transducers being different than the designed resonance frequency of the third and fourth transducers.

14. The system of claim 1, further comprising:
a third transducer; and
a fourth transducer, the fourth transducer being offset from the second transducer so that a signal path length between the third and fourth transducers is greater than a signal path length between the first and second transducers, and
wherein the first and second transducers have a same designed resonance frequency and the third and fourth transducers have a same designed resonance frequency, the designed resonance frequency of the first and second transducers being different than the designed resonance frequency of the third and fourth transducers.

15. A method, comprising:
exciting a first transducer at a plurality of different excitation frequencies so that the first transducer directs one or more ultrasonic signals through a conduit to a second transducer spaced from the first transducer;
determining a complex impedance spectrum associated with the first transducer based at least in part on fitting a model to a first data set, the first data set indicating, for at least two frequencies of the plurality of different excitation frequencies, i) a ratio of a voltage and an electric current at the first transducer, and ii) a phase difference between the voltage and the electric current at the first transducer when excited at a given one of the plurality of different excitation frequencies;
setting one or more characteristics of one or more second excitation signals to be directed to the second transducer based at least in part on the complex impedance spectrum associated with the first transducer; and
exciting the second transducer with the one or more second excitation signals having the one or more characteristics so that the second transducer directs one or more ultrasonic signals through the conduit to the first transducer.

16. The method of claim 15, further comprising:
exciting the second transducer at a plurality of different second excitation frequencies so that the second transducer directs one or more ultrasonic signals through the conduit to the first transducer;
determining a complex impedance spectrum associated with the second transducer based at least in part on fitting the model to a second data set, the second data set indicating, for at least two frequencies of the plurality of different second excitation frequencies, i) a ratio of a voltage and an electric current at the second transducer, and ii) a phase difference between the voltage and the electric current at the second transducer when excited at a given one of the plurality of different second excitation frequencies;
setting one or more characteristics of one or more first excitation signals to be directed to the first transducer based at least in part on the complex impedance spectrum associated with the second transducer; and
exciting the first transducer with the one or more first excitation signals having the one or more characteristics so that the first transducer directs one or more ultrasonic signals through the conduit to the second transducer.

17. The method of claim 15, wherein determining the complex impedance spectrum associated with the first transducer based at least in part on fitting the model to the first data set comprises:
generating a first data point defined by a complex impedance and a first excitation frequency of the plurality of different excitation frequencies, the complex impedance associated with the first data point being determined based at least in part on the ratio of the voltage to the electric current at the first transducer when excited at the first excitation frequency;
generating a second data point defined by a complex impedance and a second excitation frequency of the plurality of different excitation frequencies, the complex impedance associated with the second data point being determined based at least in part on the ratio of the voltage to the electric current at the first transducer when excited at the second excitation frequency; and fitting the model to at least the first and second data points.

18. The method of claim 15, wherein determining the complex impedance spectrum associated with the first transducer based at least in part on fitting the model to the first data set comprises:
determining a peak resonance frequency associated with the first transducer, the peak resonance frequency corresponding to a minimum impedance determined by fitting the model to the first data set; and
determining a range of excitation frequencies within a predetermined range of the peak resonance frequency, and
wherein the range of excitation frequencies within the predetermined range of the peak resonance frequency correlates to the complex impedance spectrum associated with the first transducer.

19. A non-transitory computer readable medium comprising computer-executable instructions, which, when executed by one or more processors of a fuel flow measuring system, cause the one or more processors to:
cause a first transducer of a fuel flow sensor to be excited at a first excitation frequency and at a second excitation frequency so that the first transducer directs one or more ultrasonic signals through a conduit to a second transducer of the fuel flow sensor, the second transducer being spaced from the first transducer, the first and second excitation frequencies being different from one another;
determine a complex impedance spectrum associated with the first transducer based at least in part on fitting a model to a first data set, the first data set indicating i) a ratio of a voltage to an electric current at the first transducer when excited at the first excitation frequency and a ratio of the voltage to the electric current at the first transducer when excited at the second excitation frequency, and ii) a phase difference between the voltage and the electric current at the first transducer when excited at the first excitation frequency and a phase difference between the voltage and the electric current at the first transducer when excited at the second excitation frequency; and
set one or more characteristics of one or more second excitation signals to be directed to the second transducer spaced from the first transducer based at least in part on the complex impedance spectrum associated with the first transducer.

20. The non-transitory computer readable medium of claim 19, wherein when the computer-executable instructions are executed by the one or more processors of the fuel flow measuring system, the one or more processors are further caused to:
cause the second transducer to be excited at a first excitation frequency and at a second excitation frequency so that the second transducer directs one or more ultrasonic signals through the conduit to the first transducer, the first and second excitation frequencies at which the second transducer is excited being different from one another;
determine a complex impedance spectrum associated with the second transducer based at least in part on fitting the model to a second data set, the second data set indicating i) a ratio of a voltage to an electric current at the second transducer when excited at the first excitation frequency and a ratio of the voltage to the electric current at the second transducer when excited at the second excitation frequency, and ii) a phase difference between the voltage and the electric current at the second transducer when excited at the first excitation frequency and a phase difference between the voltage and the electric current at the second transducer when excited at the second excitation frequency; and
set one or more characteristics of one or more first excitation signals to be directed to the first transducer based at least in part on the complex impedance spectrum associated with the second transducer.

* * * * *